US005305521A

United States Patent [19]

Inaba et al.

[11] Patent Number: 5,305,521

[45] Date of Patent: Apr. 26, 1994

[54] INK-JET HEAD ASSEMBLING METHOD

[75] Inventors: Masaki Inaba, Kawasaki; Tsuyoshi Baba, Yokohama; Tsuyoshi Orikasa, Kasukabe; Takashi Ohba, Zama; Toshio Tsuda, Yokohama, all of Japan

[73] Assignee: Canon Kabushiki Kaisha, Tokyo, Japan

[21] Appl. No.: 903,119

[22] Filed: Jun. 23, 1992

[30] Foreign Application Priority Data

| | | | |
|---|---|---|---|
| Jun. 25, 1991 | [JP] | Japan | 3-153009 |
| Jun. 25, 1991 | [JP] | Japan | 3-153010 |
| Jun. 25, 1991 | [JP] | Japan | 3-153012 |
| Jun. 25, 1991 | [JP] | Japan | 3-153013 |
| Jun. 25, 1991 | [JP] | Japan | 3-153014 |
| Jun. 26, 1991 | [JP] | Japan | 3-154384 |
| Jul. 9, 1991 | [JP] | Japan | 3-167907 |

[51] Int. Cl.[5] .......... B23P 25/00

[52] U.S. Cl. .......... 29/890.1; 29/423; 29/468; 29/466

[58] Field of Search .......... 29/423, 424, 407, 720, 29/721, 464, 468, 430, 890.1, 466; 346/75, 140 R; 156/359

[56] References Cited

U.S. PATENT DOCUMENTS

| | | | |
|---|---|---|---|
| 4,959,898 | 10/1990 | Landman et al. | 29/720 |
| 5,084,959 | 2/1992 | Ando et al. | 29/720 |
| 5,095,321 | 10/1992 | Saito et al. | 346/75 |
| 5,098,503 | 3/1992 | Drake | 29/759 X |
| 5,243,755 | 9/1993 | Inaba et al. | 29/559 X |

FOREIGN PATENT DOCUMENTS

| | | |
|---|---|---|
| 0015618 | 9/1980 | European Pat. Off. . |
| 0483843 | 5/1992 | European Pat. Off. . |

OTHER PUBLICATIONS

Hewlett-Packard Journal, Boeller, et al., "High-Volume Microassembly of Color Thermal Inkjet Printheads and Cartridges" No. 4, pp. 32–40, Aug. 1988.

Hewlett-Packard Journal, Huth, et al., "CIM and Machine Vision in the Production of Thermal Inkjet Printheads" No. 5, pp. 91–98, Oct. 1988.

*Primary Examiner*—Timothy V. Eley

*Assistant Examiner*—Khan V. Nguyen

*Attorney, Agent, or Firm*—Fitzpatrick, Cella, Harper & Scinto

[57] ABSTRACT

Disclosed in an ink-jet head assembling method for executing alignments between a top plate and a heater board. The method comprises steps of holding the top plate by fingers, moving the fingers to bring the top plate to a position above the heater board with adhesives having been applied, releasing the holding of the fingers, enabling them to engage with an ink reception port of the top plate, and moving the fingers sideways to abut against the ink reception port, and adjusting a relative position between heaters of the heater board and nozzles of the top plate.

10 Claims, 38 Drawing Sheets

HEATER BOARD ALIGNING OPERATION

INK-JET HEAD ASSEMBLING METHOD

BACKGROUND OF THE INVENTION

Present invention relates to an ink-jet head assembling method and apparatus and more particularly, to a method and apparatus assembling a head nozzle of a printing head which discharges ink, by mounting a top plate member on a heater board formed with a plurality of heaters for heating the ink, the top plate member has a plurality of nozzles corresponding to the heaters.

Conventionally, so-called bubble-jet type printing head, which heats ink to form bubbles when the ink is discharged to be printed on a paper sheet, has been developed and put into practical use. This bubble-jet type printing head is advantageous due to improving printing precision.

In an assembling apparatus for the bubble-jet type printing head, heaters for heating and boiling ink to form bubbles and discharge orifices for discharging bubbles toward a paper sheet must be precisely aligned on the order of microns. For example, in order to attain a printing precision of about 360 dpi (dots per inch), it is necessary to align 64 discharge orifices within a range of about 4.5 mm at a constant pitch, and the alignment is very small, about 70 microns.

For formation of discharge orifices at such a very small pitch, the discharge orifices can be formed with allowable predetermined high precision in an orifice plate to be attached to the front surface of a top plate member by using, e.g., an ultra-high-precision process machine such as a laser process machine. Similarly, heaters can be formed on a heater board with allowable predetermined high precision, by using an ultra-high-precision etching technique.

In a conventional assembling apparatus, a heater board and a top plate member are respectively set using special-purpose jigs so as to align them in order hat the top plate member can be placed on the heater board in a state that each axis of heaters on the heater board and the orifices formed in the orifice plate precisely coincide. Thereafter, the heater board and the top plate member are manually aligned while alternately observing the heaters and orifices using a precision microscope.

More particularly, a set of fingers to clamp the top plate member are arranged at a predetermined distance above the upper surface of the top plate member placed (temporarily placed) on the heater board. These fingers are moved in a lateral direction to engage the ink reception portion and to move the top plate member on the heater board for precisely aligning both arranging positions.

However, in the conventional apparatus, the thickness of a top plate member changes depending upon processing variations and the gap between the fingers and the upper surface of the top plate member changes, causing problems in the alignment of the top plate member and the heater board. When the thickness of the top plate member is rather thick in comparison to a fixed standard, the gap between the top plate member and the fingers is very small and the contact pressure between the heater board and the top plate member increases. This disturbs the motion of the top plate member in alignment, degrading the aligning precision, or making matters worse, resulting in breakage to the fingers. On the other hand, when the top plate member is thin, the gap between the top plate member and the fingers becomes larger than the desired amount. The top plate member is inclined to one side while it is moved in the alignment. In this case, not only the precise alignment cannot be performed, but fingers might pass over the ink reception portion, which makes the alignment impossible.

Another problem is that, in a conventional assembling apparatus, the aforementioned manual alignment of the heater board and the top plate member causes a variation among workers, a variation depending on the degree of skill of each worker, and a variation depending on the degree of fatigue of each worker. These variations impair position adjustment precision, and pose a problem in reliability of the final products. In addition, since visual measurements and manual operations of jigs are repeated, the time required for alignment is prolonged, resulting in a decrease in assembling efficiency caused by the prolonged assembling time. Furthermore, more time is required until workers become skilled.

In the conventional assembling apparatus, after the heater board and the top plate member are aligned, they are temporarily attached in a manner that a discharging needle of an adhesive supply dispenser is manually set toward a joint portion of the heater board and the top plate member, through which an ultraviolet-setting adhesive is applied, and the joint portion applied with the adhesive is radiated with the ultraviolet rays. This temporarily attached assembly is fixed on a base plate via a spring using special-purpose tools. In this conventional manner, the adhesive is delivered from the discharge needle of the dispenser after attachment of the heater board and the top plate member. In this process, the relative position between the heater board and the top plate member may shift.

Further, as the setting of the discharge needle is made by visual measurement, the management of the adhesive apply portion and apply amount is difficult. As a result, if the adhesive apply position and the apply amount are out of balance, joint states may change due to varying contraction in drying of the adhesive. If the adhesive is applied near an ink channel of the top plate member, the adhesive may penetrate into the channel to fill a nozzle hole.

If the adhesive penetrates into the ink channel which should be fixed by springs, the channel may be filled with the adhesive and the ink may not be discharged. The adhesive may further penetrate thru the joint of the top plate member and the heater board to make a gap between the top plate member and the heater board, causing a leakage of the ink between nozzles.

In the conventional assembling apparatus, when the top plate member is mounted on the heater board, in order to hold this top plate member, a sucker attached under the fingers are brought into a sucking state. A worker picks up one of the top plate members from a tray by, e.g., a pair of tweezers, moves the top plate member near to the sucker of the finger member, to have the sucker hold the top plate.

In this manual operation with visual measurement, precise alignment cannot be obtained. Further, the occurrence of variation among workers, and the fear of too much pressing to break the top plate member or the finger member are pointed out.

In the conventional assembling apparatus, one of the plurality of heaters located at the center of the heater board is specified as the reference heater. More specifically, in an image of the heater board photographed by a tool-maker's microscope, within an image area, the heater closest to the center of the image area is specified as the reference heater.

However, even when the heater board is shifted in the x-axis direction due to a shift between the heater board and the base plate or a shift between the base plate and jig clamp, the same heater pattern is displayed within the image area. Accordingly, it is difficult to distinguish heater boards shifted in the x-axis direction.

For the above reason, if a shifted heater board is attached to a top plate member, the heaters are not correctly combined with nozzle holes having corresponding numerals, and they are set shifted by one or more than two holes. As a result, the nozzle hole(s) not being combined with corresponding heater(s) at the end portion cannot discharge ink.

SUMMARY OF THE INVENTION

The present invention has been made in consideration of the above situation, and has as its object to provide an ink-jet head assembling method which enables precise alignment between the top plate member and the heater board keeping a constant gap between the top plate member and finger member.

It is another object of the present invention to provide an ink-jet head assembling method for applying a fixed amount of adhesive and applying of an adhesive to a fixed position.

It is still another object of the present invention to provide an ink-jet head assembling method which enables temporary joining of the top plate member and the heater board using an adhesive without shifting the relative position between the top plate member and the heater board.

It is still another object of the present invention to provide an ink-jet head assembling method which enables placing a precisely aligned top plate member upon a heater board.

It is a further object of the present invention to provide an ink jet head assembling method for preventing the mounting of a top plate member on a heater board in a state where the heater board is shifted from a predetermined position.

It is another object of the present invention to provide an ink-jet head assembling method enabling heaters to coincide with corresponding nozzle holes having the same reference numerals so that there is no nozzle hole disabled from discharge of ink.

It is still another object of the present invention to provide an ink-jet head assembling method for eliminating manual operations to realize full-automatic operations so that constant position adjustment precision can be maintained and reliability can be improved.

It is still another object of the present invention to provide an ink-jet head assembling apparatus capable of eliminating manual operations and that can realize full-automatic operations, thereby shortening a time required for alignment as much as possible, and improving assembling efficiency.

It is yet another object of the present invention to provide an aligning method and apparatus which can align a plurality of members more accurately and more quickly.

It is another object of the present invention to provide an aligning method and apparatus which can align a plurality of members, keeping constant contact pressure and preventing breakage of the members.

It is still another object of the present invention to provide an adhesive apply method for keeping a fixed adhesive apply position.

In order to attain the foregoing objects, according to a first aspect of the present invention, an ink-jet head assembling method assembling a head nozzle of a printing head for discharging ink by mounting a top plate member upon a heater board having a plurality of heaters for heating the ink, the top plate member having a plurality of nozzles corresponding to the heaters and an ink reception portion on its upper surface, comprising the steps of:

holding step for holding the top plate member by a set of fingers;

placing step for moving the fingers to place the top plate member on the heater board with adhesives interposed between the top plate member and the heater board;

thickness calibration step, in this placing state, of releasing the holding by the fingers so that the fingers are able to engage the ink reception portion from a lateral direction; and adjustment step for adjusting the relative position between the heaters of the heater board and the nozzles of the top plate member by moving the fingers in a lateral direction to abut against the ink reception portion.

Further, according to a second aspect of the present invention, in the ink-jet assembling method, the thickness calibration step includes:

detection substep for detecting arranging positions of the nozzles;

calculation substep for calculating the error between a reference position set below an arranging position of the heater board and the detected arranging position of the nozzles;

move-down substep for moving the fingers downward by the calculated error; and move-up substep for moving the fingers upward by a predetermined value, by performing the moving-up substep, a fixed amount of gap between the top plate member and the fingers can be maintained, and the fingers are moved in a lateral direction to engage the ink reception portion.

According to a third aspect of the present invention, an ink-jet head assembling method comprises the steps of:

adhesive application step of applying adhesives on a heater board having a plurality of heaters for heating an ink;

supply step of supplying a top plate member having a plurality of nozzle holes corresponding to the heaters on the heater board on which the adhesives have been applied;

temporary adhering step for temporarily adhering the top plate member to the heater board with the adhesives; and fixing step for fixing the heater board and the top plate member temporarily adhered to a base plate via a spring member, wherein in the adhesive application step, the adhesives are applied to a plurality of positions at least a predetermined distance away from the position to be fixed via the spring member.

According to a fourth aspect of the present invention, in the method, the center of the spring member abuts upon an ink discharge channel of the top plate member, and its both ends are fixed through holes in the base plate.

Further, an ink-jet head assembling apparatus according to the present invention which assembles a head nozzle of an ink-jet head for discharging ink by mounting a top plate member on a heater board having a plurality of heaters, the top plate member having a plurality of nozzles corresponding to the heaters, comprises:

a base member on which the heater board is placed;

a first stage for movably supporting the base member along a first direction;

first drive means for driving the first state along the first direction;

a second stage for movably supporting the base member along a second direction different from the first direction;

second drive means for driving the second stage along the second direction;

a third stage for movably supporting the base member along a third direction different from the first and second directions;

third drive means for driving the third stage along the third direction;

a set of fingers for holding the top plate member;

a fourth stage for movably supporting the fingers along the first direction;

fourth drive means for driving the fourth stage along the first direction;

a fifth stage for movably supporting the fingers along the second direction;

fifth drive means for driving the fifth stage along the second direction;

a sixth stage for movably supporting the fingers along the third direction;

sixth drive means for driving the sixth stage along the third direction;

first photograph means for photographing the plurality of heaters;

second photograph means for photographing the plurality of nozzles;

image processing means for calculating an arranging position and a relative position of the heaters and the nozzles based on the image informations photographed by said first and second photograph means; and control means for controlling said first to sixth drive means to drive the first to sixth stages so that the heaters and the corresponding nozzles are in a relative positional relationship.

Further, an adhesive application method according to the present invention for applying an adhesive on a member to be adhered, comprises the steps of:

placing step for placing the member on a application jig in a standby position;

convey step for conveying the application jig from the standby position to an application position;

alignment step for stopping the application jig at the application position;

application step for applying the adhesive to a predetermined position of the member to be adhered on the application jig stopped at the application position.

Further, an alignment method according to the present invention, for a plurality of members including a base plate having a first surface and a second surface vertical to the first surface, and a member to be attached having a third surface and a fourth surface to abut against the first surface and the second surface respectively, includes:

first step for placing the member to be attached on the base plate so that the third surface abuts against the first surface;

second step for moving the member to be attached along a direction parallel to an extended cross line where the first surface intersects the second surface;

third step for stopping the motion of the member in the second step, wherein the member abuts against a portion fixed on the first surface;

fourth step for moving the member along a direction which orthogonally crosses the extended cross line direction; and fifth step for stopping the motion of the member in the fourth step, wherein the member abuts against the second surface of the base plate.

Further, a plural member alignment apparatus according to the present invention, for attaching a member to a base plate having a first surface and a second surface vertical to the first surface, the member to be attached having a third surface and a fourth surface to abut against the first surface and the second surface respectively, comprising:

placing means for placing the member to be attached on the base plate so that the third surface abuts against the first surface;

first moving means for moving the member to be attached along a direction parallel to an extended cross line where the first surface intersects the second surface;

a member fixed on the first surface, which the member to be attached moved by said first moving means abuts against, for alignment of the member to be attached in the extended cross line direction;

second moving means for moving the member to be attached along a direction which orthogonally crosses the extended cross line direction; and control means for controlling the motion of the member to be attached by said first moving means to stop by abutting against the fixed member, and the motion of the member to be attached by said second moving means to stop by the abutment of the fourth surface of the member against the second surface of the base plate.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

A preferred embodiment of an ink-jet head assembling method according to the present invention will be described below.

Ink-jet Cartridge 200 and Head Nozzle 100

First, a schematic structure of an ink-jet cartridge 200 incorporating a head nozzle 100 assembled by an assembling apparatus 10 to which an assembling method of the present invention is reduced with reference to FIGS. 1 to 5.

Figure 1:
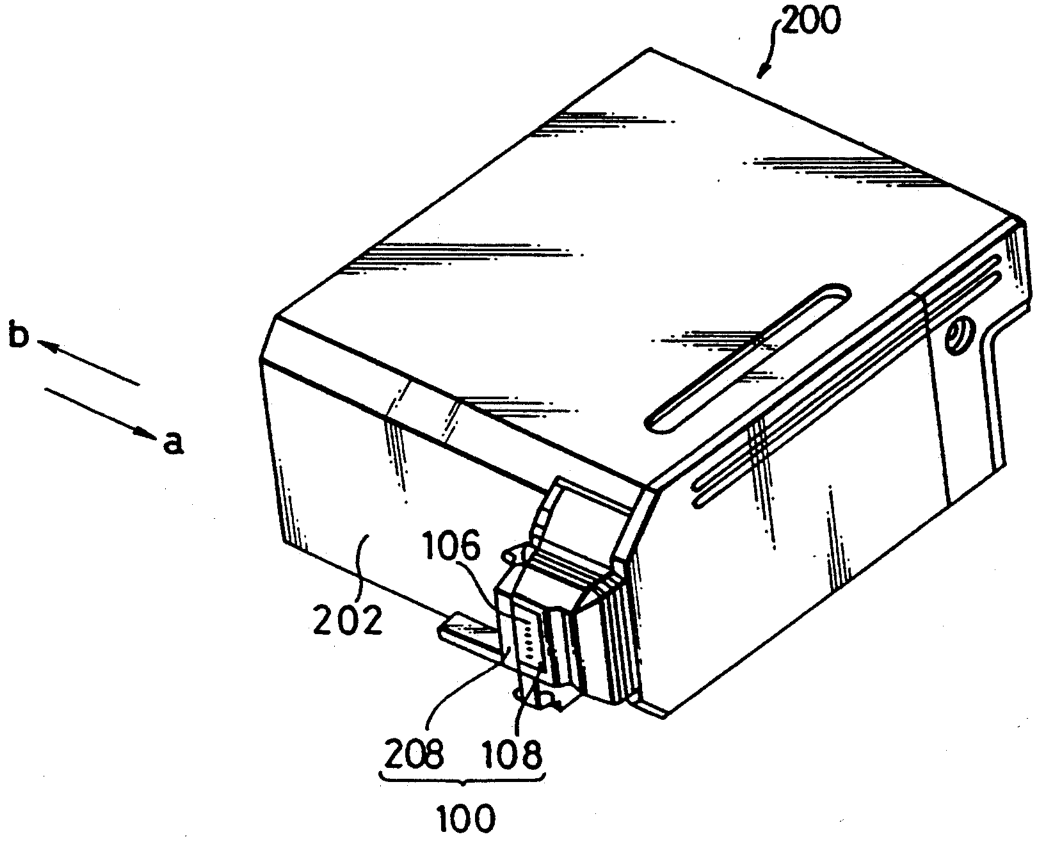
FIG. 1 is a perspective view of an ink-jet cartridge detachably attached to an ink-jet recording apparatus incorporating a head nozzle assembled by an ink jet head assembling apparatus according to the present invention.
Figure 2:
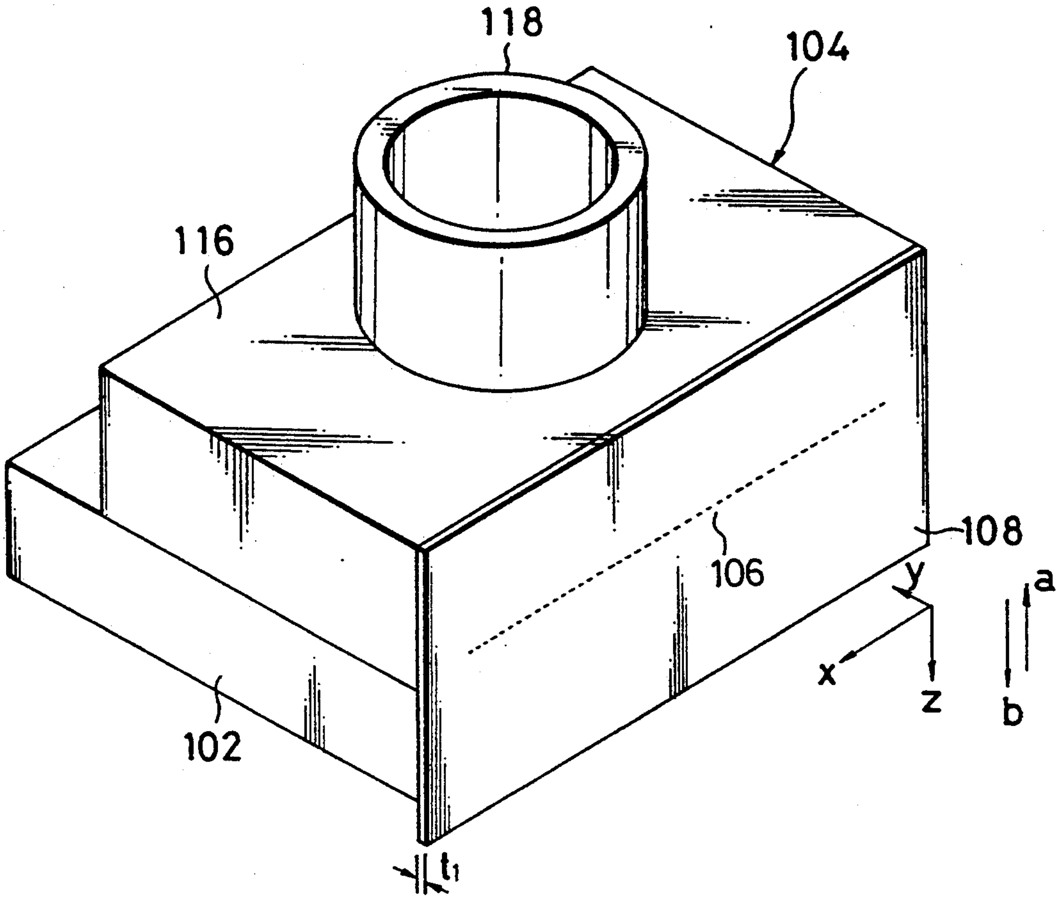
FIG. 2 is a perspective view of the head nozzle to be assembled by the assembling apparatus of the present invention.
Figure 3:
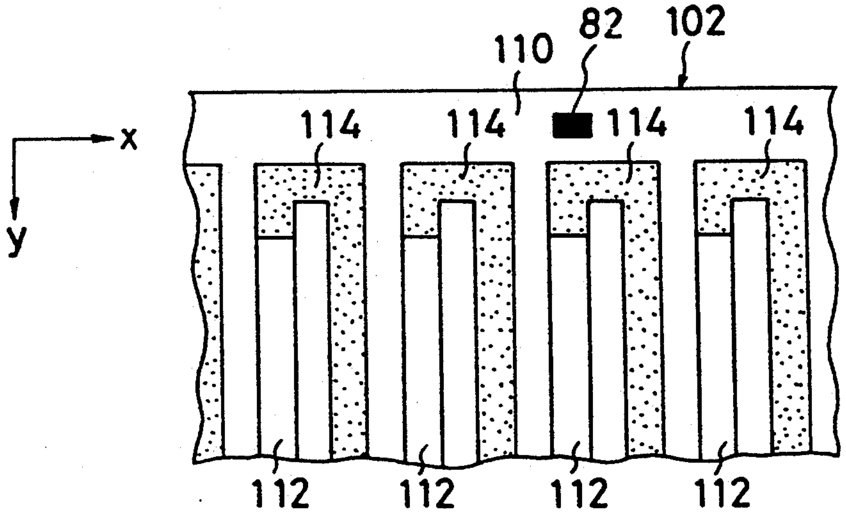
FIG. 3 is a top plan view showing the structure of a heater board which defines one of the constituting elements of the head nozzle.

The ink-jet cartridge 200 is mainly constituted by an ink tank 202 and the head nozzle 100, as shown in FIG. 1. As shown in FIGS. 2 and 3, the head nozzle 100 is constituted by a heater board 102 on which heaters 112 for heating an ink are formed, a top plate 104 aligned on the heater board 102 and having partition walls for partitioning a plurality of ink channels, a common liquid chamber for distributing an ink to the ink channels, a cylindrical ink reception port 118 for supplying the ink to the common liquid chamber, and the like, an orifice plate 108 integrally attached to the front surface of the top plate 104, and having a plurality of discharge orifices 106 corresponding to the ink channels, a base member 208 as a base plate on which the heater board 102 is fixed, and a spring member 122 (FIG. 46) for fixing the top plate 104 temporarily attached to the heater board 102.

In this embodiment, the discharge orifices 106 are aligned at a constant pitch over a length of about 4.5 mm. This aligning pitch defines a printing density of the head nozzle 100 corresponding to a precision as high as about 360 dpi (dots per inch).

As shown in a top plan view of FIG. 3, on the heater board 102, a position above a heater 112 at the center of the heaters 112 in an x-axis direction is marked with an identification mark 82 for identification of the central heater 112 as a reference heater. In this embodiment, when a second ITV camera 42g photographs the surface of the heater board 102, the identification mark 82 is made a distinguishable image from the surface image of the heater board 102.

Figure 4:
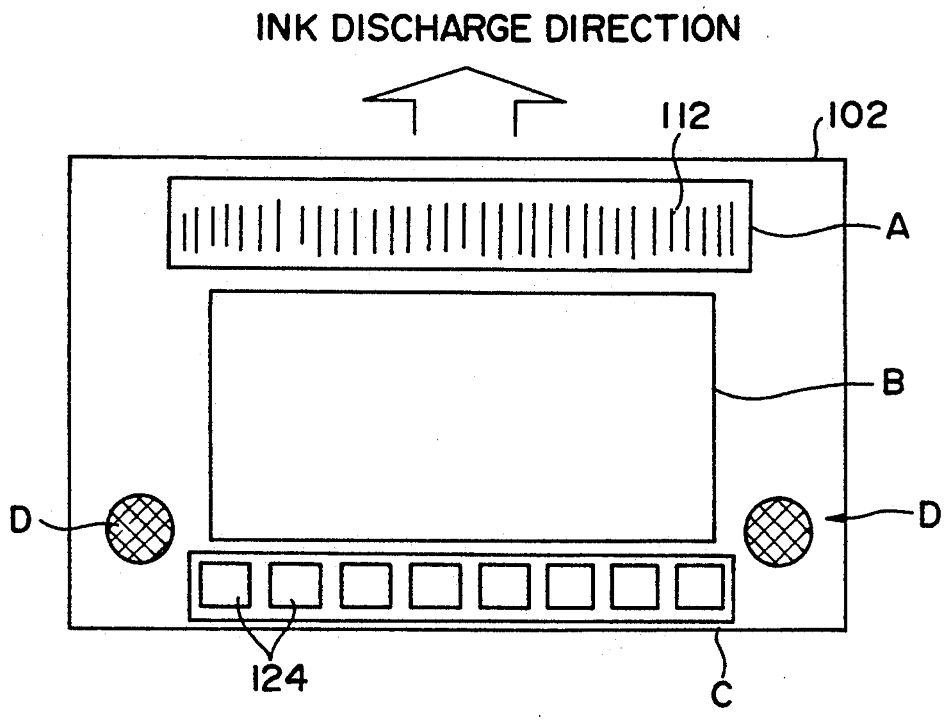
FIG. 4 is a top plan view showing the upper structure of the heater board.

As shown in FIG. 4, the upper surface of the heater board 102 has a first area A located on one side of the surface, where the heaters 112 are arranged and the ink channels are formed, a second area B located at the center of the surface, defined as an ink reservoir, a third area C located on the opposite side of the area A, where bonding pads 124 connected to a control unit 38 are arranged, and forth areas D located on the both right and left sides of the surface away from the ink channels where adhesives 80a and 80b are applied, avoiding the areas B and C. More specifically, the fourth area D as an application position for the adhesives 80a and 80b is located at a position preventing a bonding agent and the ink from being mixed with the adhesives 80 and 80b.

Assembling Apparatus 10

The arrangement of the assembling apparatus 10 of the head nozzle 100 being the characteristic feature of the present invention, i.e., the assembling apparatus 10 which assembles a grooved top plate 104 on a heater board 102 while they are precisely aligned with each other, and an assembling method will be described below with reference to FIG. 5 and the subsequent drawings.

Overall Arrangement of Assembling Apparatus 10

Figure 5A:
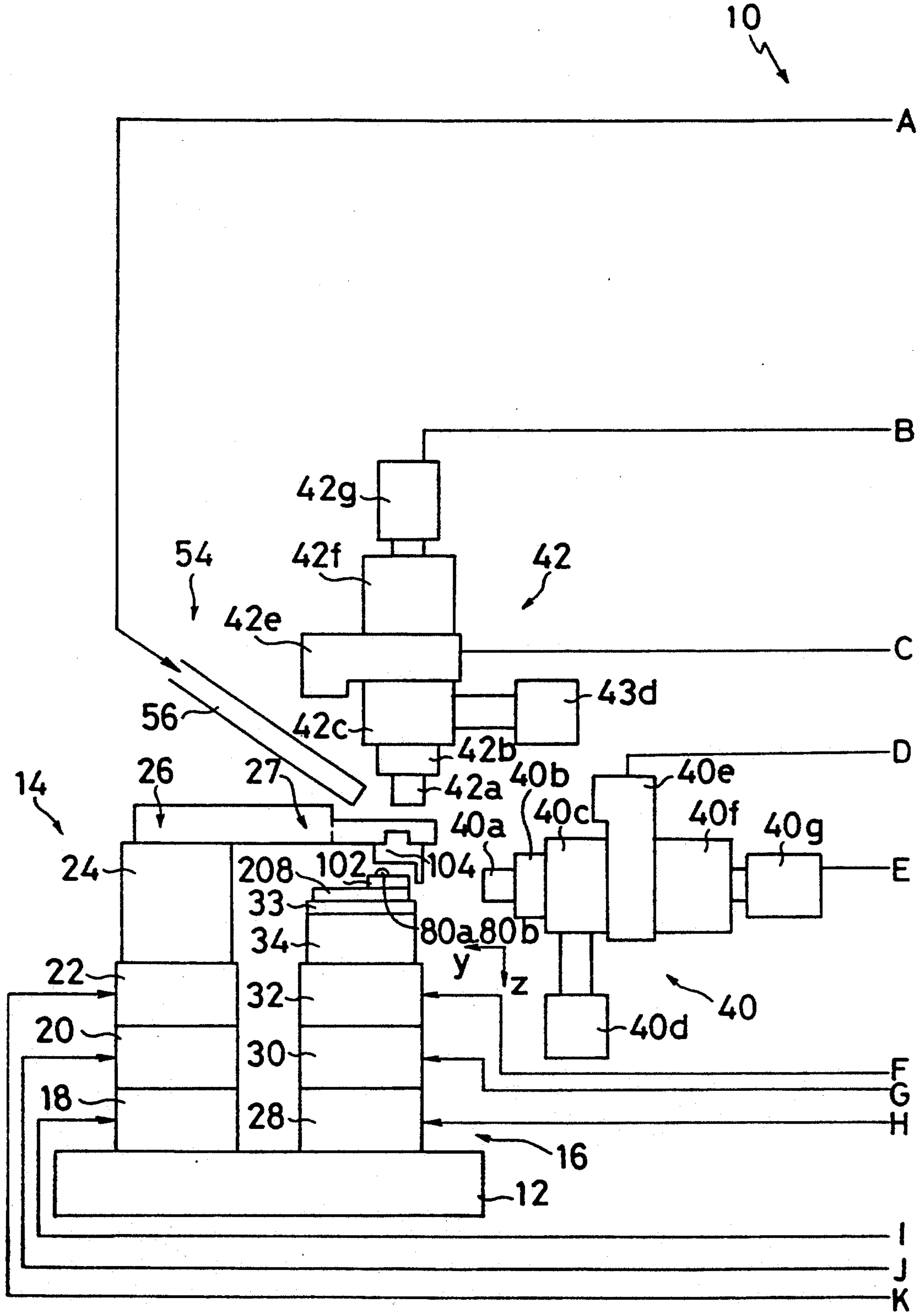
FIGS. 5A and 5B are schematic block diagrams showing the construction of a head nozzle assembling apparatus according to an embodiment of the present invention.
Figure 5B:
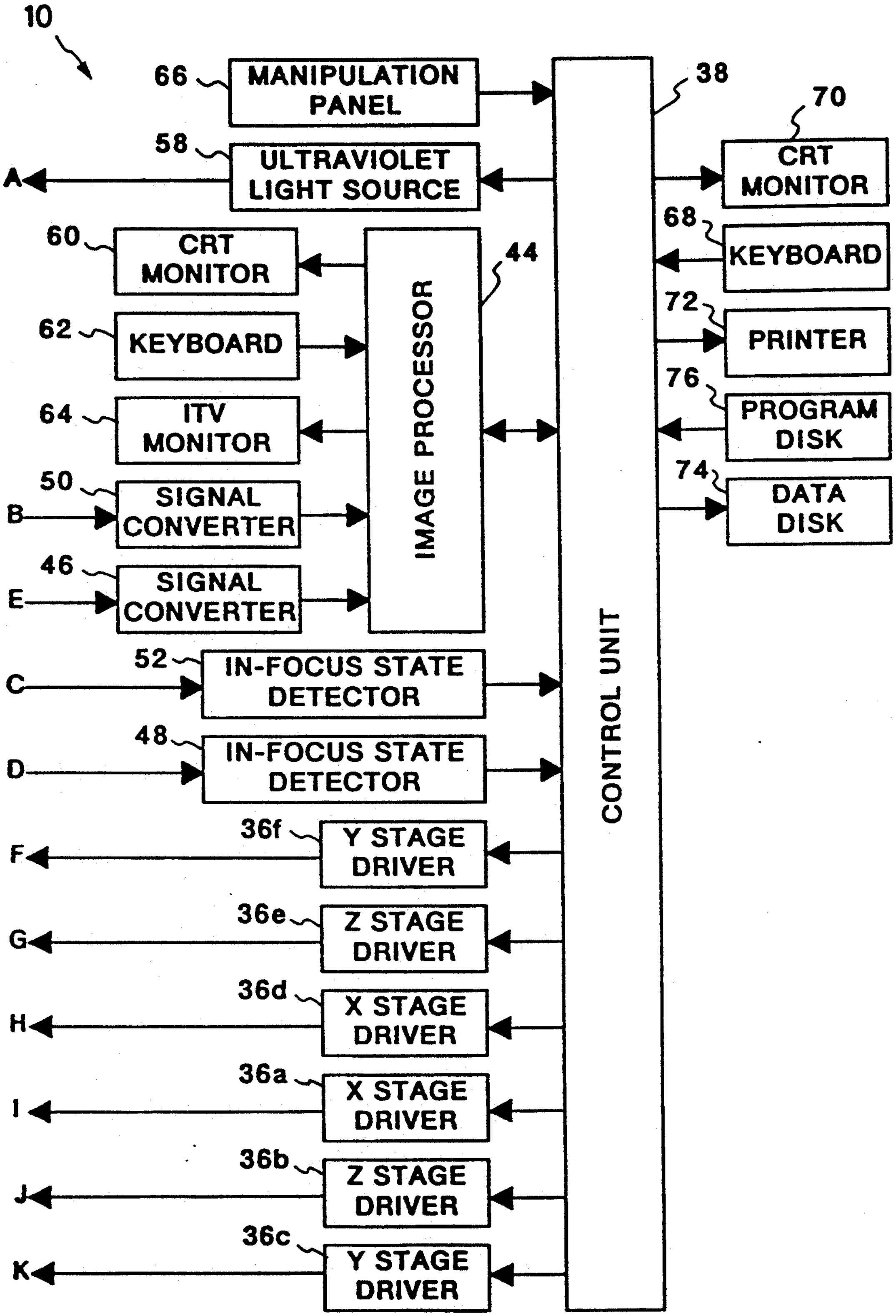

As shown in FIG. 5, the assembling apparatus 10 comprises a platen 12 which is precisely aligned on a foundation (not shown) in a horizontal state. First and second position adjustment mechanisms 14 and 16 are arranged on the platen 12. The first position adjustment mechanism 14 adjustably defines the mounting position of the grooved top plate (hereinafter simply referred to as a top plate) 104, to which the orifice plate 108 is attached, as one constituting member of the head nozzle 100 to be assembled by the assembling apparatus 10, and the second position adjustment mechanism 16 adjustably defines the mounting position of the heater board 102 as the other constituting member, which is precisely aligned and fixed on the upper surface of a distal end portion of a base member 208.

The first position adjustment mechanism 14 comprises a first x-axis stage 18 which is directly placed on the platen 12, and is movable along an x-axis direction (in a direction perpendicular to the drawing surface) with respect to the platen 12, a first z-axis stage 20 which is placed on the first x-axis stage 18 and is movable along a z-axis direction (up-and-down direction in FIG. 6) with respect to the first x-axis stage 18, a first y-axis stage 22 which is placed on the first z-axis stage 20 and is movable along a y-axis direction (right-and-left direction in FIG. 6) with respect to the first z-axis stage 20, an attaching mechanism 26, the proximal end portion of which is placed on the first y-axis stage 22 via a spacer 24, and on the distal end portion of which the top plate 104 is detachably attached, and a first aligning mechanism 27 for aligning the top plate 104 detached from the attaching mechanism 26 and placed on the heater board 102 with respect to the heater board 102. The arrangement of the attaching mechanism 26 and the first aligning mechanism 27 will be described in detail later.

On the other hand, the second position adjustment mechanism 16 comprises a second x-axis stage 28 which is directly placed on the platen 12 to be adjacent to the first position adjustment mechanism 14, and is movable along the x-axis direction with respect to the platen 12, a second z-axis stage 30 which is placed on the second x-axis stage 28, and is movable along the z-axis direction with respect to the second x-axis stage 28, a second y-axis stage 32 which is placed on the second z-axis stage 30, and is movable along the y-axis direction with respect to the second z-axis stage 30, a second aligning mechanism 33, arranged on the second y-axis stage 32, for fixing the base member 208 to which the heater board 102 is fixed, to be precisely aligned with the second y-axis stage 32, and a joint force generating mechanism 34 for causing the top plate 104 to be bonded on the heater board 102 with a predetermined join force. The arrangement of the second aligning mechanism 33 and the joint force generating mechanism 34 will be described in detail later.

Although not shown, the stages 18, 20, 22, 28, 30 and 32 respectively have drive motors, and these drive motors are connected to a control unit 38 for controlling the overall apparatus via corresponding drivers 36a, 36b, 36c, 36d, 36e and 36f. These drive motors are driven under the control of the control unit 38 so that the top plate 104 is located at a predetermined position above the heater board 102 at the first position adjustment mechanism 14, and the heater board 102 is located at a predetermined position with respect to the platen 12 in the second position adjustment mechanism 16.

The control unit 38 must precisely detect the position of the top plate 104 so as to precisely align the top plate 104. For this purpose, a first position detection mechanism 40 for precisely detecting the position of the top plate 104 on the basis of an image obtained by photographing the top plate 104 is connected to the control unit 38 via an image processor 44. The control unit 38 must precisely detect the position of the heater board 102 so as to precisely align the heater board 102. For this purpose, a second position detection mechanism 42 for precisely detecting the position of the heater board 102 on the basis of an image obtained by photographing the heater board 102 is connected to the control unit 38 via the image processor 44.

The first position detection mechanism 40 is arranged in front of the orifice plate 108 of the top plate 104 precisely held at the distal end of the attaching mechanism 26 (to be described in detail later). The mechanism 40 comprises a first objective lens 40a, a first objective lens holder 40b for holding the first objective lens 40a, a first projection illumination device 40c, a first light source 40d for the first projection illumination device 40c, a first optical system 40e for judging a focusing state, a first lens barrel 40f for storing these optical devices, and first ITV camera 40g for photographing an image of the orifice plate 108 observed through the first objective lens 40a.

Image data output from the first ITV camera 40g is sent to the above-mentioned image processor 44 via a first signal converter 46. The first optical system 40e for judging a focusing state is connected to the control unit 38 via a first focusing state detector 48. The first position detection mechanism 40 is mounted and fixed on the platen 12 via a first column (not shown).

The second position detection mechanism 42 is arranged above the heater board 102 which is precisely placed on the second y-axis stage 32 by the second aligning mechanism 33 (to be described in detail later). The mechanism 42 comprises a second objective lens 42*a*, a second objective lens holder 42*b* for holding the second objective lens 42*a*, a second projection illumination device 42*c*, a second light source 42*d* for the second projection illumination device 42*c*, a second optical system 42*e* for judging a focusing state, a second lens barrel 42*f* for storing these optical devices, and a second ITV camera 42*g* for photographing an image of the heater board 102 observed through the second objective lens 42*a*.

Image data output from the second ITV camera 42*g* is sent to the above-mentioned image processor 44 via a second signal converter 50. The second optical system 42*e* for judging a focusing state is connected to the control unit 38 via a second focusing state detector 52. The second position detection mechanism 42 is mounted and fixed on the platen 12 via a second column (not shown).

In this embodiment, an assembling operation position $\alpha$ is defined at a position where the optical axis of the first objective lens 40*a* in the first position detection mechanism 40 intersects with the optical axis of the second objective lens 42*a* in the second position detection mechanism 42. At the assembling operation position $\alpha$, it is preferable that the above-mentioned two optical axes correctly intersect with each other. However, even if these axes do not intersect with each other in practice, no problem is posed as long as a calibration operation (to be described later) is executed. In practice, it is very difficult to align the two optical axes, so that the two optical axes correctly intersect with each other. Thus, under a condition that the two optical axes do not intersect with each other like in this embodiment, a shift amount $\Delta x$ between the two optical axes is calculated by the calibration operation, and the calculated shift amount $\Delta x$ is numerically taken into consideration in the position adjustment operations in the first and second position adjustment mechanisms 14 and 16. As a result, the shift amount $\Delta x$ can be substantially ignored. Note that the calibration operation for calculating the shift amount $\Delta x$ will be described in detail later.

The assembling apparatus 10 comprises a temporary adhering mechanism 54. The temporary adhering mechanism 54 adheres the heater board 102 and the top plate 104 via an ultraviolet-setting adhesive after the discharge orifices 106 and the corresponding discharge heaters 112 are aligned with each other, so that the relative positional relationship therebetween is left unchanged, in other words, the heater board 102 and the top plate 104 are temporarily adhered to each other. The temporary adhering mechanism 54 comprises a pair of light guides 56, which are located on the two sides of the distal end portion of the attaching mechanism 26, so that their distal ends are directed toward an adhesive applied portion, and an ultraviolet light source 58, connected to the proximal end portions of the two light guides 56, for emitting ultraviolet rays.

The image processor 44 calculates the positions of the discharge orifices 106 formed in the orifice plate 108, and the positions of the discharge heaters 112 arranged on the heater board 102 on the basis of image data obtained from the first and second ITV cameras 40*g* and 42*g* via the first and second signal converters 46 and 50, and sends the calculation results to the control unit 38. The image processor 44 is connected to an ITV monitor 64 for checking measured images, a keyboard 62 for inputting an apparatus adjustment program, and data, and a CRT monitor 60 for displaying data, thus establishing a man-machine interface.

The control unit 38 calculates data input from the first and second focusing state detectors 48 and 52, and the image processor 44 in a predetermined algorithm, and appropriately controls the drive operations of the corresponding stages 18, 20, 22, 28, 30, and 32 via the stage drivers 36*a* to 36*f* on the basis of the calculation results, thereby adjusting the relative position between the top plate 104 and the heater board 102, so that the discharge orifices 106 coincide with the corresponding discharge heaters 112. After the orifices and the heaters coincide with each other, the control unit 38 starts the temporary adhering mechanism 54 to operate the ultraviolet light source 58, and executes a control operation for setting an adhesive interposed between the heater board 102 and the top plate 104.

The control unit 38 is connected to a manipulation panel 66 for manipulating the assembling apparatus 10, a keyboard 68 for setting and changing an operation program, a CRT monitor 70 for displaying data, a printer 72 for recording data, a data disk 74 for storing data, and a program disk 76 for storing the operation program, thus establishing a man-machine interface.

Attaching Mechanism 26

The attaching mechanism 26 to which the top plate 104 is attached will be described in detail below with reference to FIG. 6.

The attaching mechanism 26 comprises a main body 26*a* mounted and fixed on the above-mentioned first y-axis stage 22 via the spacer 24. A pair of parallel suction members 26*b* and 26*c* as fingers for holding the top plate 104, more specifically, the ink reception port 118 formed on the upper surface of the top plate 104 from side directions are arranged with a predetermined interval therebetween on the distal end portion of the main body 26*a* in a projecting forward state (in the y-axis direction). These suction members 26*b* and 26*c* are formed of ultraviolet transmission members, more specifically, transparent glass plates.

Suction holes 26*d* and 26*e* are respectively open to the lower surfaces of these suction members 26*b* and 26*c*. The suction holes 26*d* and 26*e* are respectively defined by openings at the end portions of communication pipes 26*f* and 26*g* extending through the corresponding suction members 26*b* and 26*c*, and are selectively connected to a negative pressure generation mechanism and a positive pressure generation mechanism via (neither are shown) via selector valves (not shown).

When the selector valves are connected to the negative pressure generation mechanism, the top plate 104 is held by suction on the lower surfaces of the suction members 26*b* and 26*c* via suction forces generated in these suction holes 26*d* and 26*e*. On the other hand, when the selector valves are connected to the positive pressure generation mechanism, the top plate 104 held by suction on the suction members 26*b* and 26*c* so far is forcibly released downward from the suction members 26*b* and 26*c* by air ejected (reversely ejected) from these suction holes 26*d* and 26*e*.

In this manner, when the top plate 104 is held by suction on the lower surfaces of the pair of suction members 26*b* and 26*c*, the cylindrical ink reception port 118 of the top plate 104 is just fitted between the suction members 26*b* and 26*c*, and the orifice plate 108 faces forward.

First Aligning Mechanism 27

The attaching mechanism 26 comprises the first aligning mechanism 27 for precisely aligning the position of the top plate 104, which is released from the attaching mechanism 26, and is dropped on the heater board 102, with respect to the heater board 102.

The first aligning mechanism comprises the x-axis aligning unit 27A for aligning the top plate 104 along the x-axis direction of the heater board 102, i.e., along the aligning directions of the discharge orifices 106 and the discharge heaters 112, so that the corresponding discharge orifices 106 and the discharge heaters 112 coincide with each other, and a y-axis aligning unit 27B for aligning the top plate 104 along the y-axis direction, so that the rear surface of the orifice plate 108 is brought into tight contact with the front end face of the heater board 102.

X-axis Aligning Unit 27A

Figure 6:
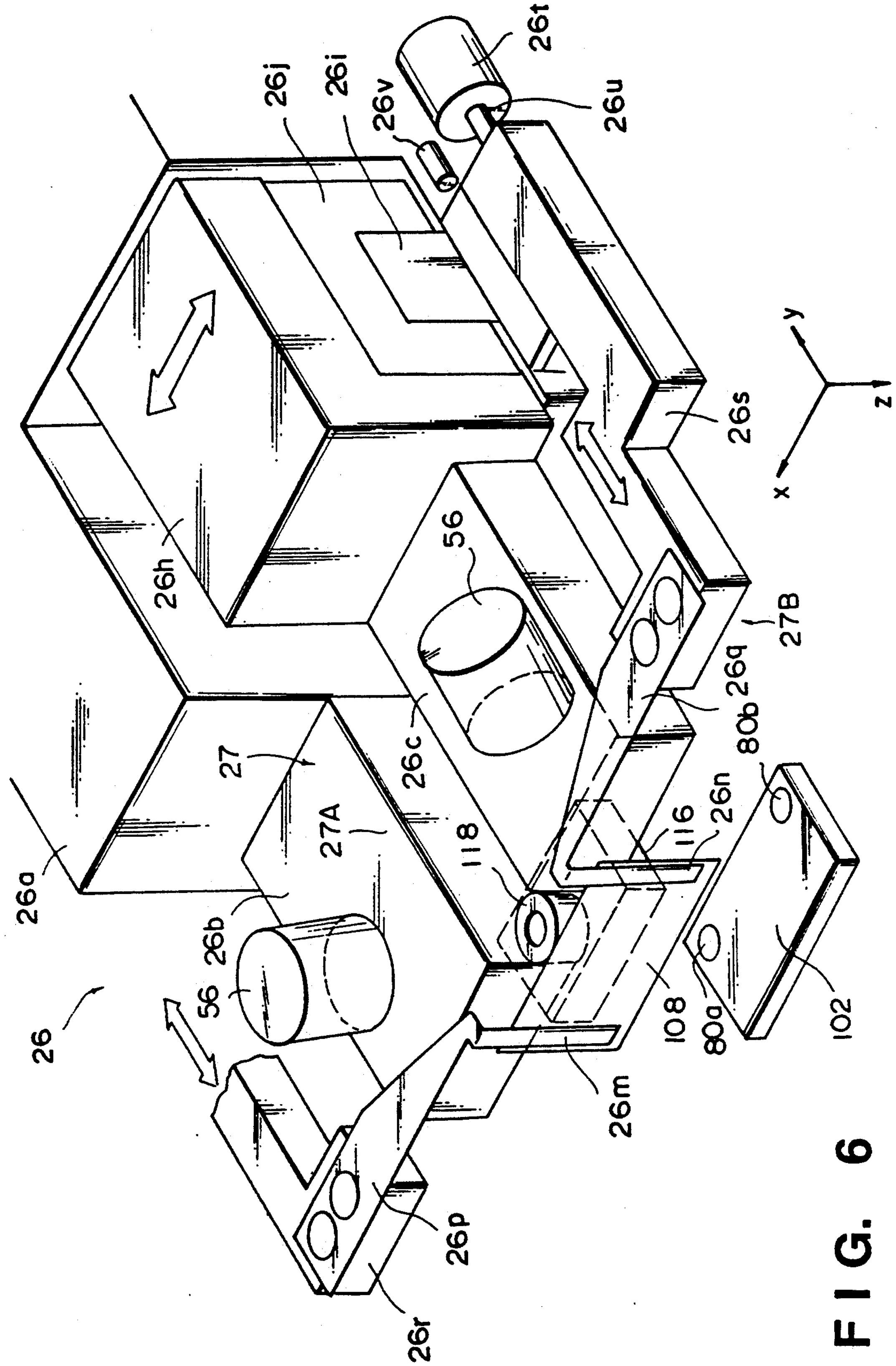
FIG. 6 is a perspective view schematically showing the construction of an attaching mechanism in a first position adjustment mechanism and a first aligning mechanism.

In the x-axis aligning unit 27A, the first suction member **26*b* on the far side in FIG. 6 is defined as a reference side in this embodiment, and the suction member 26*b* on the reference side is fixed to the main body 26*a*. In contrast to this, the second suction member 26*c* on the near side in FIG. 6 is supported on the main body 26*a* to be movable along the x-axis direction. In the x-axis aligning unit 27A, the opposing end faces of the pair of suction members 26*b* and 26*c*, i.e., the opposing end faces for defining a space, in which the cylindrical ink reception port 118** is fitted, therebetween, are defined as position regulating surfaces.

A connection member **26*h* extending to an intermediate portion of the main body 26*a* is integrally connected to the rear portion of the movable suction member 26*c*. On the other hand, a guide shaft 26*i* extending along the x-axis direction is mounted on the main body 26*a*. The connection member 26*h* is supported on the guide shaft 26*i* via a slide guide 26*j*** to be movable in the x-axis direction.

A first drive cylinder (not shown) is mounted on the main body **26*a* to oppose an intermediate portion of the connection member 26*h*. A piston rod of the first drive cylinder is projected/retracted along the x-axis direction, and its distal end is connected to the above-mentioned connection member 26*h***.

In this manner, when the first drive cylinder reciprocally drives the corresponding piston rod at high speed, the suction member **26*c* connected via the connection member 26*h*** is reciprocally driven, i.e., vibrated at high speed in the x-axis direction.

Y-axis Aligning Unit 27B

As shown in FIG. 6, the y-axis aligning unit 27B comprises a pair of parallel engaging pieces **26*m* and 26*n* which extend downward to be separated from each other by a given interval. The engaging pieces 26*m* and 26*n* can be engaged with the front surface of the orifice plate 108 of the top plate 104 placed on the heater board 102. The engaging pieces 26*m* and 26*n* are arranged in correspondence with the pair of suction members 26*b* and 26*c* so as to be located outside the corresponding position regulating surfaces. The upper ends of these engaging pieces 26*m* and 26*n* are connected to the inner end portions of connection pieces 26*p* and 26*q* extending to positions outside the outer edges of the suction members 26*b* and 26*c* along the upper edges of the front end faces of the corresponding suction members 26*b* and 26*c*. The outer end portions of these connection pieces 26*p* and 26*q* are mounted on the front end portions of coupling members 26*r* and 26*s*** extending along the y-axis direction.

Second drive cylinders **26*t* extending along the y-axis direction are arranged on the two edges of the main body 26*a*. Piston rods 26*u* of the second drive cylinders 26*t* are projected/retracted along the y-axis direction, and their distal ends are respectively coupled to the rear end portions of the above-mentioned coupling members 26*r* and 26*s***.

In this manner, when the second drive cylinders **26*t* reciprocally drive the corresponding piston rods 26*u* at high speed, the engaging pieces 26*m* and 26*n* connected driven, i.e., vibrated at high speed in the y-axis direction. Thus, the top plate 104 is aligned in the y-axis direction, so that the orifice plate 108 is brought into tight contact with the front end face of the heater board 102**.

At the rear ends of the coupling members **26*r* and 26*s*, sensors 26*v* are arranged to detect that the engaging pieces 26*m* and 26*n* have engaged the orifice plate 108 and have brought the orifice plate 108 into contact with the front end faces of the heater board 102, upon moving the coupling members 26*r* and 26*s* respectively along the y-axis direction. The sensors 26*v* are constituted by, e.g., a proximity switch. As shown in FIG. 6, though one sensor 26*v* is mounted only on the coupling member 26*s* on the near side in FIG. 6, it goes without saying that the sensor 26*v* is also mounted on the coupling member 26*r*** on the far side.

Since the attaching mechanism 26 has the above-mentioned arrangement, the top plate 104 held by suction on the pair of suction members **26*b* and 26*c* is moved to the predetermined position above the heater board 102 under the drive control of the first position adjustment mechanism 14, and when the top plate 104 is released from the suction force, it is dropped onto the heater board 102. At the dropped position, the x-axis position of the top plate 104 with respect to the heater board 102 is defined upon operation of the x-axis aligning unit 26A. In addition, the y-axis position of the top plate 104 with respect to the heater board 102 is defined upon operation of the y-axis aligning unit 26B. The position adjustment operation in the attaching mechanism 26** will be described in detail later.

Second Aligning Mechanism 33

The arrangement of the second aligning mechanism 33 for precisely aligning and attaching the base member 208, to which the heater board 102 is attached in advance, onto the second y-axis stage 32 will be described below with reference to FIGS. 7 to 9.

The second aligning mechanism 33 comprises an x-axis aligning unit 33A for aligning the base member 208 on the second y-axis stage 32 in the x-axis direction, and a y-axis aligning unit 33B for aligning the base member 208 in the y-axis direction like in the first aligning mechanism 27, and also comprises a z-axis aligning unit 33C for aligning the base member 208 in the z-axis direction.

Figure 7:
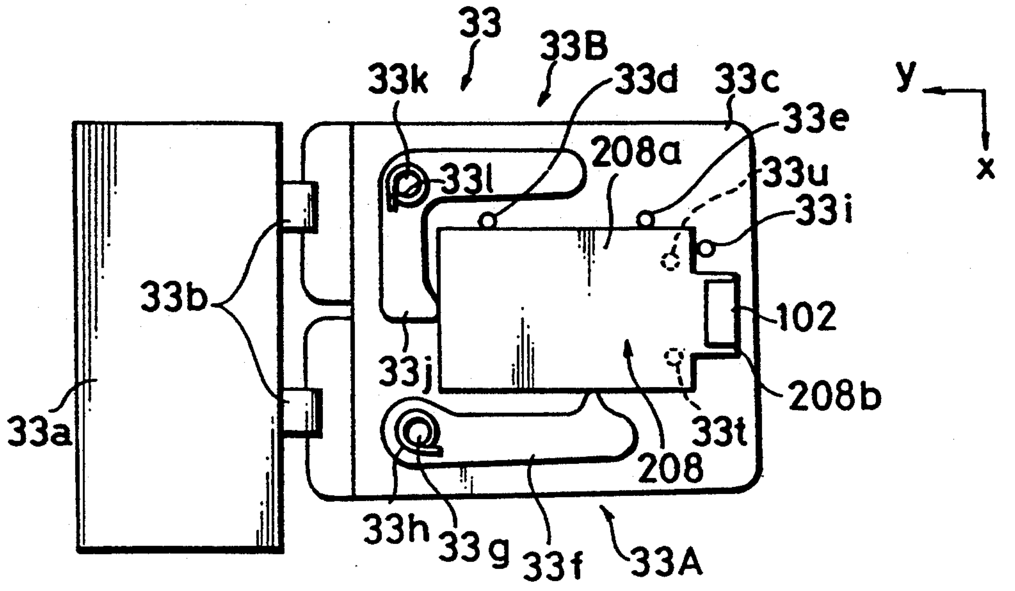
FIG. 7 is a top plan view showing the constriction of a second aligning mechanism in a second position adjustment mechanism.

As is apparent from FIG. 7, the base member 208 to be aligned by the second aligning mechanism 33 is integrally formed by a rectangular main body portion **208*a*, and a heater board attaching portion 208*b* which projects forward from the central portion of the front edge of the main body portion 208*a*, and on the upper surface of which the heater board 102** is attached and fixed.

Note that the heater board 102 is attached and fixed in advance on the heater board attaching portion 208*b* with predetermined precision. Therefore, when the base member 208 to which the heater board 102 is attached is aligned with the second y-axis stage 32, the heater board 102 is aligned with the second y-axis stage 32.

Figure 8:
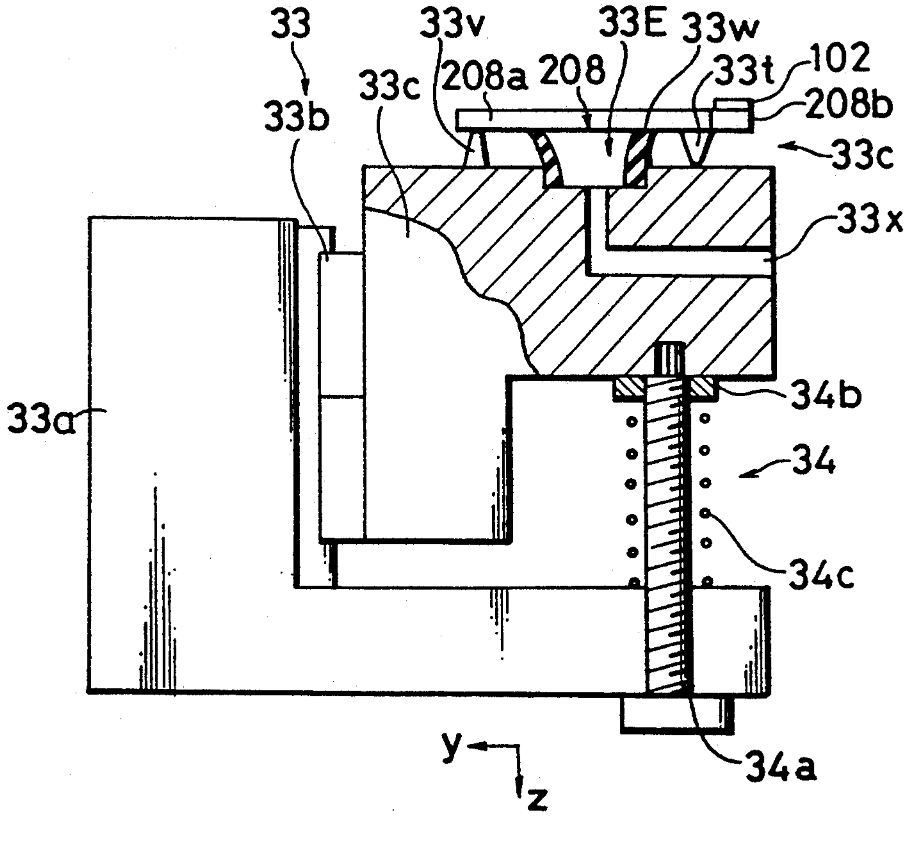
FIG. 8 is a sectional side view showing the structure of a joint force generating mechanism as well as the second aligning mechanism.

More specifically, the second aligning mechanism 33 comprises an attaching main body 33*a* mounted on the second y-axis stage 32, and having an L-shaped side surface, and an aligning base 33*c* vertically movably supported on the upright inner surface of the main body 33*a* via a slide guide 33*b*, as shown in FIGS. 7 and 8.

X-axis Aligning Unit 33A

A pair of upward x-axis aligning projections 33*d* and 33*e* are integrally formed on the aligning base 33*c* to be juxtaposed in the y-axis direction to serve as the x-axis aligning unit 33A, as shown in FIG. 7. When one side edge along the y-axis of the main body portion 208*a* of the base member 208 is brought into contact with these x-axis aligning projections 33*d* and 33*e*, the x-axis position of the base member 208 is uniquely defined, i.e., the base member 208 is aligned in the x-axis direction.

In order to force a state wherein one side edge along the y-axis of the main body portion 208*a* of the base member 208 is brought into contact with these x-axis aligning projections 33*d* and 33*e*, an x-axis regulating lever 33*f* is arranged to be able to be in contact with the other side edge opposite to one side edge of the base member 208, which one side edge is in contact with the x-axis aligning projections 33*d* and 33*e*. The proximal end portion of the x-axis regulating lever 33*f* is axially supported to be pivotal about a first support shaft 33*g*. The lever 33*f* receives a pivoting biasing force in a counterclockwise direction in FIG. 7 by a first torsion spring 33*h*. Note that the distal end as a contact end of the x-axis regulating lever 33*f* is in contact with substantially the central portion of the other side edge of the base member 208.

Y-axis Aligning Unit 33B

An upward y-axis aligning projection 33*i* is integrally formed on the aligning base 33*c* to be adjacent to one x-axis aligning projection 33*e* to serve as the y-axis aligning unit 33B. When the front edge along the x-axis of the main body portion 208*a* of the base member 208 whose x-axis position is defined in advance is brought into contact with the y-axis aligning projection 33*i*, the y-axis position of the base member 208 is uniquely defined, i.e., the base member 208 is aligned in the y-axis direction.

In order to force a state wherein the front edge along the x-axis of the main body portion 208*a* of the base member 208 is brought into contact with the y-axis aligning projection 33*i*, a substantially L-shaped y-axis regulating lever 33*j* is arranged to be able to be in contact with the rear edge opposite to the front edge of the base member 208 in contact with the y-axis aligning projection 33*i*. An intermediate portion (i.e., a bent portion constituting an L shape) of the y-axis regulating lever 33*j* is axially supported to be pivotal about a second support shaft 33*k*. The lever 33*j* receives a pivoting biasing force in a counterclockwise direction in FIG. 7 by a second torsion spring 33*l*. Note that the rear end as a contact end of the y-axis regulating lever 33*j* is in contact with substantially the central portion of the rear edge of the base member 208.

When the base member 208 is attached/detached to/from the aligning base 33*c*, the biasing forces of the x- and y-axis levers 33*f* and 33*j* must be released. For this purpose, in this embodiment, a release mechanism 33D is arranged.

Figure 9:
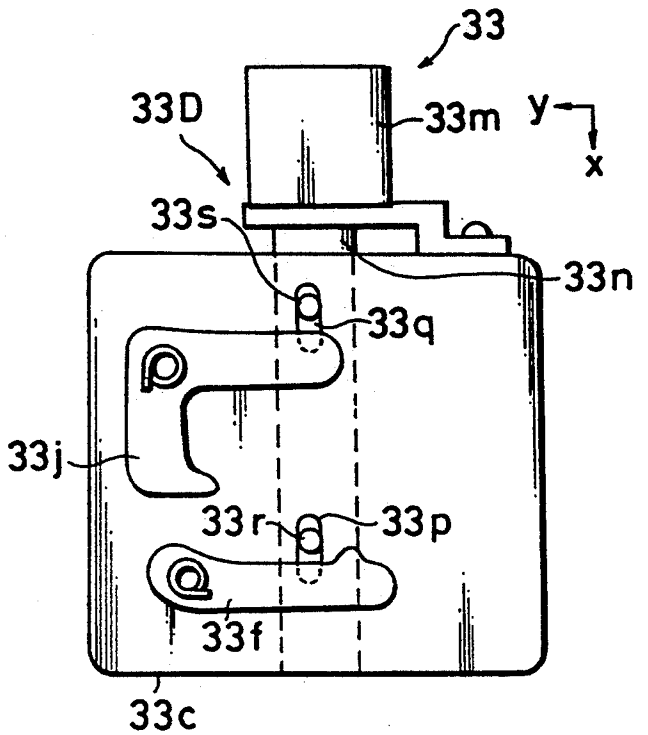
FIG. 9 is a top plan view showing the construction of a release mechanism in the second aligning mechanism.

As shown in FIG. 9, the release mechanism 33D comprises a release cylinder 33*m* arranged on one side edge of the aligning base 33*c*, a piston rod 33*n* projecting from the release cylinder 33*m* to be reciprocal along the x-axis direction, and extending through the aligning base 33*c*, and a pair of release pins 33*r* and 33*s*, which stand upright on the piston rod 33*n*, slightly project from the upper surface of the aligning base 33*c* via through holes 33*p* and 33*q* formed in the aligning base 33*c* to extend along the x-axis direction, and can be respectively brought into contact with the x- and y-axis regulating levers 33*f* and 33*j* from the clockwise direction side.

In the release mechanism 33D, the release cylinder 33*m* biases the piston rod 33*n* to be set in a retracted state in a non-release state. As a result, the pair of release pins 33*r* and 33*s* are separated from the corresponding x- and y-axis regulating levers 33*f* and 33*j*. In this manner, in the non-release state, the x- and y-axis regulating levers 33*f* and 33*j* are pivoted counterclockwise by the biasing force from the corresponding torsion springs 33*h* and 33*l*, thereby aligning and holding the base member 208.

In a release state, the release cylinder 33*m* biases the piston rod 33*n* in a projecting state. As a result, the pair of release pins 33*r* and 33*s* are brought into contact with the corresponding x- and y-axis regulating levers 33*f* and 33*j*, and pivot them clockwise against the biasing forces of the corresponding torsion springs 33*h* and 33*l*. Therefore, the contact ends of the x- and y-axis regulating levers 33*f* and 33*j* are respectively separated from the other side edge and the rear edge of the base member 208, thereby releasing the aligning/holding operation of the base member 208.

Z-axis Aligning Unit 33C

As shown in FIG. 8, the above-mentioned z-axis aligning unit 33C is formed with a pair of first and second projections 33*t* and 33*u* (although FIG. 8 illustrates only the first projection 33*t*, the arranging positions of the first and second projections 33*t* and 33*u* are indicated by broken lines in FIG. 7) which are juxtaposed in the x-axis direction on the lower surface of the distal end portion of the base member 208 to project downward, and a third projection 33*v* formed on the central portion of the upper surface of the rear end portion of the aligning base 33*c* to project upward.

The projecting lengths of these first to third projections 33*t* to 33*v* are precisely defined to be equal to each other. As a result, when the first and second projections 33*t* and 33*u* are brought into contact with the upper surface of the aligning base 33*c*, and the third projection 33*v* is brought into contact with the lower surface of the base member 208, the z-axis position of the base member 208 on the aligning base 33*c* is precisely defined.

In this embodiment, in order to reliably establish the above mentioned contact states, a suction mechanism 33E for drawing the base member 208 toward the aligning base 33*c* by suction is arranged. As shown in FIG. 8, the suction mechanism 33E is constituted by a suction pad 33*w* arranged on the aligning base 33*c*, and having an upper surface opening, and a connection pipe 33x extending through the aligning base 33c so as to connect the suction pad 33w and a suction source (not shown).

The height of the suction pad 33w is slightly larger than the heights of the above-mentioned three projections 33t, 33u, and 33v. As a result, the overall opening edge of the suction pad 33w is in tight contact with the lower surface of the base member 208, while the base member 208 is placed on the aligning base 33c. When the suction source (not shown) is started, the base member 208 is forcibly drawn toward the aligning base 33c. As a result, a state wherein the first and second projections 33t and 33u are reliably in contact with the upper surface of the aligning base 33c, and the third projection 33v is reliably in contact with the lower surface of the base member 208 is forcibly set.

Since the second aligning mechanism 33 has the arrangement described above, the x-, y-, and z-axis positions of the base member 208 are precisely aligned on the aligning base 33c. As a result, in this embodiment, when the top plate 104 is mounted on the heater board 102, the position of the top plate 104 relative to the heater board 102 need only be defined via the first aligning mechanism 27.

Joint Force Generating Mechanism 34

The joint force generating mechanism 34 for, when the top plate 104 is aligned and placed on the heater board 102, generating a joint force therebetween will be described below with reference to FIG. 8.

The joint force generating mechanism 34 comprises a guide shaft 34a extending through the distal end portion of the above-mentioned main body 33a to be vertically movable. The upper end of the guide shaft 34a is fixed to the lower surface of the aligning base 33c. A washer 34b for adjusting a joint force is threadably engaged with the upper end portion of the guide shaft 34a. When the washer 34b is rotated, the axial position of the washer 34b with respect to the guide shaft 34a is changed.

A coil spring 34c for generating a joint force is wound around the outer circumferential surface of the guide shaft 34a. The upper end of the coil spring 34c is locked with the lower surface of the washer 34b, and its lower end is locked with the upper surface of the main body 33a. The coil spring 34c is contracted to some extent since it supports the weights of the aligning base 33c and components placed thereon. When the coil spring 34c is further contracted by a predetermined amount from an initial state wherein it is contracted to some extent, it produces a predetermined elastic repulsion force, and this elastic repulsion force is defined as the joint force.

Since the joint force generating mechanism 34 has the arrangement as described above, when the top plate 104 is placed on the heater board 102, the top plate 104 is pressed against the heater board 102, so that the aligning base 33c on which the heater board 102 is aligned and placed is moved downward by the predetermined amount. As a result, the predetermined joint force is produced between the top plate 104 and the heater board 102.

Note that the joint force can be changed as follows. That is, the washer 34b is rotated to be displaced along the axial direction of the guide shaft 34a, thereby changing the initial length of the coil spring 34c.

Calibration Block 78

Figure 10:
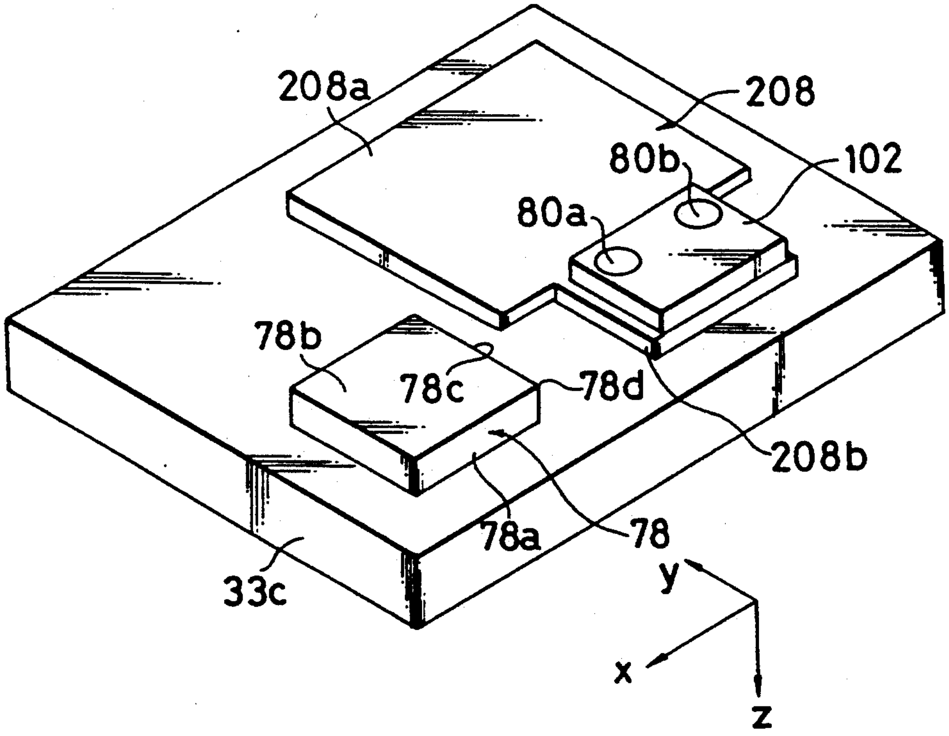
FIG. 10 is a perspective view showing an attaching state of a calibration block.

As shown in FIG. 10, a calibration block 78 used in a calibration operation (to be described in detail later) is fixed on the aligning base 33c of the above-mentioned second aligning mechanism 33. The calibration block 78 is precisely arranged at a position to be separated along the x-axis from the heater board 102 on the base member 208 precisely aligned at the predetermined position by the second aligning mechanism 33, and is formed into a rectangular parallelopiped shape.

In particular, a first calibration surface 78a is defined from the front end face of the rectangular parallelopiped calibration block 78. The first calibration surface 78a precisely vertically extends along the x-axis direction, and extends within the same vertical plane as the front end face of the heater board 102. A second calibration surface 78b is defined from the upper surface of the rectangular parallelopiped calibration block 78. The second calibration surface 78b precisely horizontally extends along the z-axis direction, and extends within the same horizontal plane as the upper surface of the heater board 102. Furthermore, a third calibration surface 78c is defined from a side surface on the side of the rectangular parallelopiped calibration block 78 on which the heater board 102 is arranged. The third calibration surface 78c precisely vertically extends along the y-axis direction.

Figure 11:
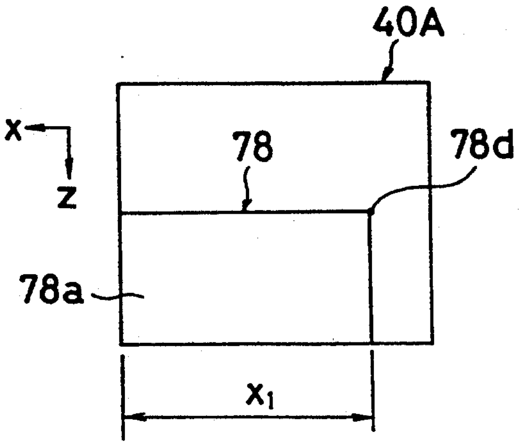
FIG. 11 is a digram showing an image of the calibration block photographed by a first ITV camera in a first position detection mechanism.
Figure 12:
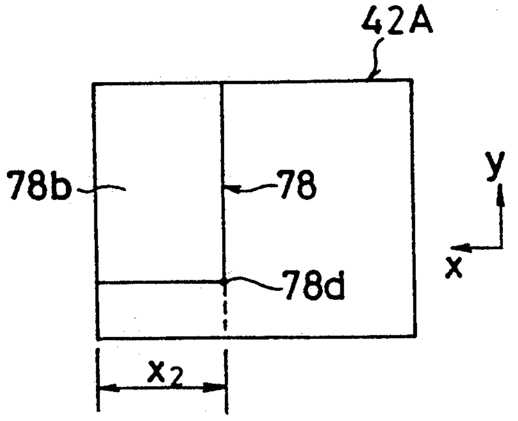
FIG. 12 is a diagram showing an image of the calibration block photographed by a second ITV camera in a second position detection mechanism.

A calibration reference point 78d is defined by an intersection of the first to third calibration surfaces 78a to 78c. As a result, when the calibration block 78 is photographed by the first position detection mechanism 40, only the first calibration surface 78a is photographed, as shown in FIG. 11, and the calibration reference point 78d is photographed as an intersection of a corner portion located on an upper right portion of a screen 40A. When the calibration block 78 is photographed by the second position detection mechanism 42, only the second calibration surface 78b is photographed, as shown in FIG. 12, and the calibration reference point 78d is photographed as an intersection of a corner portion located on a lower right portion of a screen 42A.

In FIG. 10 used for a description of the calibration block 78, reference numerals 80a and 80b denote adhesives for temporarily adhering the top plate 104 and the heater board 102. These adhesives 80a and 80b have ultraviolet-setting characteristics, i.e., are set upon radiation of ultraviolet rays. The adhesives 80a and 80b are applied in advance to the two end portions of the rear edge of the heater board 102, as shown in FIG. 10.

Assembling Method of Nozzle Head 100 in Assembling Apparatus 10

Figure 13:
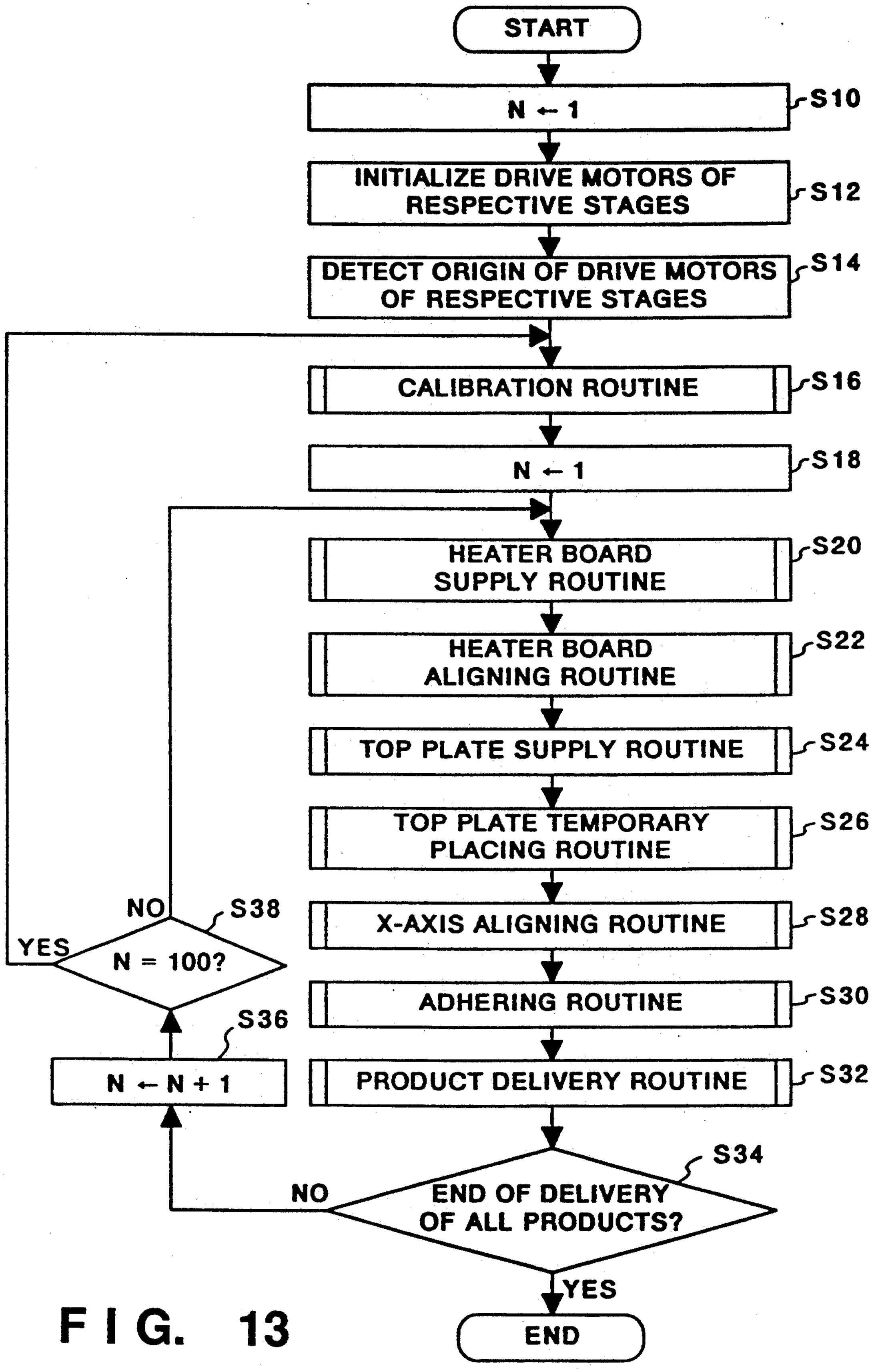
FIG. 13 is a flowchart showing a control procedure in an assembling apparatus according to the present invention.

An assembling method of the nozzle head 100 under the control of the control unit 38 in the assembling apparatus 10 with the above-mentioned arrangement will be described in detail hereinafter with reference to FIG. 13 and subsequent drawings.

Procedures of Assembling Method

The procedures of this assembling method will be briefly described below with reference to the flowchart shown in FIG. 13.

When an assembling operation is instructed, a variable N indicating the number of times of assembling operations is set to be "1" in step S10. In step S12, the drive motors for the respective stages 18, 20, 22, 28, 30, and 32 are initialized. In step S14, origin detection of the drive motors for the respective stages 18, 20, 22, 28, 30, and 32 is executed. Upon execution of steps S12 and S14, the stages 18, 20, 22, 28, 30, and 32 can be precisely moved to arbitrary positions defined with respect to the platen 12.

Thereafter, in step S16, the above mentioned calibration operation is executed by utilizing the calibration block 78 so as to calculate in advance a shift amount of the detection positions of the first and second position detection mechanisms 40 and 42 as the calibration amount $\Delta x$, thereby calibrating a shift between the detection positions of the first and second position detection mechanisms 40 and 42. Note that the calibration operation is one characteristic feature of the present invention, and will be described in detail later as a subroutine. Upon completion of the calibration operation in step S16, the variable N is set to be "1" again in step S18, and the flow advances to step S20.

In step S20, the base member 208 to which the heater board 102 is attached in advance is supplied from a supply position to a position above the second aligning mechanism 33 of the second position adjustment mechanism 16 via a supply robot (not shown). In step S22, the supplied base member 208 is precisely aligned.

This aligning operation includes an operation for executing aligning operations in three axial directions with respect to the main body 33*a* on the basis of the operation of the second aligning mechanism 33, an operation for precisely measuring a shift amount ($x_h$) of a discharge heater 112*c*, located at the center as a reference position, of discharge heaters 112*a* to 112*e* on the heater board 102 from the assembling operation position $\alpha$ in the x-axis direction as the aligning direction of these discharge heaters 112*a* to 112*e*, and an operation for precisely aligning the upper surface of the heater board 102 to the assembling operation position $\alpha$ in the z-axis direction so as to precisely focus an image, so that the shift amount measurement is executed on the basis of an image photographed by the second ITV camera 42*g*.

Note that the supply operation of the base member 208, i.e., the heater board 102, and the aligning operation will be described in detail later as subroutines.

After the supply and aligning operations of the heater board 102, in step S24, the top plate 104 is supplied from its storage position to the first aligning mechanism 27 of the first position adjustment mechanism 14 via a supply robot (not shown). In step S26, the supplied top plate 104 is temporarily placed on the heater board 102 on the base member 208 which is aligned in advance via the second aligning mechanism 33 in step S22. Note that the supply and temporary placing operations of the top plate 104 will be described in detail later as subroutines.

When the heater board 102 and the top plate 104 to be assembled are supplied, and the top plate 104 is temporarily placed on the aligned heater board 102, the relative positional relationship between the heater board 102 and the top plate 104 in the x-axis direction is precisely defined in step S28, and the heater board 102 and the top plate 104 are adhered to each other in step S30. Upon completion of the adhering operation, an assembly as a product is delivered to a product delivery position via a robot (not shown) in step S32. The x-axis aligning operation and the adhering operation will be described in detail later as subroutines.

In step S34, it is checked if all the assembling operations are ended, and the delivery operations of all the products are ended. If NO in step S34, i.e., if it is determined that the assembling operations are not ended yet, and are being executed, the flow advances to step S36 to increment the variable N by "1". In step S38, it is checked if the variable N has reached a predetermined value. If NO in step S38, i.e., if it is determined that the number of times of assembling operations N is less than the predetermined value, more specifically, if it is determined that the assembling operations are executed less than the predetermined number of times after the latest calibration operation is executed, it is determined that reliability of the calculated calibration amount $\Delta x$ is maintained, and the flow returns to step S20 so as to execute another assembling operation without executing a new calibration operation. Thus, the assembling control procedures are repetitively executed.

On the other hand, if YES in step S38, i.e., if it is determined that the number of times of assembling operations N has reached the predetermined value after the latest calibration operation is executed, there is a possibility of a change in calibration amount $\Delta x$ described above. Thus, the flow returns to step S16 to execute the calibration operation again, i.e., to calculate a new calibration amount $\Delta x$, and the assembling control procedures are repetitively executed.

More specifically, when the assembling precision is on the order of millimeters, the above-mentioned calibration operation is executed first, and the obtained calibration amount $\Delta x$ can be used throughout the work time of that day without posing any problem. However, like in this embodiment, when the assembling precision on the order of microns is required, a change in calibration amount $\Delta x$ upon a change in temperature considerably influences the assembling precision. Meanwhile, the calibration operation is preferably executed for each assembling operation in consideration of the above situation. However, when the calibration operation is executed for each assembling operation, an assembling time is prolonged, assembling efficiency is impaired, and product cost is adversely influenced. In order to maintain both high assembling precision and high assembling efficiency, in this embodiment, the calibration operation is re-executed for every predetermined number of assembling operations.

After the calibration operation is executed in step S16, the variable N is reset to "1" in step S18. Therefore, the number of times of assembling operations in this assembling operation is counted as one, and the number of times of assembling operations is incremented by "1" in the subsequent assembling operations.

If YES in step S34, i.e., if it is determined that all the assembling operations are ended, and the delivery operations of all the products are ended, this assembling control procedure is ended at that time.

The individual control procedures described in the above-mentioned assembling control procedure will be described in detail below as subroutines. In practice, in order to achieve printing precision corresponding to a density as high as 360 dpi, the top plate 104, which integrally comprises the orifice plate 108 in which a large number of discharge orifices 106 are formed at a constant pitch within a length of about 4.5 mm, is assembled on the heater board 102, on which 68 discharge heaters 112 are formed at the same aligning pitch, so that at least 64 discharge orifices 106 and discharge heaters 112 correspond to each other. Therefore, very precise aligning operations, and an operation for delicately applying a joint force are required.

Figure 14:
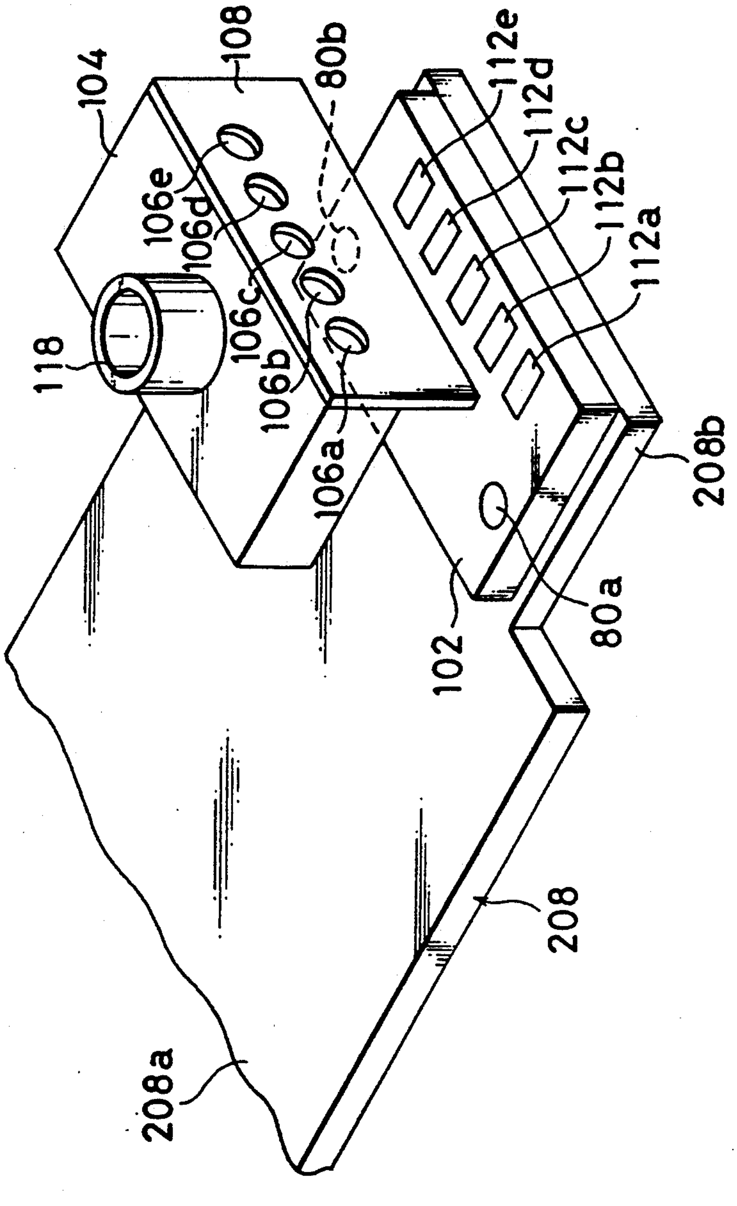
FIG. 14 is a perspective view schematically showing the heater board and a top plate in order to clarify the explanation of the assembling method.

However, if the assembling control procedure is to be described with reference to illustrations of 68 discharge orifices 106 and a large number of discharge heaters 112 as they are, the description becomes indistinct and complicated Thus, in the following description, for the sake of simplicity, assume that five discharge orifices 106, more specifically, first to fifth discharge orifices 106*a* to 106*e*, are formed on the orifice plate 108, and five discharge heaters 112, more specifically, first to fifth discharge heaters 112*a* to 112*e*, are formed on the heater board 102, as shown in FIG. 14.

Detailed Description of Subroutines

Various subroutines in the assembling control procedure briefly described above with reference to FIG. 13 will be described in detail hereinafter.

Calibration Operation in Step S16

The control procedure of the calibration operation in step S16 described above will be described below with reference to FIGS. 15 and 16, and FIGS. 11 and 12 described above.

Figure 15:
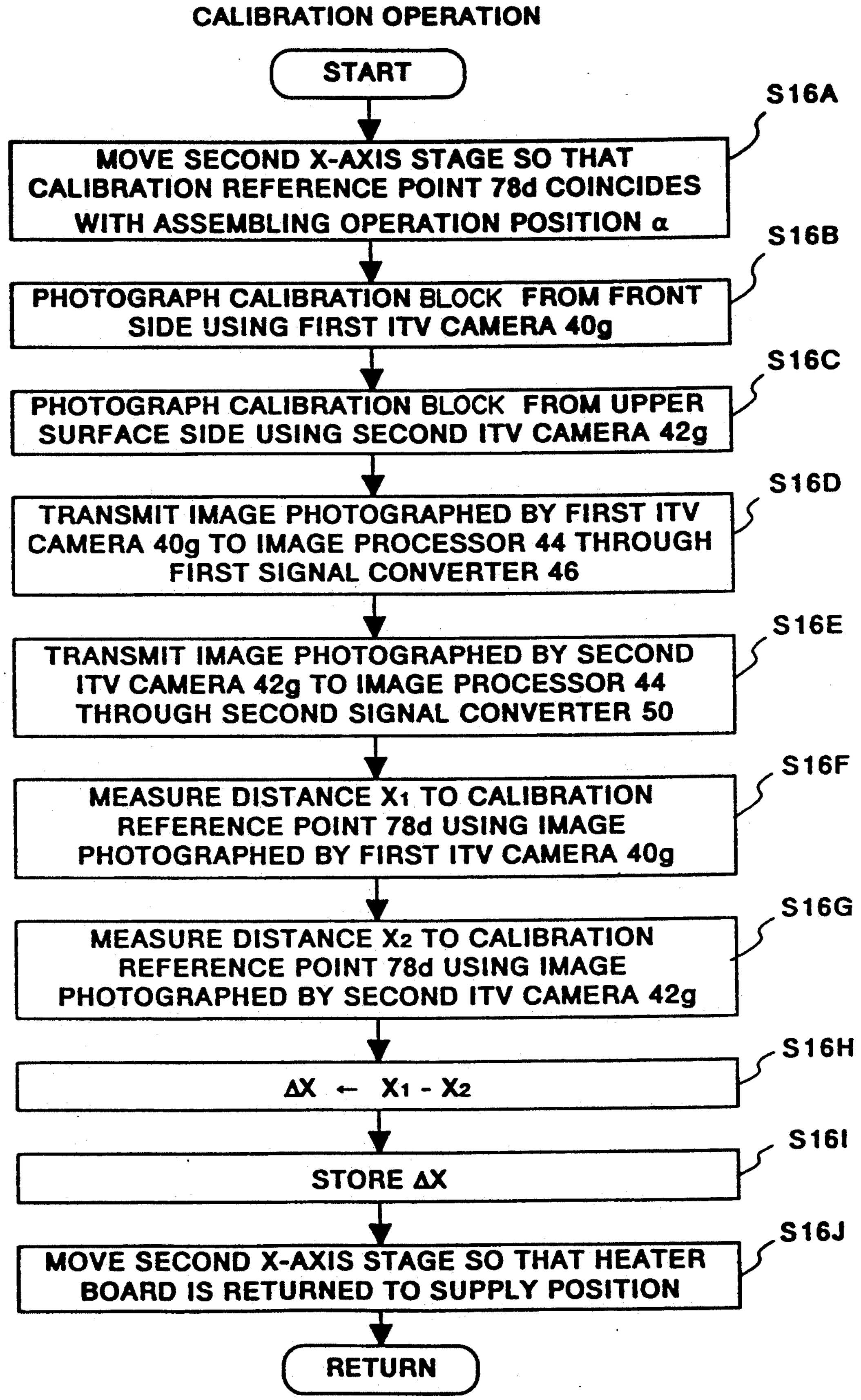
FIG. 15 is a flowchart showing a control procedure of a calibration operation as a subroutine.
Figure 16:
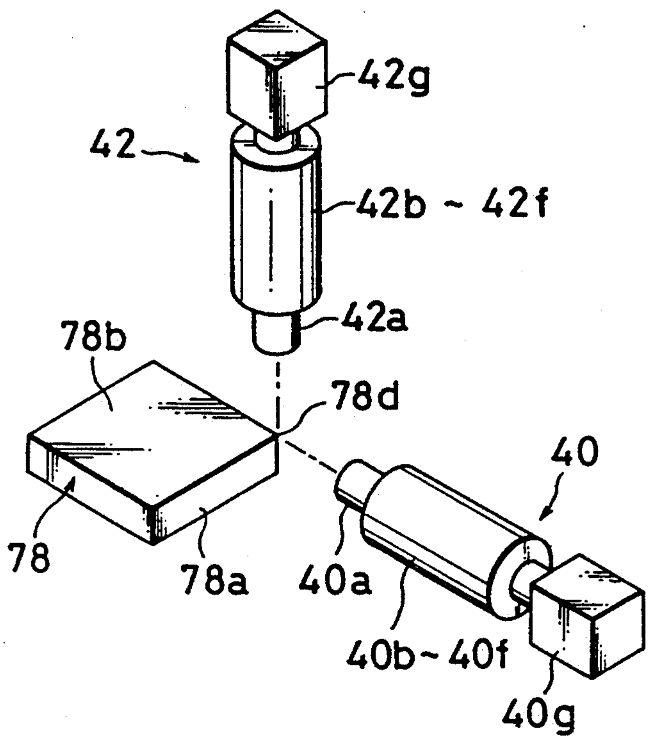
FIG. 16 is a perspective view showing the calibration operation.
Figure 17:
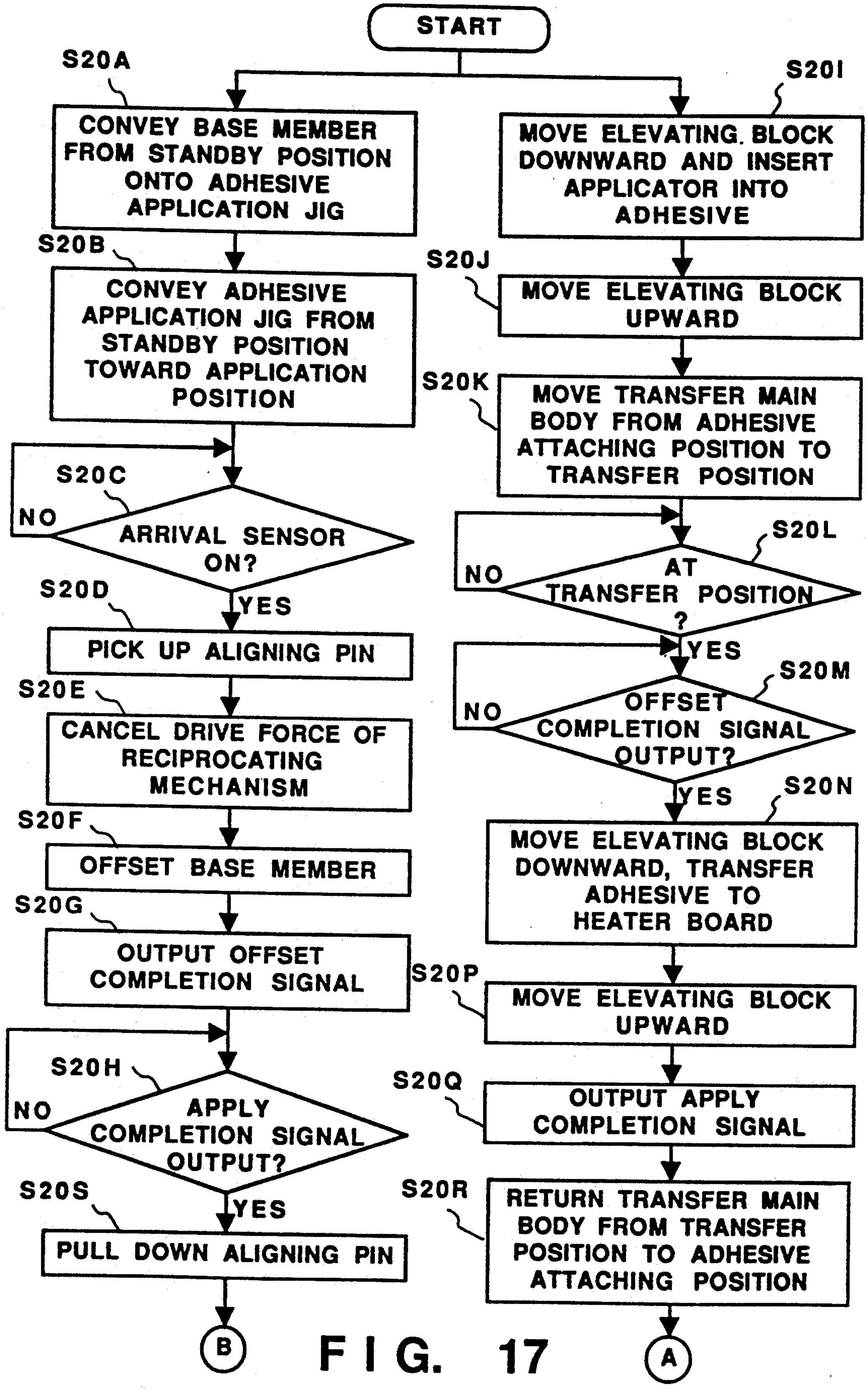
FIGS. 17 and 18 are flowcharts showing as a subroutine a control procedure of a heater board supply operation accompanied with an adhesive application method characterizing the present invention.
Figure 18:
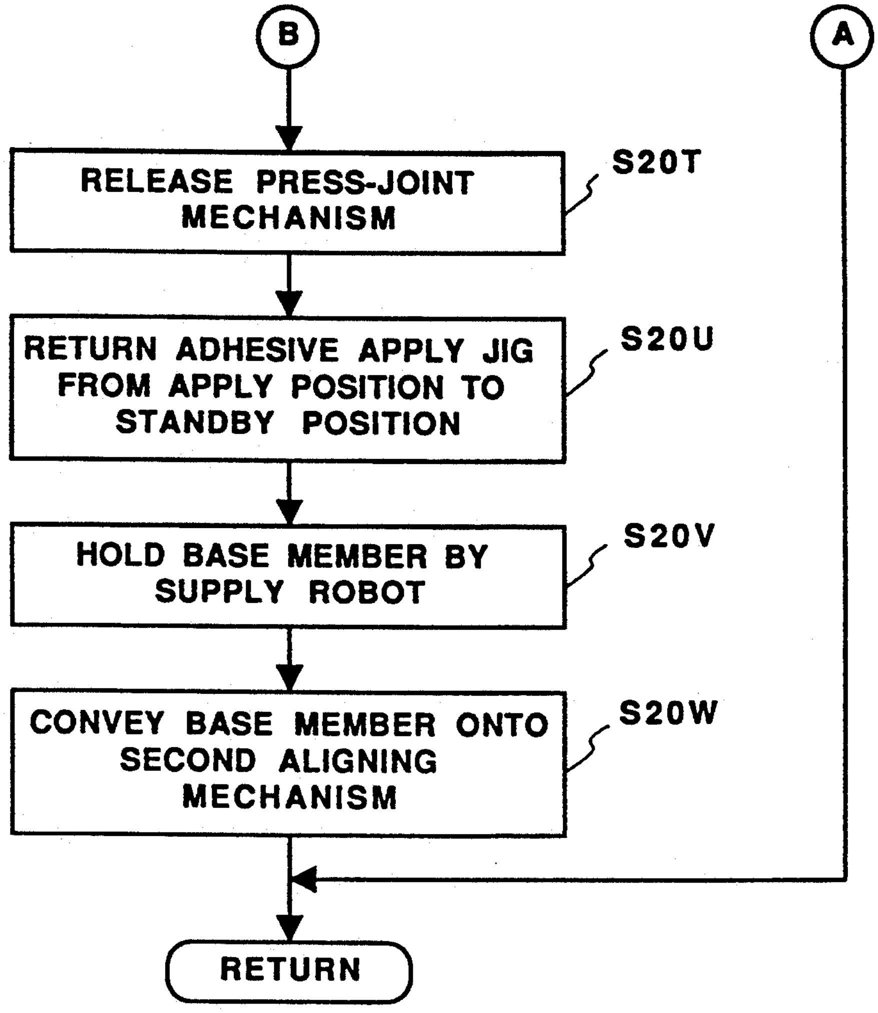

As shown in the flowchart of FIG. 15, when the calibration operation is started, in step S16A, the second x-axis stage 28 of the second position adjustment mechanism 16 is driven to move the calibration block 78 until the calibration reference point 78*d* of the chart 78 coincides with the assembling operation position α defined by the intersection of the optical axes of the objective lenses 40*a* and 42*a* in the first and second position detection mechanisms 40 and 42, as shown in FIG. 16.

In step S16B, the calibration block 78 is photographed from the front side using the first ITV camera 40*g* of the first position detection mechanism 40. In step S16C, the calibration block 78 is photographed from the above using the second ITV camera 42*g* of the second position detection mechanism 42. As a result, an image photographed using the first ITV camera 40*g* is displayed, as shown in FIG. 10, and an image photographed using the second ITV camera 42*g* is displayed, as shown in FIG. 12. In step S16D, the image photographed in step S16B is supplied to the image processor 44 via the first signal converter 46, and in step S16E, the image photographed in step S16C is supplied to the image processor 44 via the second signal converter 50.

In step S16F, a distance $x_1$ from the left end of a screen to the calibration reference point 78*d* is electrically measured on the basis of the image photographed via the first ITV camera 40*g*. In step S16G, a distance $x_2$ from the left end of the screen to the calibration reference point 78*d* is electrically measured on the basis of the image photographed via the second ITV camera 42*g*. Thereafter, in step S16H, $x_1 - x_2$ is calculated, and the calculation result is defined as the above-mentioned shift amount (calibration amount) $\Delta x$.

In step S16I, the shift amount $\Delta x$ as the calculation result is stored in a memory in the control unit 38, and the data disk 78. In step S16J, the second x-axis stage 28 is driven, so that the aligning base 33*c*; on which the calibration block 78 is placed, is returned to a supply position where the base member 208 on which the heater board 102 is fixed in advance is supplied. In this manner, a series of calibration operations are ended, and the flow returns to the main routine.

In this calibration operation, the first and second ITV cameras 40*g* and 42*g* photograph the identical calibration reference point 78*d* of the calibration block 78, and the distances $x_1$ and $x_2$ from the left end of the screen to the identical calibration reference point 78*d* are measured. Therefore, a shift amount between the optical axes of the first and second objective lenses 40*a* and 42*a* can be obtained by $\Delta x$ defined as a difference between these distances $x_1$ and $x_2$.

Heater Board Supply Operation in Step S20

The control procedure of the heater board supply operation in step S20 described above will be described below with reference to the flowchart shown in FIGS. 17 and FIG. 18, and FIGS. 19 and 20.

As has already been repetitively described above, the heater board 102 is aligned and fixed in advance on the heater board attaching portion 208*b* of the base member 208. Therefore, to supply the heater board 102 means to supply the base member 208 to a position above the second aligning mechanism 33.

Figure 19:
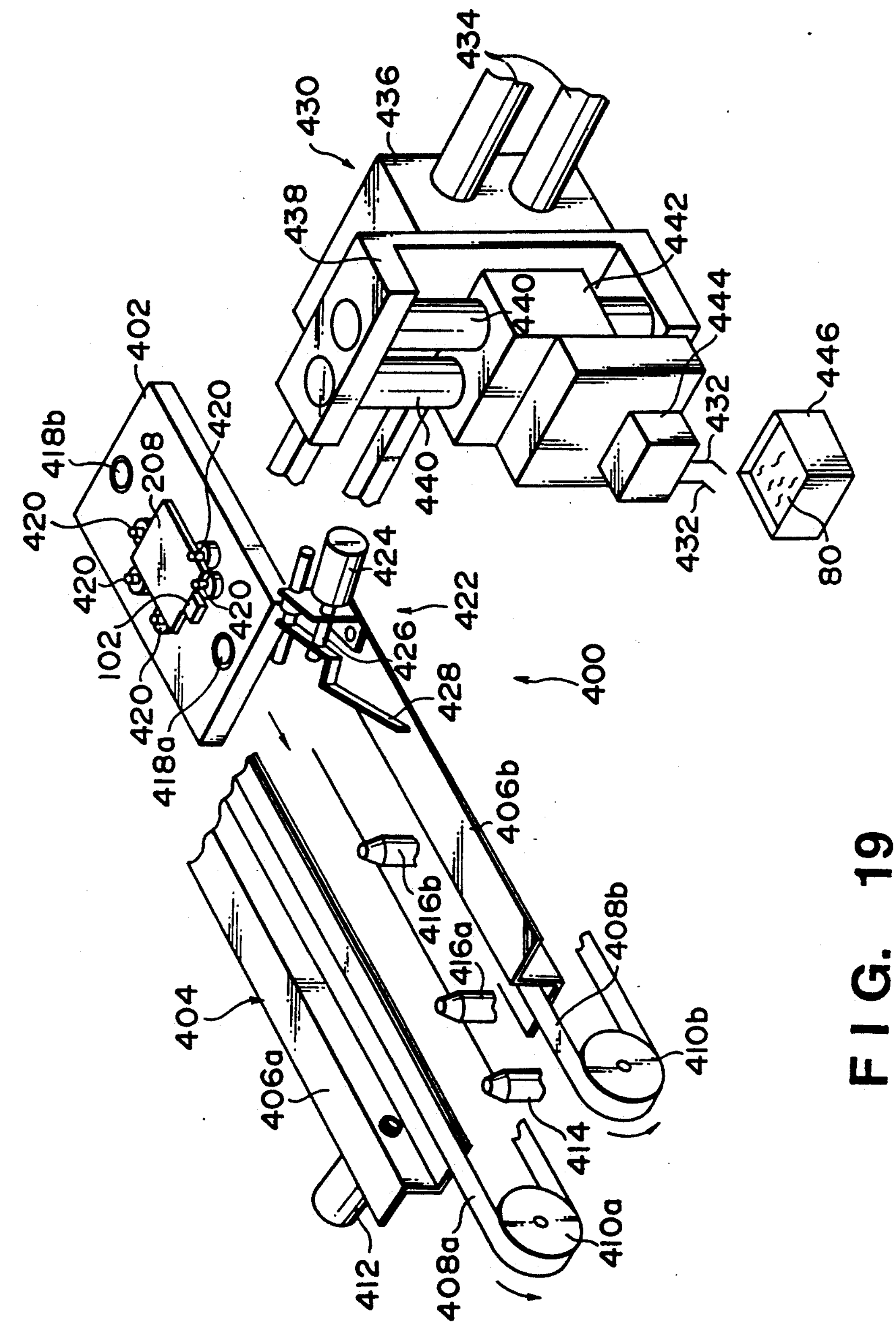
FIG. 19 is a perspective view schematically showing the construction of an adhesive application station.

When the heater board supply operation is started, in step S20A, the base member 208 to which the heater board 102 is attached in advance is held and picked up from a storage position via a supply robot (not shown), and is then conveyed onto an adhesive apply jig 402 in a standby position in an adhesive application station 400 as shown in FIG. 19.

The arrangement of the adhesive application station 400 will be described with reference to FIG. 19.

The adhesive application station 400 comprises a reciprocating mechanism 404 which reciprocally drives the adhesive application jig 402 along a direction between the standby position and an application position. This reciprocating mechanism 404 is equipped with a pair of guide members 406*a* and 406*b* by which the adhesive application jig 402 is slide-guided, a pair of endless belts 408*a* and 408*b* which run with their upper sides sliding on the upper surfaces of the both guide members 406*a* and 406*b*, and a pair of drive pulleys 410*a* and 410*b* to roll the front portions of the endless belts 408*a* and 408*b* and drive them 406*a* and 406*b* in accordance with a rotation drive.

As the reciprocating mechanism 404 has the arrangement described above, the adhesive application jig 402 is reciprocally driven between the standby position and the application position corresponding to the rotation drive direction of the drive pulleys 410*a* and 401*b*. In order to detect the arrival of the adhesive application jig 402 at the application position, an arrival sensor 412 is arranged on one of side walls of a guide member 406*a*. This arrival sensor 412 is constituted by a proximity switch.

On the other hand, in order to stop the adhesive application jig 402 at the application position, a stopper bin 414 is fixed between the endless belts 408*a* and 408*b*. The adhesive application jig 402 is simply stopped at the application position by abutting against the stopper pin 414.

A pair of aligning pins 416*a* and 416*b*, which are movable in an up-and-down direction, for precisely aligning the adhesive application jig 402 at the application position are arranged below the application position where the adhesive application jig 402 is stopped. These aligning pins 416*a* and 416*b* are inserted from the under direction into aligning holes 418*a* and 418*b*, formed through the adhesive application jig 402 in the thickness direction. By the aligning pins 416*a* and 416*b* being inserted through the aligning holes 418*a* and 418*b*, the adhesive application jig 402 simply stopped at the application position, by abutting against the stopper pin 414, is precisely aligned and stopped at the application position.

On the adhesive application jig 402, a plurality of placing pins 420 to unmovably place the base member 208 are planted. These placing pins 420 are arranged so that at least one of them coincides with each side of the base member 208. More particularly, the front end of the base member 208 to which the heater board 102 is fixed is on the front side of a conveying direction from the standby position to the application position, i.e., the base member 208 is reciprocally moved along the y-axis direction. Two placing pins 420 arranged to abut against the side along one of the guide members 406*a*.

A press-joint mechanism 422 is arranged at the side of the adhesive application jig 402 aligned at the application position, to abut against one side of the base member 208 and press-join the base member 208 with the two placing pins 420 corresponding to the other side of the base member 208. The press-joint mechanism 422 is constituted by a drive cylinder 424 fixed on the other one of the guide members 406*b*, a piston rod 426 projectably/retractably attached to the drive cylinder 424 and a pressing member 428. The pressing member 428 is made of a spring member, through which the distal end of the piston rod 426 is inserted, and which is reciprocal-pivotably supported between a press-joint position for press-joining the above-mentioned side of the base member 208 from the side direction and a separating position for separating from this side.

As the press-joint mechanism 422 has the arrangement described above, when the drive cylinder 424 push-drives the piston rod 426 in a state where the adhesive application jig 402 is aligned at the application position, the pressing member 428 pivots from the departing position to the press-joint position and presses the base member 208. The one side of base member 208 is pressed (offset) against the two placing pins 420, and the base member 208 thus stabilized is placed on the adhesive application jig 402.

On the other hand, the adhesive application station 400 is adjacent to the above-mentioned reciprocating mechanism 404. On the adhesive application station 400, an adhesive transfer mechanism 430 is movable along a direction orthogonal to the above-described direction (reciprocal movement direction between the standby position and the application direction) between a transfer position corresponding to the application position and an adhesive attaching position. The adhesive attaching position is defined as a position where a predetermined amount of adhesive is attached to the distal ends (lower ends) of a pair of applicators 432 fixed to the adhesive transfer mechanism 430. The transfer position is defined as a position where the adhesive delivered to the distal end of the applicators 432 is transferred to a predetermined position on the upper surface of the heater board 102 fixed to the base member 208, which is placed on the adhesive application jig 402 at the application position.

More particularly, the adhesive transfer mechanism 430 is constituted by a pair of upper and lower guide rods 434 extending along the above-mentioned direction (the moving direction between the transfer position and the adhesive attaching position), a transfer main body 436 which reciprocally moves along the above direction guided by the guide rods 434, an attaching stay 438 which has a backward C shaped side face and which is fixed to the front surface of the transfer main body 436, a pair of right and left up-and-down guide rods 440 attached to the attaching stay 438, an elevating block 442 up and-down movably supported by these up-and-down guide rods 440, and an attaching block 444 which is integrally attached to the front surface of the elevating block 442, and to which the pair of applicators 432 are attached.

The applicators 432 are attached to the bottom of the attaching block 444 in a state depending from the attaching block 444. The interval between the applicators 432 corresponds to the interval between adhesive application positions 80*a* and 80*b* on the heater board 102. The transfer main body 436 and the elevating block 442 are driven by a driving mechanism (not shown) to move along the above-mentioned orthogonal directions.

In a state where the adhesive transfer mechanism 430 is stopped at the adhesive attaching position, an adhesive container 446 which contains a liquid adhesive 80 is arranged under the attaching block 444. The adhesive container 446 is equipped with a liquid surface maintaining mechanism (not shown) to maintain a constant height of the surface of the adhesive from the bottom of the container. The adhesive 80 is made of an ultraviolet-setting adhesive which is set by ultraviolet-radiation. In the adhesive container 446, the adhesive 80 is merely in liquid state, and it does not function as an adhesive.

As the adhesive application station 400 has the arrangement described above, when the base member 208 is conveyed on the adhesive application jig 402 at the standby position in step S20A, the reciprocating mechanism 404 is started in step S20B to rotate-drive the drive pulleys 410*a* and 410*b*. In accordance with the running of the endless belts 408*a* and 408*b*, the adhesive application jig 402 is conveyed from the standby position to the application position. As a result, the conveyed adhesive application jig 402 abuts against the stopper pin 414 to stop at a substantial application position.

In step S20C, when it is detected that the arrival sensor 412 is turned on, in step S20D, the pair of aligning pins 416*a* and 416*b* are held up to be inserted from an under direction into the corresponding aligning holes 418*a* and 418*b* in the adhesive application jig 402. The drive force of the reciprocating mechanism 404 is stopped in step S20E. Thus the adhesive application jig 402 is precisely aligned and stopped at the application position.

Thereafter, in step S20F, the press-joint mechanism 422 is started to drive the pressing member 428 to offset the base member 208. The base member 208 is placed on the adhesive application jig 402 in a stabilized state. In step S20G, an offset completion signal is output and in step S20H, output of an application completion signal is awaited.

On the other hand, step S20I is executed in parallel with the drive of the reciprocating mechanism 404 in step S20A. In step S20I, the adhesive transfer mechanism 430 starts to move the elevating block 442 downward. The distal end of the pair of applicators 432 is inserted into the adhesive 80 in the adhesive container 446 to a predetermined depth. As the height of the adhesive surface from the bottom of the adhesive container 446 is maintained to a fixed value by the above-mentioned liquid surface containing mechanism, a constant amount of the adhesive attached to the distal end of the applicators 432 can be maintained.

Thereafter, in step S20J, the elevating block 442 is moved upward, and in step S20K, the transfer main body 436 is moved from the adhesive attaching position to the transfer position. In step S20L, when it is detected that the transfer main body 436 is at the transfer position, it is examined whether the offset completion signal is output. When it is detected that the offset completion signal is output, the elevating block 442 is moved downward in step S20N. By this motion of the elevating block 442, the distal end portions of the applicators 432 contact predetermined positions of the heater board 102 stopped at the application position, thus the adhesives adhered to the applicators 432 are transferred on the heater board 102. The predetermined positions of the heater board 102 are applied with the precisely defined amount of adhesives 80*a* and 80*b* in a precisely aligned state.

Thereafter, in step S20P, the elevating block 442 is moved upward, and in step S20Q, an application completion signal is output. In step S20R, the transfer main body 436 is returned from the transfer position to the adhesive attaching position, thus the control procedure in the adhesive transfer mechanism 430 is ended.

On the other hand, in the above-mentioned reciprocating mechanism 404, the waiting state for the output of the application completion signal in step S20H is cancelled by the output of the application completion signal in step S20Q. In step S20S, the aligning pins 416*a* and 416*b* are moved downward and the adhesive application jig 402 is made movable. In step S20T, the press-joining state of the press-joint mechanism 422 is cancelled, and in step S20U, the drive pulleys 410*a* and 410*b* are reversely rotated to return the adhesive application jig 402 from the application position to the standby position.

Figure 20:
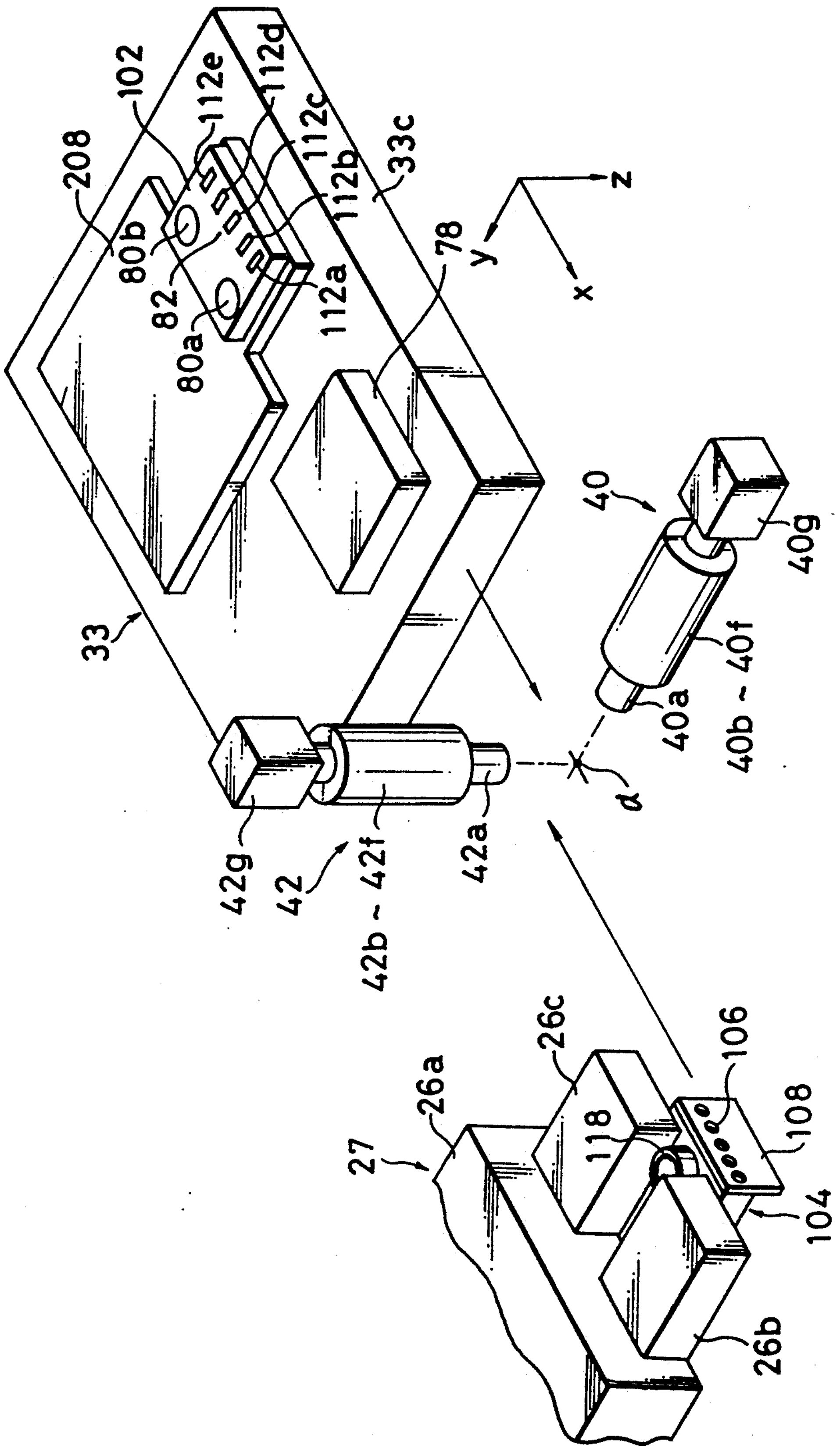
FIG. 20 is a perspective view showing standby positions of the first and second aligning mechanisms and an assembling operation position.
Figure 21:
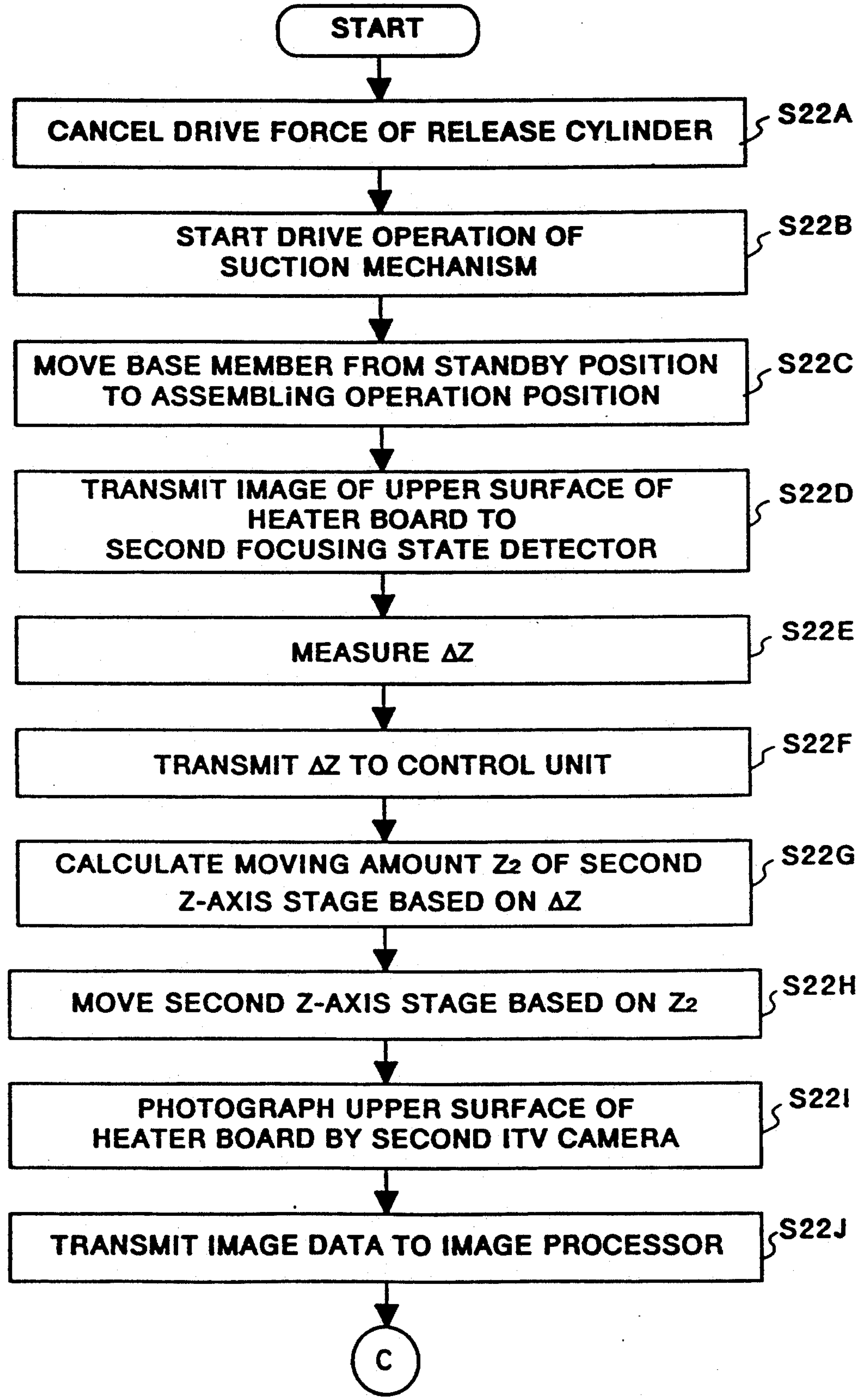
FIGS. 21 and 22 are flowcharts showing as a subroutine a control procedure of an alignment operation of the heater board.
Figure 22:
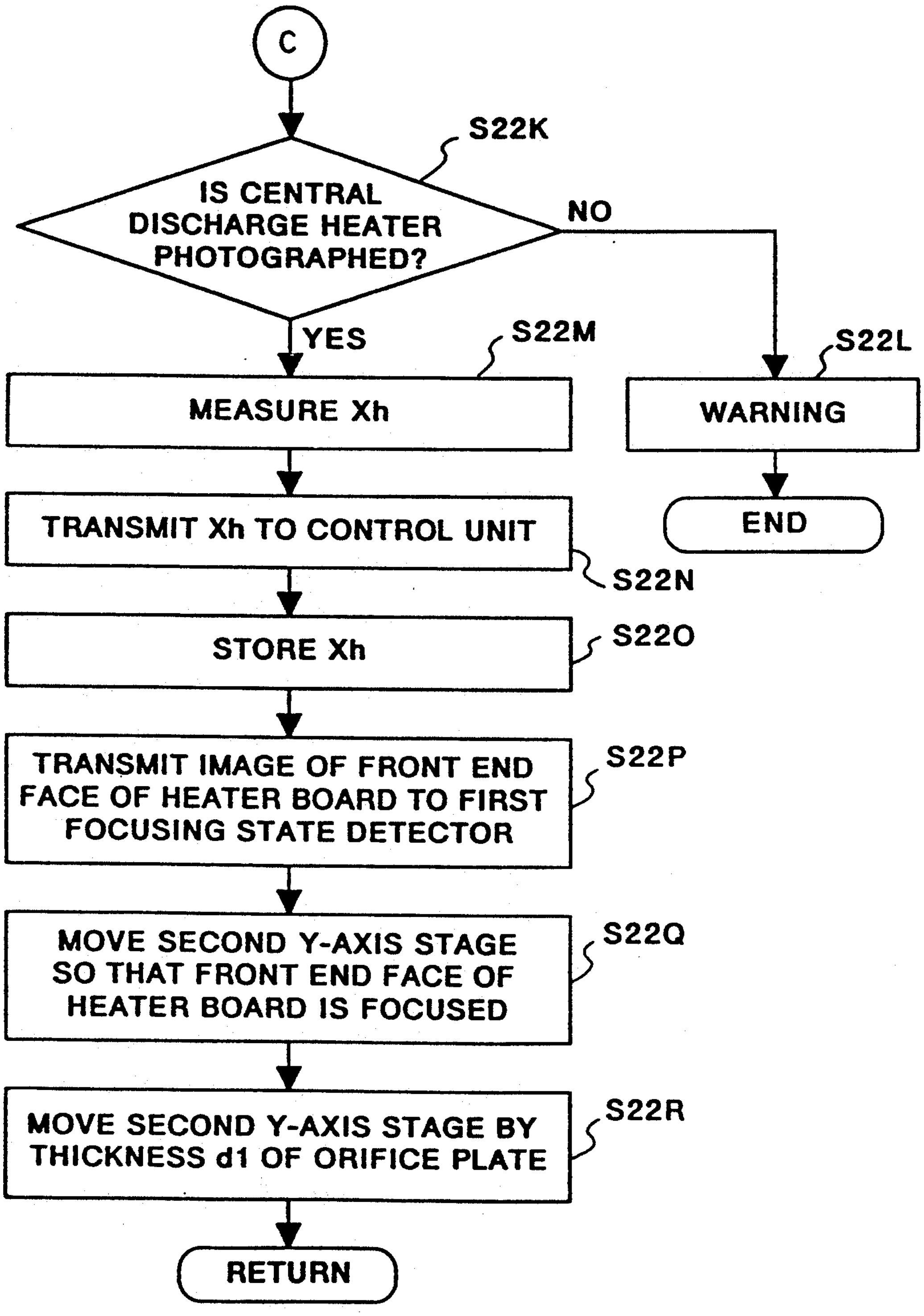

Thereafter, in step S20V, the base member 208 to which the heater board 102 applied with the adhesives 80*a* and 80*b* is held by the supply robot. In step S20W, the base member 208 is conveyed on a second aligning mechanism 33 via the supply robot. In step S20X, the holding of the base member 208 by the supply robot is released and the base member 208 is placed on the second aligning mechanism 33. As shown in FIG. 20, a standby position of the second aligning mechanism 33 is defined as a position apart from the aforementioned assembling operation position $\alpha$ by a predetermined distance along the x-axis direction.

In this manner, a series of heater board supply operations are ended, and the control returns to the main routine.

Heater Board Aligning Operation in Step S22

The aligning operation of the heater board 102 in step S22 will be described below with reference to the flowcharts shown in FIGS. 21 and 22, FIG. 23, and FIGS. 7 to 9 described above.

In the second aligning mechanism 33 for aligning the heater board 102, in a standby state before the heater board 102 is conveyed, the release mechanism 33D (FIG. 9) is operated, and the release cylinder 33*m* is driven to push out the corresponding piston rod 33*n*. Thus, the release pins 33*r* and 33*s* on the piston rod 33*n* are respectively engaged with the x- and y-axis regulating levers 33*f* and 33*j*, and move these levers to positions separated from the base member 208, i.e., to separated positions.

When the aligning operation is started in a state wherein the second aligning mechanism 33 is set in the standby state, the driving force of the release cylinder 33*m* is released in step S22A. As a result, the corresponding piston rod 33*n* is retracted inwardly by the biasing force of an internal return spring (not shown). Therefore, the release pins 33*r* and 33*s* on this piston rod 33*n* are separated from the x- and y-axis regulating levers 33*f* and 33*j*.

In this manner, since the x-axis regulating lever 33*f* is pivoted counterclockwise by the biasing force of the first torsion spring 33*h*, the base member 208 is pushed from the separated position in the x-axis direction, and abuts against the pair of x-axis aligning projections 33*d* and 33*e* constituting the x-axis aligning unit 33A, so that the x-axis position of the base member 208 is defined. On the other hand, since the y-axis regulating lever 33*j* is pivoted counterclockwise by the biasing force of the second torsion spring 33*l*, the base member 208 is pushed from the separated position in the y-axis direction, and abuts against the y-axis aligning projection 33*i* constituting the y-axis aligning unit 33B, so that the y-axis position of the base member 208 is defined. More specifically, when the driving force of the release cylinder 33*m* is released, the x- and y-axis positions of the base member 208 can be precisely aligned.

After step S22A is executed in this manner, the driving operation of the suction mechanism 33E is started in step S22B. When the suction mechanism 33E is started, a suction source (not shown) is also started, and a suction force from the suction source acts in the suction pad 33*w* via the connection pipe 33*x*. As a result, the base member 208 is drawn downward by suction, and the first and second projections 33*t* and 33*u* constituting the z-axis aligning unit 33C reliably abut against the upper surface of the aligning base 33*c*. In addition, the third projection 33*v* reliably abuts against the lower surface of the base member 208. More specifically, when the suction mechanism 33E is driven, the z-axis position of the base member 208 can be precisely aligned.

In this manner, the three axial positions of the base member 208 can be precisely aligned with the main body 33*a* of the second aligning mechanism 33 upon aligning operation of the second aligning mechanism 33. Upon operation of the suction mechanism 33E, the base member 208 can be reliably held at a position precisely aligned by the second aligning mechanism 33 even when the main body 33*a* is moved.

When step S22B is completed, in step S22C, the second position adjustment mechanism 16 is started to move the base member 208 aligned and held by the second aligning mechanism 33 from the standby position to the assembling operation position $\alpha$. In step S22D, the image of the upper surface of the heater board 102 on the base member 208 brought to the assembling operation position $\alpha$ is transmitted to the second focusing state detector 52 via the focusing state judgment second optical system 42*e*.

In step S22E, the second focusing state detector 52 measures a z-axis defocus amount $\Delta z$ from an in-focus position, i.e., the z-axis defocus amount $\Delta z$ at the assembling operation position $\alpha$ since the in-focus position corresponds to the designed z-axis setting position. In step S22F, the measured defocus amount $\Delta z$ is supplied to the control unit 38. Thereafter, in step S22G, the control unit 38 calculates a moving amount $Z_2$ of the second z-axis stage 30 on the basis of the defocus amount $\Delta z$. In step S22H, the second z-axis stage 30 is moved based on the calculated moving amount $Z_2$, thereby precisely defining the z-axis position of the upper surface of the heater board 102 at the assembling operation position $\alpha$.

In step S22I, the upper surface of the heater board 102 is photographed by the second ITV camera 42g of the second position detection mechanism 42. In step S22J, the photographed image data is supplied to the image processor 44 via the second signal converter 50. FIG. 19 shows the image of the heater board photographed by the second ITV camera 42g. The image obtained by the second ITV camera 42g is a precisely focused, sharp image since the z-axis position of the upper surface of the heater board 102 at the assembling operation position $\alpha$ is precisely defined in steps S22D to S22H.

Figure 23:
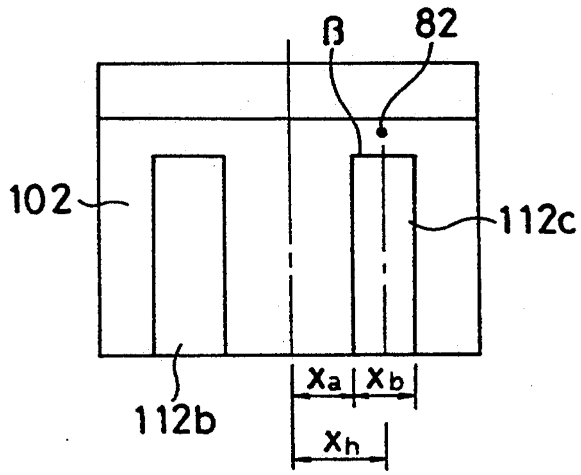
FIG. 23 is a diagram showing an image of the heater board photographed by a second ITV camera.

As shown in FIG. 23, the central discharge heater 112c should be displayed in the image when the discharge heaters 112a to 112e are formed on the heater board 102 with predetermined formation precision, and the second aligning mechanism 33 executes the predetermined aligning operations. The subsequent assembling operations are enabled as long as the central discharge heater 112c is displayed.

For this reason, it is checked in step S22K if the central discharge heater 112c is displayed. If NO in step S22K, since the subsequent assembling operations are disabled, an alarm is generated in step S22L, and the control procedure is ended. On the other hand, if it is determined in step S22K that the central discharge heater 112c is displayed, the flow advances to step S22M, and an x-axis shift amount $x_h$ of the discharge heater 112c from the assembling operation position $\alpha$ is measured.

Upon measurement of the x-axis shift amount $x_h$, when the central discharge heater 112c is offset from the center line to the right side of the screen, a sign (+) is added, and when it is offset to the left side, a sign (−) is added.

In this embodiment, as a means for identifying the central discharge heater 112c from the five discharge heaters 112a to 112e, as shown in FIGS. 20 and 23, an identification mark 82 is formed at a position adjacent to the discharge heater 112c. More specifically, in step S22K described above, when this identification mark 82 is recognized within the image, it is determined that the central discharge heater 112c is displayed. However, when the identification mark 82 cannot be recognized, it is determined that the discharge heater 112c is not displayed.

Note that the above-mentioned x-axis shift amount $x_h$ is defined as a distance from the central position of the image to the central position of the central discharge heater 112c, and the central position of the image is set in advance to coincide with the assembling operation position $\alpha$.

After the x-axis shift amount $x_h$ is measured, the shift amount $x_h$ is transmitted to the control unit 38 in step S22N. In step S22O, the shift amount $x_h$ is stored in the memory in the control unit 38.

Thereafter, in step S22P, the image of the front end face of the heater board 102 on the base member 208 brought to the assembling operation position $\alpha$ is transmitted to the first focusing state detector 48 via the focusing state judgment first optical system 40e of the first position detection mechanism 40. In step S22Q, the second y-axis stage 32 is driven so as to move the heater board 102, so that an in-focus state, i.e., focusing, is attained by the first focusing state detector 48. When the focusing operation is completed in step S22Q, the second y-axis stage 32 is further moved by a thickness $t_1$ of the above-mentioned orifice plate 108 so as to be separated from the in-focus position in step S22R.

In this manner, since the y-axis position of the front end face of the heater board 102 is offset by the thickness $t_1$ of the orifice plate 108, the first position detection mechanism 40 can precisely focus the image of the surface of the orifice plate 108 without executing any focus detection operation when the top plate 104 is attached onto the heater board 102, and the orifice plate 108 fixed in advance to the front end face of the top plate 104 is in tight contact with the front end face of the heater board 102.

In this manner, a series of aligning operations of the heater board 102 are ended, and the control returns to the main routine.

Supply Operation of Top Plate 104 in Step S24

First Example

Figure 24:
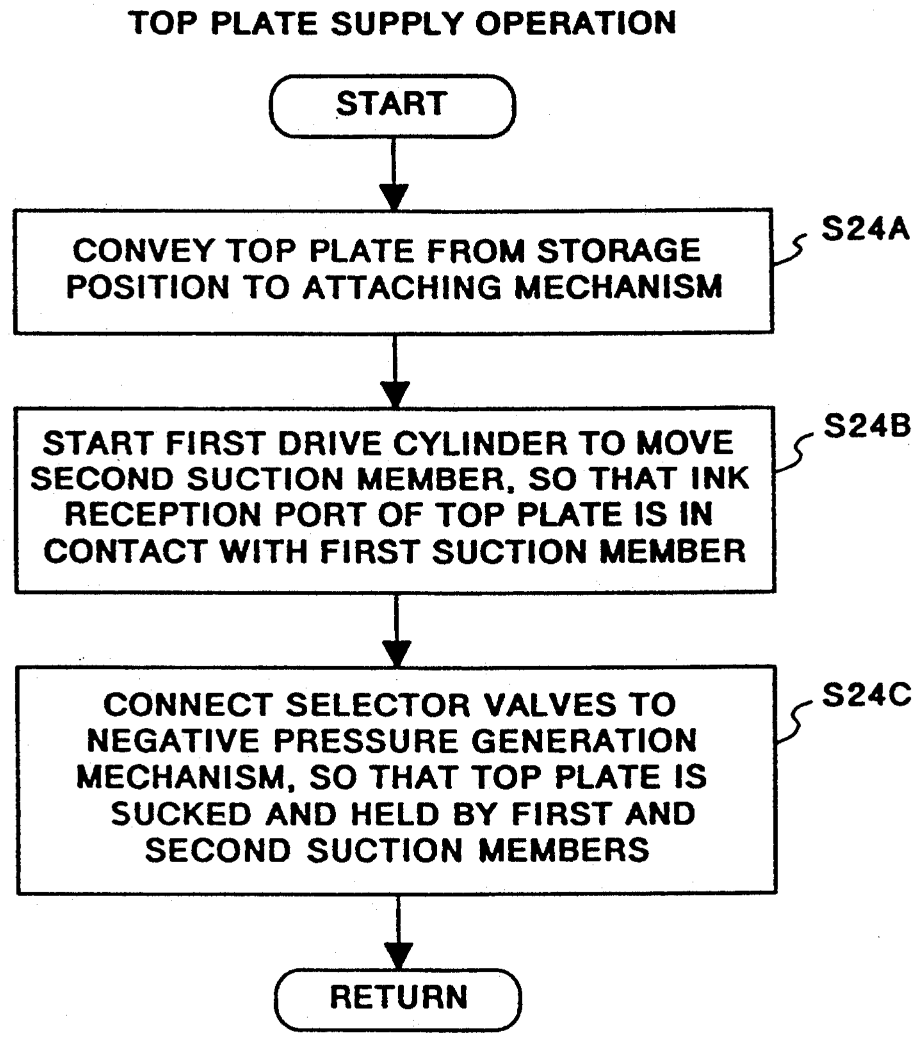
FIG. 24 is a flowchart showing as a subroutine a control procedure of a top plate supply operation.
Figure 25:
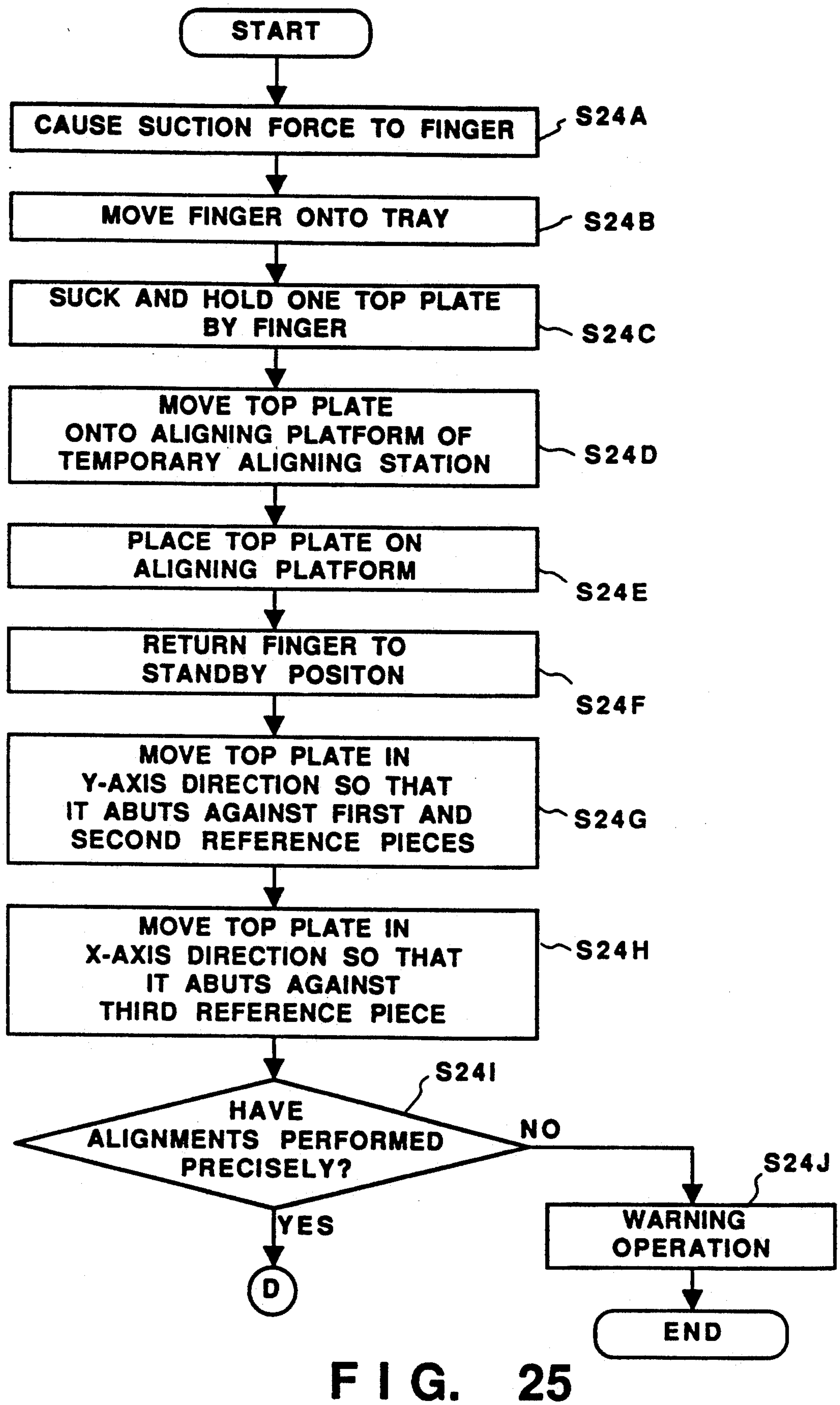
FIGS. 25 and 26 are flowcharts showing as a subroutine the top plate supply operation.
Figure 26:
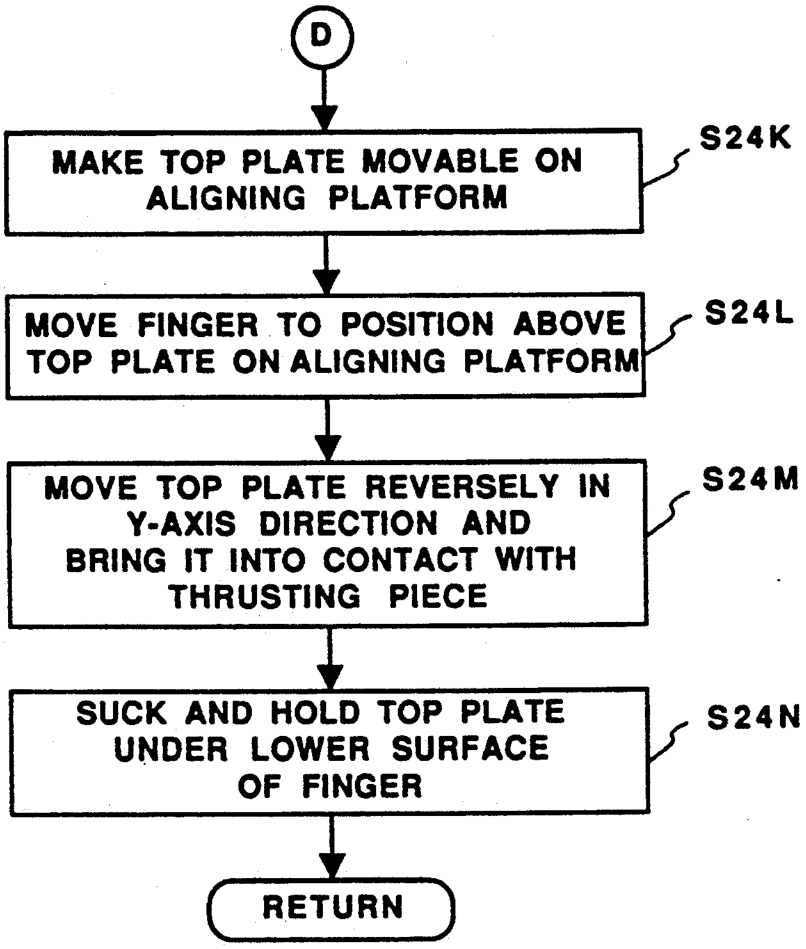

A first example of the supply operation of the top plate 104 in step S24 will be described below with reference to the flowchart shown in FIG. 24, and FIG. 20 described above.

When the supply operation of the top plate 104 is started, the top plate 104 is conveyed from its storage position to the attaching mechanism 26 at the standby position via a supply robot (not shown) in step S24A. More specifically, the top plate 104 is conveyed so that the cylindrical ink reception port 118 of the top plate 104 is fitted from below into a gap defined between the pair of suction members 26b and 26c constituting the attaching mechanism 26. In step S24B, the first drive cylinder of the first aligning mechanism 27 is driven to drive the movable second suction member 26c toward the stationary first suction member 26b, so that the ink reception port 118 is clamped between the first and second suction members 26b and 26c with a weak force, as shown in FIG. 20. In this manner, the upright contact surface 118b of the ink reception port 118 is in light contact with the inner surface defined as the reference surface of the stationary first suction member 26b. As a result, the x-axis position of the ink reception port 118, i.e., the top plate 104 with respect to the attaching mechanism 26 can be precisely defined.

Since a weak force for clamping the ink reception port 118 is set, deformation of the ink reception port 118 by this clamping force is negligible, and in this clamping state, although the ink reception port 118 can be clamped, the top plate 104 cannot be held.

Thereafter, in step S24C, the top plate main body 116 of the top plate 104 whose x-axis position is aligned is chucked and held on the lower surfaces of the first and second suction members 26b and 26c via the suction holes 26d and 26e respectively formed in the lower surfaces of the first and second suction members 26b and 26c.

In this manner, a series of supply operations of the top plate 104 are ended, and the control returns to the main routine.

Second Example

Next, a second example of the supply operation of the top plate 104 in step S24 will be described below with reference to the flowchart shown in FIGS. 25 and 26, FIGS. 27 to 29 and FIG. 20 described above.

Figure 27:
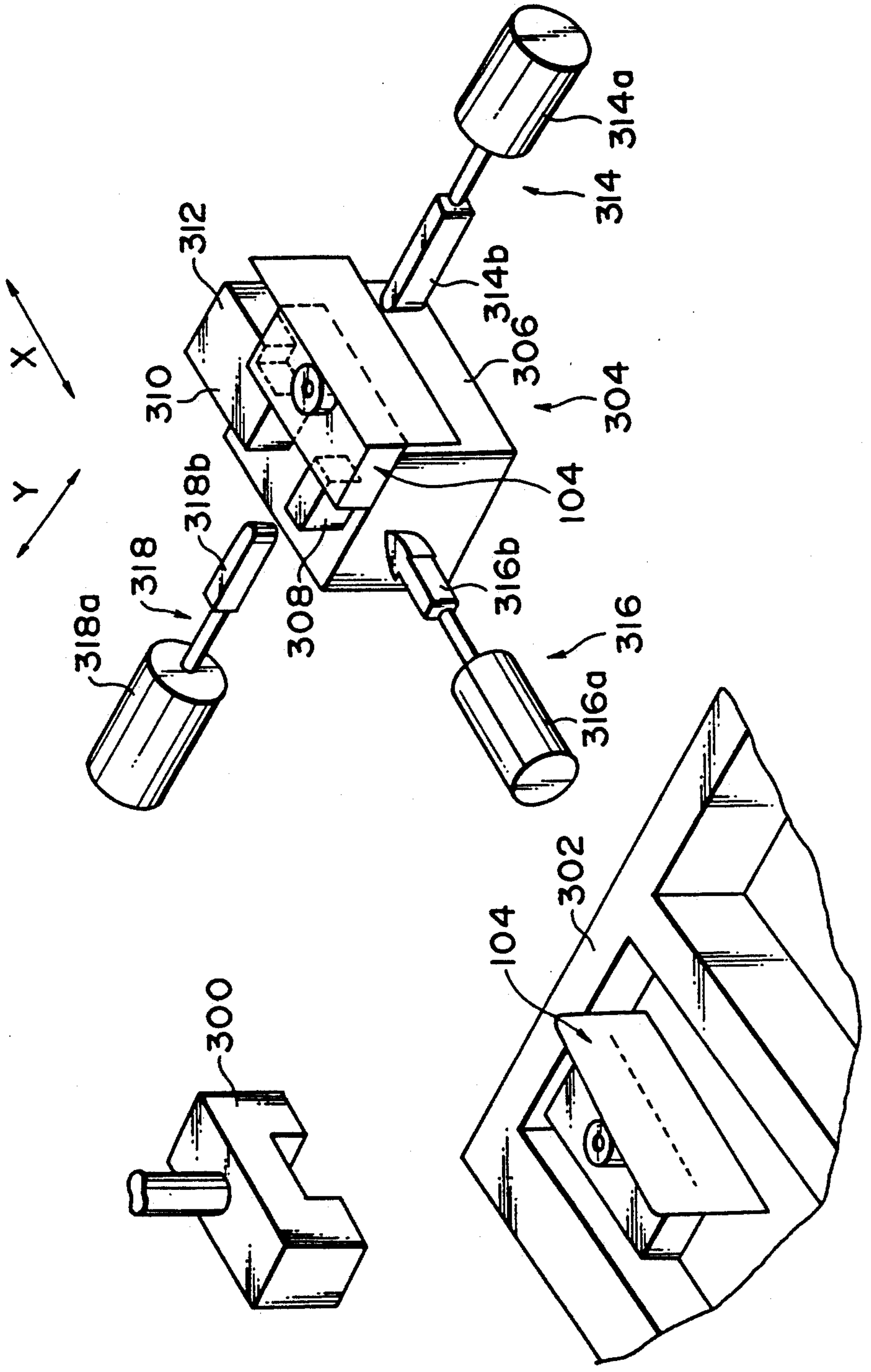
FIG. 27 is a perspective view schematically showing the construction of a temporary alignment station.

When the supply operation of the top plate 104 is started, the supply robot (not shown) is driven to cause a suction force to a suction hole (not shown) opened on the lower surface of a finger 300 of the robot in step S24A. In step S24B, the finger 300 is moved to a position above a predetermined one top plate 104 on a tray 302 where a plurality of top plates are stored as shown in FIG. 27. In step S24C, the finger 300 is slowly moved downward. The top plate 104 is sucked at the suction hole and thus held under the finger 300.

Thereafter, in step S24D, the finger 300 is moved to bring the held top plate 104 onto an aligning platform 306 arranged between the tray 302 and the assembling apparatus 10. In step S24E, the suction force at the suction hole is extinguished. The top plate 104 falls on the aligning platform 306, as a result it is placed on the aligning platform 306. In step S24F, the finger 300 is returned to a standby position.

On the aligning platform 306, first and second reference pieces 308 and 310 for aligning the top plate 104 in the y-axis direction are fixed apart from each other in the x-axis direction. Also on the aligning platform 306, a third reference piece 312 for aligning the top plate 104 in the x-axis direction is fixed at a position where the top plate 104 aligned with respect to the y-axis direction is moved in the x-axis direction and brought into contact with the third reference piece 312. In front of the aligning platform 306, a first y-axis direction moving mechanism 314 for moving the top plate 104 placed on the aligning platform 306 rearward along the y-axis direction (toward the first and second reference pieces 308 and 310) is arranged. At the side of the aligning platform 306, an x-axis direction moving mechanism 316 for moving the top plate 104 along the x-axis direction toward the third reference piece 312, and in the rear of the aligning platform 306, a second y-axis direction moving mechanism 318 for moving the top plate 104 aligned in the x- and y-axis directions forward (in a direction apart from the first and second reference pieces 308 and 310) along the y-axis direction, are arranged. The respective moving mechanisms 314, 316 and 318 are constituted by actuators 314*a*, 316*a* and 318*a* and corresponding operating pieces 314*b*, 316*b* and 318*b* projected from the actuators 314*a*, 316*a* and 318*a*.

Figure 28:
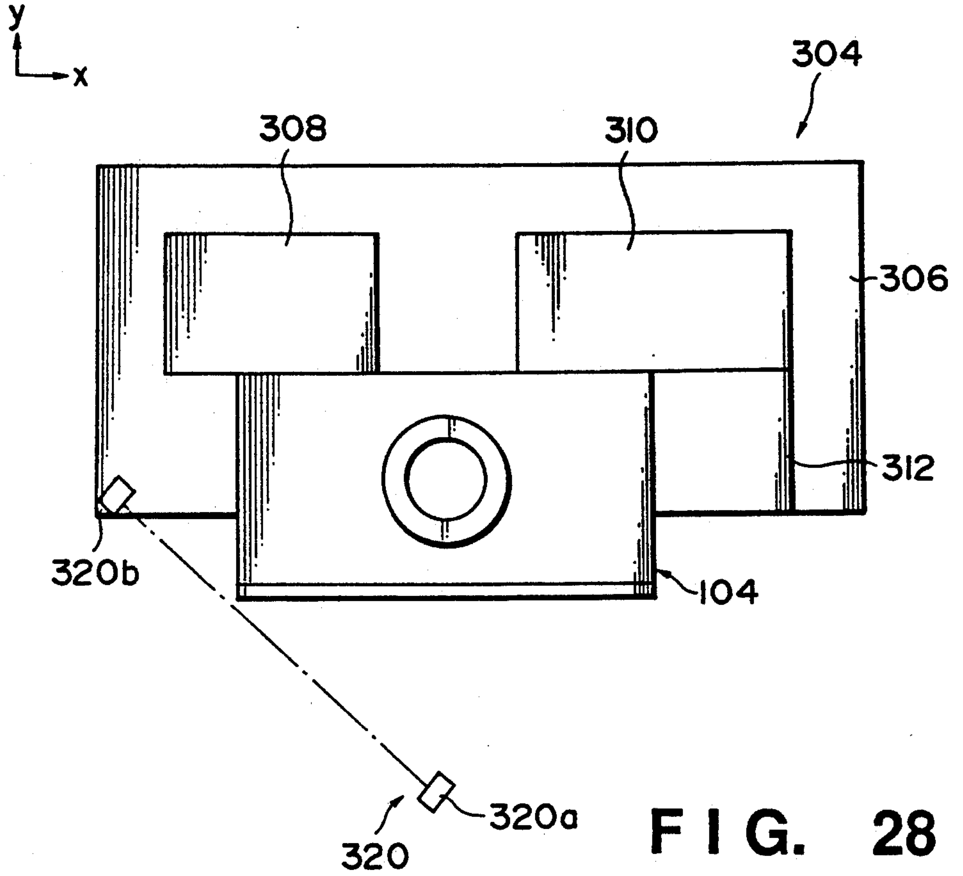
FIG. 28 is a diagram for explaining an alignment detection operation in an alignment detection mechanism.

As shown in FIG. 28, an alignment detection mechanism 320 for detecting whether the top plate 104 is aligned at a predetermined position is arranged around the aligning platform 306. The alignment detection mechanism 320 is constituted by a pair of photocouplers including a light emitting element 320*a* and a photoreceptor element 320*b* with an optical axis which passes a corner (examined corner) formed by two sides of the top plate 104 opposing to aligned two sides of the top plate 104 (the side abuts against the first and second reference pieces 308 and 310, and the side abuts against the third reference piece 312) and which has an inclination of, e.g., 45° to the x and y axes.

As the alignment detection mechanism 320 has the arrangement described above, if an aligning operation is finished in a state where the top plate has not been brought into contact with the first and second reference pieces 308 and 310 or the third reference piece 312, the examined corner of the top plate 104 must be shifted outwardly compared with a precisely aligned state, intercepting the above-mentioned optical axis. If the alignment detection operation is started and the optical axis emitted by the light emitting element 320*a* can be received by the photoreceptor element 320*b* without being intercepted, it is determined that the top plate 104 is precisely aligned at a predetermined position on the aligning platform 306. If the optical axis is intercepted and the photoreceptor element 320*b* cannot receive the light, it is determined that the top plate 104 is not precisely aligned.

When the placing operation of the top plate 104 on the aligning platform 306 ends, in step S24G, the first y-axis direction moving mechanism 314 is started to push the operating piece 314*b* to which the actuator 314*a* corresponds along the y-axis direction. By this operation, the rear surface of the top plate 104 is brought into contact with the front surfaces of the first and second reference pieces 308 and 310. As a result, the top plate 104 is aligned in the y-axis direction on the aligning platform 306. This aligned state is maintained in step S24H where the x-axis direction moving mechanism 316 is started to push the operating piece 316*b* to which the actuator 316*a* corresponds along the x-axis direction. The one side of the top plate 104 is brought into contact with the side of the second reference piece 312. By this operation, the top plate 104 is aligned in the x-axis direction on the aligning platform 306.

Thereafter, in step S24I, the alignment detection mechanism 320 is started to detect whether the alignments have been performed precisely. If NO in step S24I, i.e , it is determined that the top plate 104 is not precisely aligned, an alarm is generated in step S24J and this procedure is ended. On the other hand, if Yes in step S24I, i.e., it is determined that the alignments have been performed precisely, this means the top plate 104 is precisely aligned at a predetermined position on a horizontal level on the aligning platform 306. Thereafter, a holding operation of the aligned top plate 104 and a supplying operation of the top plate 104 to the heater board 102 are started.

Figure 29:
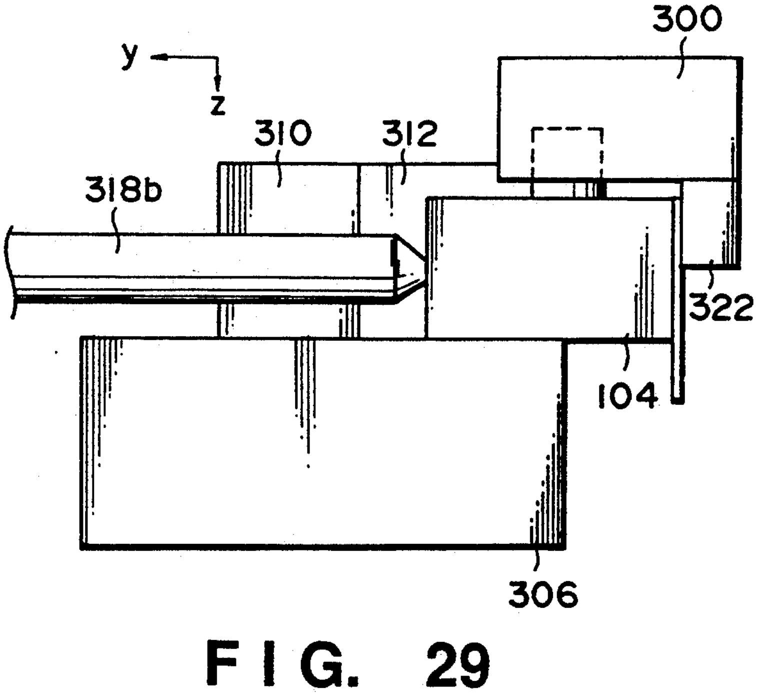
FIG. 29 is a side view for explaining a state where a top plate aligned at a temporary alignment station is held by a set of fingers.

First, if YES in step S24I, the y-axis direction moving mechanism 314 and the x-axis direction moving mechanism 316 are reversely started in step S24K to pull the corresponding operating pieces 314*b* and 316*b* into the actuator 314*a* and 314*b*. The top plate 104 is made movable on the aligning platform 306. In step S24L, the finger 300 is moved from the standby position to a position above the top plate 104. In this state, a y-axis direction thrusting piece 322 integrally formed on the front lower surface is positioned right in front of the aligned top plate 104, as shown in FIG. 29. In step S24M, the second y-axis direction moving mechanism 318 is started to push the operating piece 318*b* to which the actuator 318*a* corresponds along the y-axis direction to bring the front surface of the top plate 104 into contact with the rear surface of the y-axis direction thrusting piece 322. By this operation, the top plate 104 is moved along the y-axis direction on the aligning platform 306, to abut against the y-axis direction thrusting piece 322 of the finger 300 from behind, thus positioned just under the finger 300.

Thereafter, in step S24N, the suction hole of the finger 300 is given a suction force so that the top plate 104 is sucked under the finger 300 and is held there. The holding position of the top plate 104 by the finger 300 is always precisely aligned based on a position aligned in the temporary aligning station 304, as apparent from the above explanation.

Thus, the supply operation of the top plate 104 is ended and this control procedure returns to the main routine.

Temporary Placing Operation of Top Plate 104 in Step S26

Figure 30:
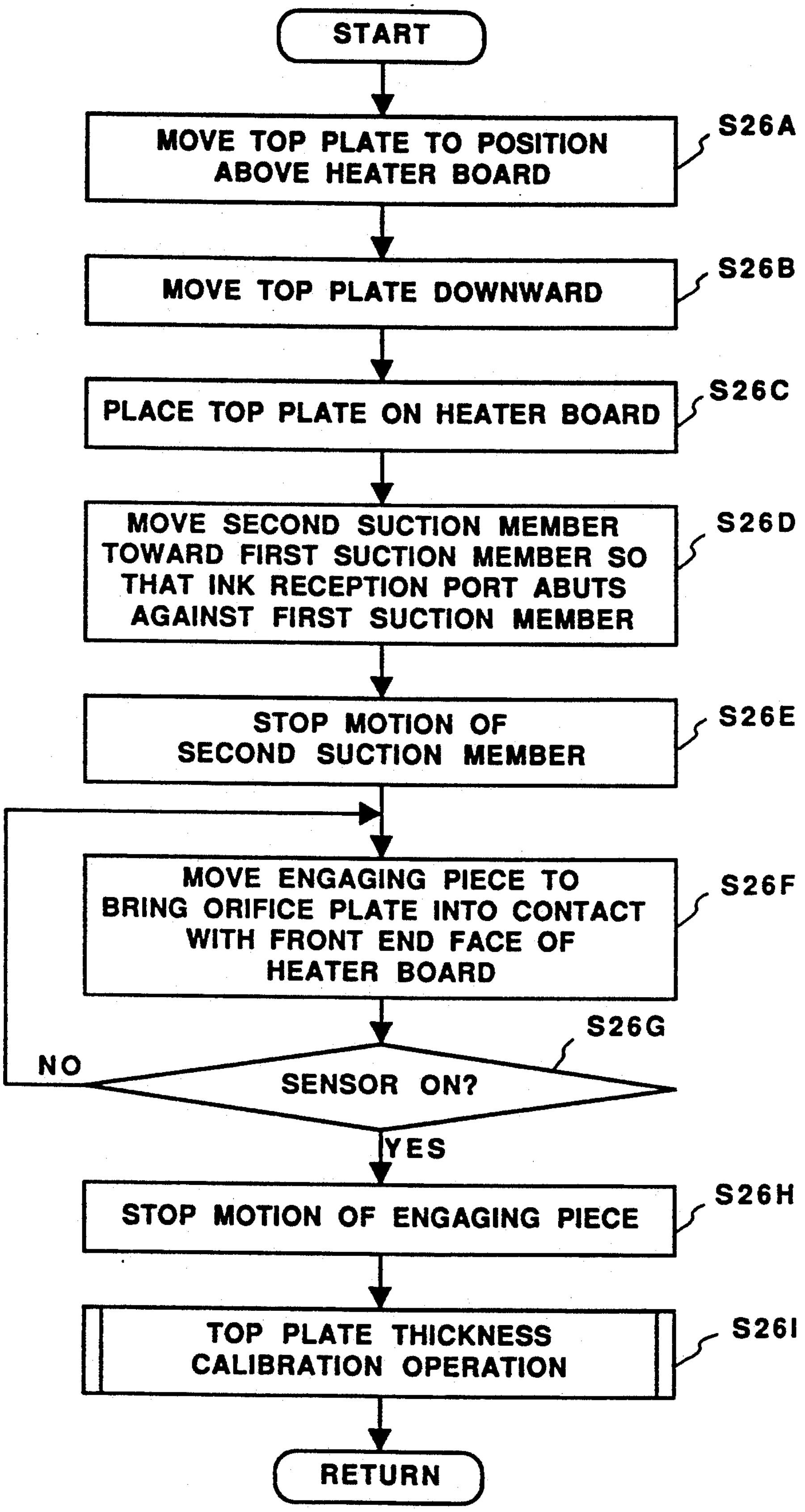
FIG. 30 is a flowchart showing as a subroutine a control operation of a temporary placing of the top plate.

The temporary placing operation of the top plate 104 on the heater board 102 in step S26 will be described with reference to the flowchart shown in FIG. 30.

As has already been described above, since both the top plate 104 and the heater board 102 are precision components, they may be damaged upon application of an excessive force. For this reason, prior to the x-axis aligning operation in step S28, the operation for temporarily placing the top plate 104 on the heater board 102 is executed.

When the temporary placing operation is started, in step S26A, the first position adjustment mechanism 14 is driven to move the top plate 104 to a position immediately above the heater board 102 while keeping a sufficient gap between the top plate 104 and the heater board 102. Thereafter, in step S26B, the top plate 104 is moved downward in the z-axis direction to eliminate the gap between the top plate 104 and the heater board 102. In step S26C, the top plate 104 is dropped onto the heater board 102.

In this state, the top plate 104 is placed on the heater board 102 while its placing position is not precisely defined. For this reason, in step S26D, the movable second suction member 26c of the first aligning mechanism 27 are moved along the x-axis direction toward the stationary first suction member *26b*, so that the ink reception port 118 abuts against the end surface of the first suction member *26b*. By this operation, the position of the top plate 104 along the x axis direction is schematically defined. In step S26E, the motion of the second suction member 26c is stopped, and in step S26F, the engaging pieces 26m and 26n of the first aligning mechanism 27 are moved to bring the orifice plate 108 into contact with the front end face of the heater board 102. The above-mentioned sensor 26v detects the contact of the orifice plate 108 with the front end face of the heater board 102. Thus the position of the top plate 104 along the y-axis direction is simply defined. More specifically, the sensor 26v is turned on in step S26G, then in step S26H, the motion of the engaging pieces 26m and 26n is stopped. Furthermore, in step S26E, as a preparation for the x-axis aligning operation, a thickness calibration operation of the top plate 104 is performed, thereby setting the optimal positional relationship between the top plate 104 and the suction members 26b and 26c in the first aligning mechanism 27. More specifically, the thickness calibration operation of the top plate 104 in step S26I is performed in order to automatically adjust the arranging positions of the suction members 26b and 26c (the height position from the upper surface of the top plate 104) in accordance with the thickness of the top plate 104. This thickness calibration operation will be described in detail as a subroutine later.

In this manner, a series of temporary placing operations of the top plate 104 onto the heater board 102 are ended, and the control returns to the main routine.

Furthermore, from step S26D to step S26H in the above explanation, each operation is described as being performed once per step, however, the present invention is not limited to this. For example, steps S26D to S26H as one set may be repetetively executed plural times. By repeating this set of steps several times, in the temporary alignment operation of the top plate 104 on the heater board 102, the relative position between both members can be comparatively precisely defined.

Thickness Calibration Operation of Top Plate 104 in Step S26E

Next, the thickness calibration operation of the top plate 104 in step S26E will be described with reference to the flowchart shown in FIG. 31 and FIGS. 32 to 36.

Figure 31:
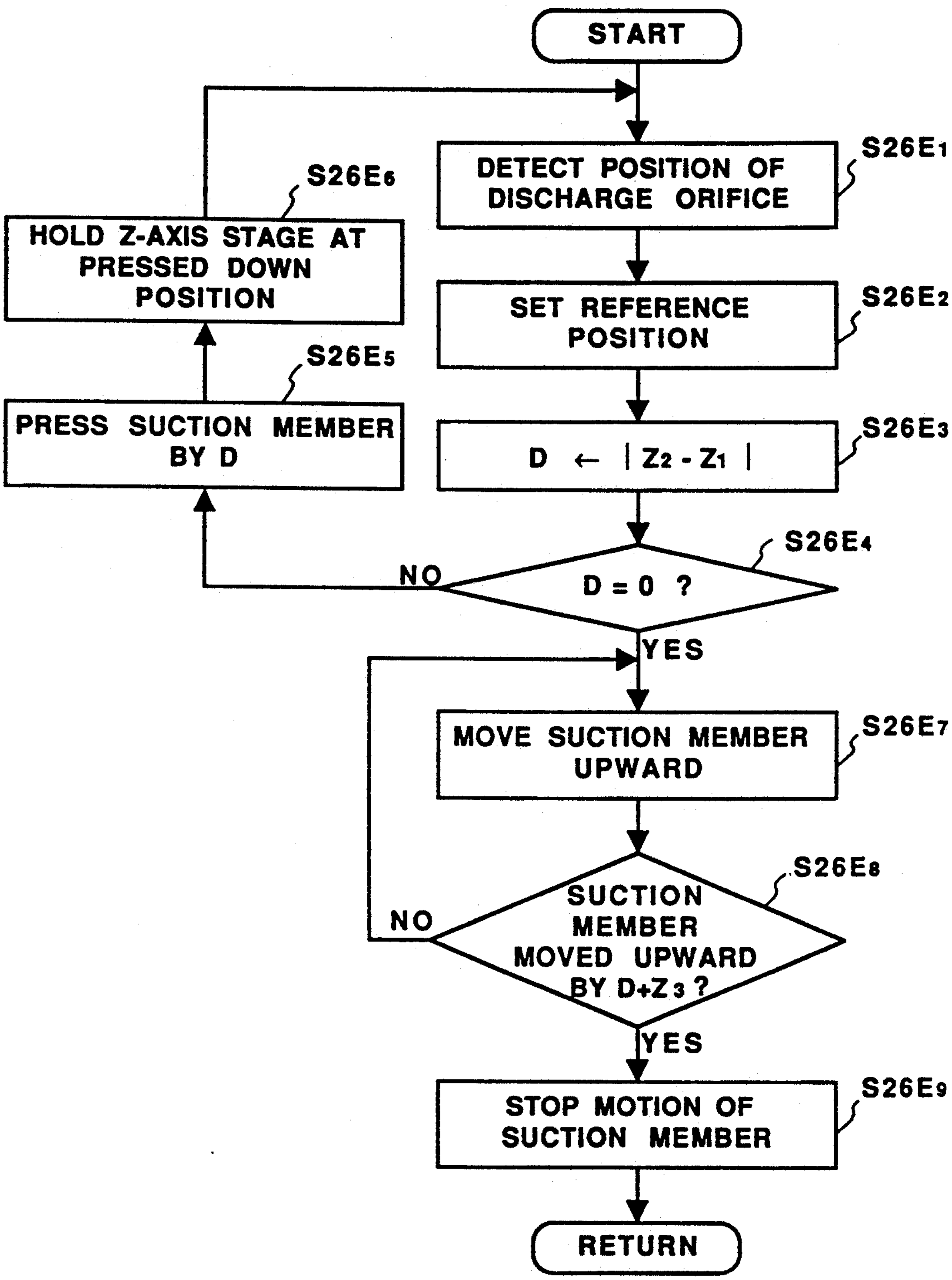
FIG. 31 is a flowchart showing as a subroutine a control operation of a thickness calibration operation of the top plate.
Figure 32:
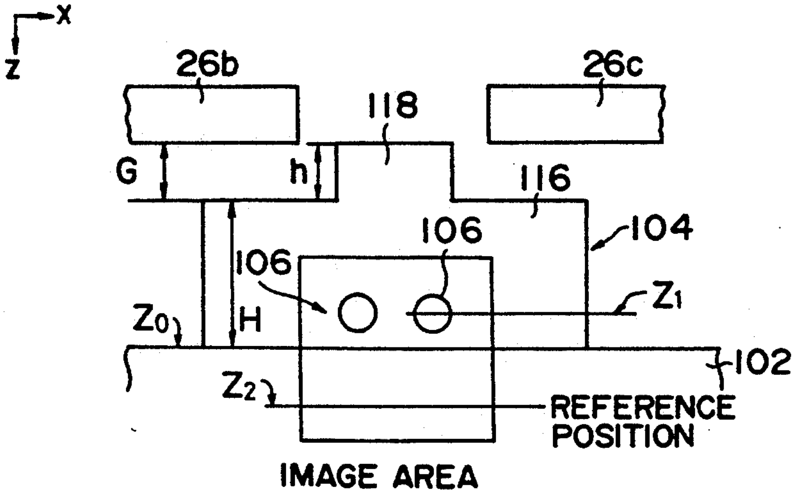
FIGS. 32 to 36 are diagrams sequentially showing an actual procedure of the thickness calibration operation of the top plate.

When the engaging pieces 26m and 26n of the first aligning mechanism 27 are moved to bring the orifice plate 108 into contact with the front end face of the heater board 102 in the above-mentioned step S26D, this calibration operation is started. More specifically, in a state where the top plate 104 is dropped on the heater board 102 in the above-mentioned step S26C, the suction members 26b and 26c are a predetermined distance above the upper surface of the heater board 102 at a predetermined height position ($Z_0$), as shown in FIG. 31. For this reason, the gap (G) between the lower surfaces of the suction members 26b and 26c and the top plate main body 116 changes in accordance with the thickness of the top plate main body 116 (H).

When the gap (G) is larger than the height (h) of the ink reception port 118, at least the first suction member 26b does not abut against the ink reception port 118 from a side direction even if the suction member 26b moves along the x-axis direction. As a result, the position adjustment operation of the top plate 104 in the x-axis direction becomes impossible. For this reason, in order that the first suction member 26b can abut against the ink reception port 118 along the x-axis direction even though the thickness of the top plate main body 116 varies, a height position adjustment operation of the suction members 26b and 26c, i.e., the thickness calibration operation of the top plate 104 is started.

As shown in the flowchart of FIG. 31, in step $S26E_1$, the position of the discharge orifice 106 ($Z_1$) is detected via the first position detection mechanism 40 having the first ITV camera 40g. In step $S26E_2$, a reference position ($Z_2$) is set below the upper surface of the heater board 102 within an image area. Thereafter, in step $S26E_3$, the difference between the reference position C and the detected position of the discharge orifice 106 ($Z_1$), i.e., a distance D between the both positions in the z axis direction is calculated. In step $S26E_4$, it is determined whether the distance D is 0 or not.

If No in the step $S26E_4$, that is, when it is determined that the reference position ($Z_2$) does not coincide with the detected position ($Z_1$) of the discharge orifice 106 and that there exists a predetermined distance, the first z-axis stage 20 is driven via a z-axis stage driver 36b to move the overall attaching mechanism 26 downward along the z-axis direction by the distance D in step $S26E_5$. Thus the suction members 26b and 26c are pushed down along the z-axis direction by the distance D. As a result, as shown in FIG. 33, the suction members 26b and 26c go through the gap (G) to abut against the upper surface of the top plate main body 116 and then push the top plate 104 and the heater board 102 on which the top plate 104 is placed downward, opposing to the biasing force by the coil spring 34c in the joint force generating mechanism 34 (FIG. 8) In step $S26E_6$, at this position, the drive of the first z-axis stage 20 is stopped and the first z-axis stage 20 is held at the position.

Figure 33:
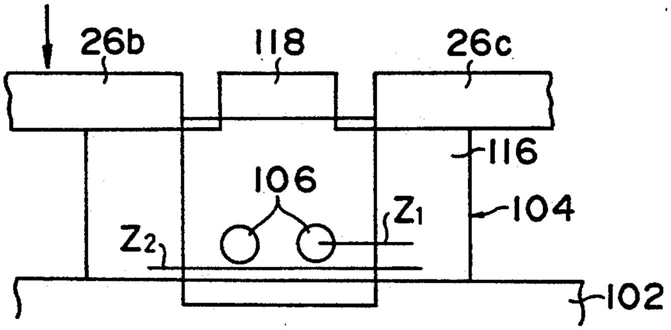

In this state, as the suction members 26b and 26c are in contact with the upper surface of the top plate main body 116, the discharge orifice 106 does not coincide with the reference position ($Z_2$) as shown in FIG. 33. For this reason, the procedure returns to step $S26E_1$, where the position of the discharge orifice 106 ($Z_1$) is again detected via the position detection mechanism 40. Thereafter, step $S26E_2$ and the subsequent steps are executed and this loop is repeated until it is determined YES in step $S26E_4$.

Figure 34:
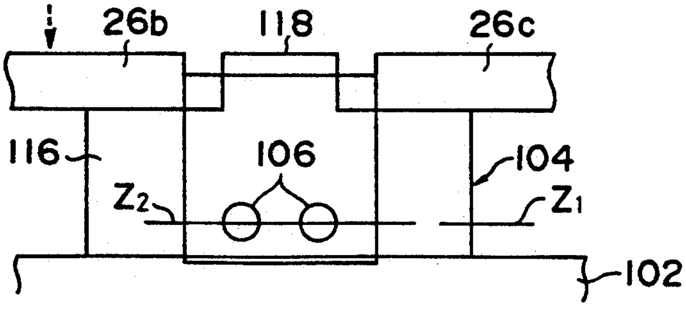
Figure 35:
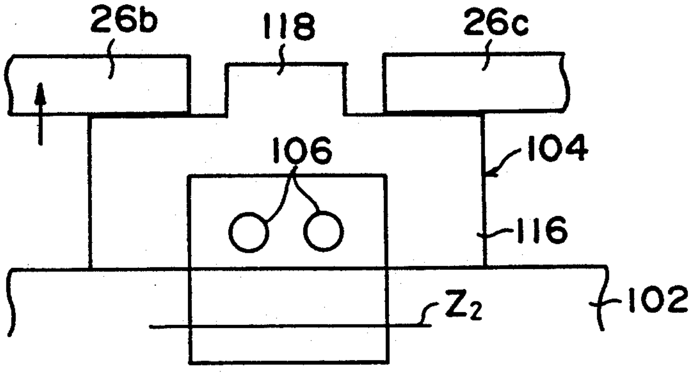
Figure 36:
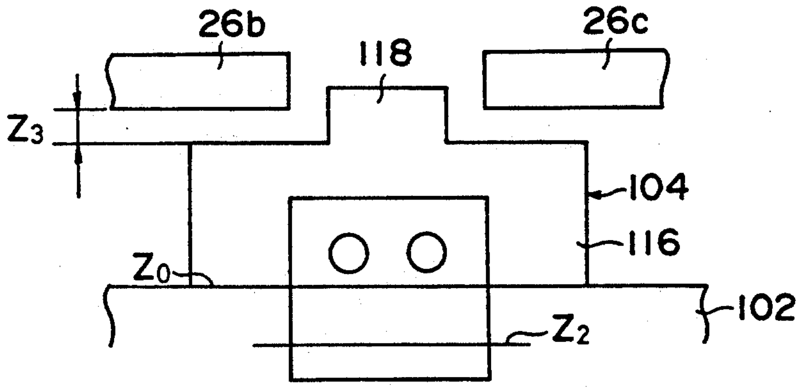
Figure 37:
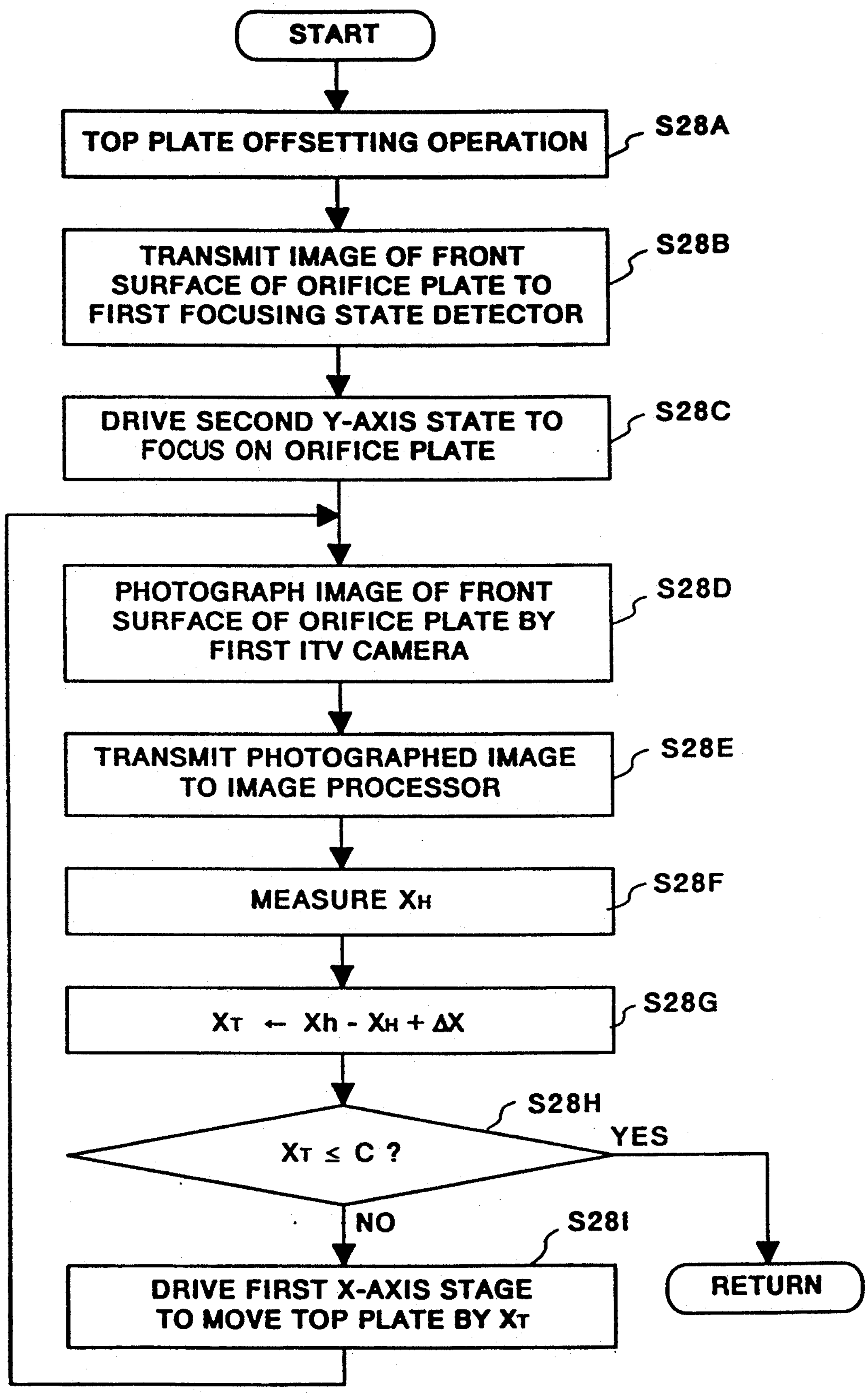
FIG. 37 is a flowchart showing a control procedure of an alignment operation of the top plate to the heater board in x-axis direction.

As shown in FIG. 34, when the discharge orifice 106 coincides with the reference position ($Z_2$), the distance D becomes 0, and it is determined YES in step $S26E_4$. When YES in step $S26E_4$, the process advances to step $S26E_7$, where the first z-axis stage 20 is driven via the z-axis stage driver 36*b* to move the overall attaching mechanism 26 upward along the z-axis direction, thus the suction members 26*b* and 26*c* are moved upward. As shown in FIG. 35, the lower surfaces of the suction members 26*b* and 26*c* are in contact with the upper surface of the top plate main body 116 until the upper surface of the heater board 102 returns to the above-mentioned predetermined height position ($Z_0$) in accordance with the motion of the suction members 26*b* and 26*c*. By further moving the suction members 26*b* and 26*c* after the upper surface of the heater board 102 returns to the predetermined height position ($Z_0$), a gap is formed between these suction members 26*b* and 26*c* and the top plate main body 116.

In step $S26E_8$, it is determined whether the upper surface of the heater board 102 has been moved upward by a distance which is an amount calculated by adding a gap ($Z_3$) as a separating amount of the upper surface of the top plate main body 116 upward from the reference position to the distance D as an amount of returning of the upper surface of the top plate main body 116 to the predetermined height position ($Z_0$). When it is determined YES in step $S26E_7$, that is, it is determined that the upper surface of the heater board 102 has been moved upward by $D+Z_3$, the drive of the first z-axis stage 20 via the z-axis stage driver 36*b* is stopped in step $S26E_9$. Thus the thickness calibration operation is ended and the procedure returns to the main routine.

At the point in time where the step $S26E_8$ has been executed, the lower surface of the suction members 26*b* and 26*c* are held at a position above the upper surface of the top plate main body 116 by the distance $Z_3$. This distance $Z_3$ is set to be a value smaller than the height (h) of the ink reception port 118. As a result, in a state where the thickness calibration operation of the top plate 104, the suction members 26*b* and 26*c* are set to be abuttable against the ink reception port 118 from the side direction along the x-axis direction. An aligning operation of the top plate 104 in the x-axis direction described later will be possible by this thickness calibration operation.

X-axis Aligning Operation of Top Plate 104 to Heater Board 102 in Step S28

The x-axis aligning operation of the top plate 104 on the heater board 102 in step S28 will be described below with reference to the flowchart shown in FIG. 37, and FIGS. 38 to 43.

In the temporary placing operation of the top plate 104 described above, the attaching mechanism 26 is moved to the designed attaching position by driving the first position adjustment mechanism 14, and thereafter, the top plate 104 is dropped from the attaching mechanism 26 onto the heater board 102. The top plate 104 is then aligned with the above-mentioned designed attaching position, thus executing the temporary placing operation.

As has already been described above, since the aligning pitch of the discharge orifices 106 formed in the orifice plate 108 of the top plate 104, and that of the discharge heaters 112 formed on the heater board 102 are on the order of microns, not only designed absolute alignment but also alignment of the discharge orifices 106 relative to the discharge heaters 112 must be executed, so that the corresponding discharge heaters 112 and discharge orifices 106 are assembled within the predetermined positional precision. Since the aligning direction of these discharge orifices 106 and the discharge heaters 112 is set in the x-axis direction, the final alignment of the top plate 104 to the heater board 102 is performed via image processing in only the x-axis direction.

Figure 38:
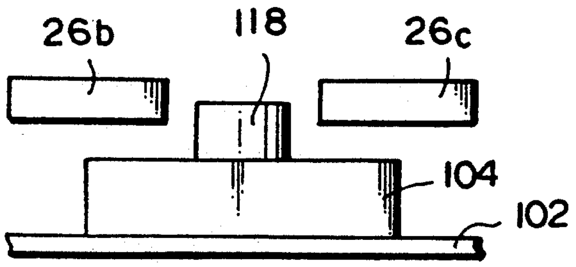
FIGS. 38 to 41 are diagrams sequentially showing a procedure of an offset operation of the top plate.
Figure 39:
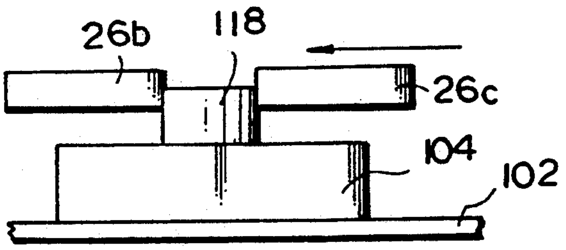
Figure 40:
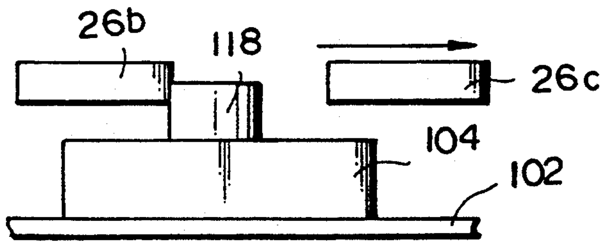
Figure 41:
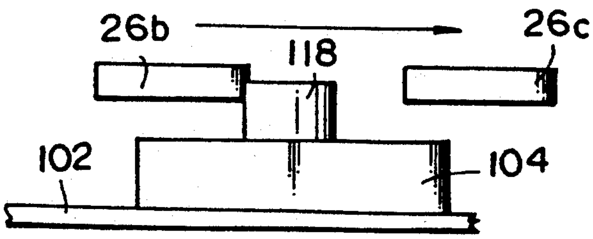

When the x-axis aligning operation is started, in step S28A, an offsetting operation of the top plate 104 is executed. More specifically, in the offsetting operation, as shown in FIG. 38, the movable suction member 26*c* is moved toward the stationary suction member 26*b* from a state wherein the cylindrical ink reception port 118 of the top plate 104 is located between the two suction members 26*b* and 26*c* as shown in FIG. 39, until the ink reception port 118 abuts against the stationary suction member 26*b*. As shown in FIG. 40, the movable suction member 26*c* is returned to the original position, and as shown in FIG. 41, the two suction members 26*b* and 26*c* are integrally moved, i.e., the attaching mechanism 26 is entirely moved, thereby moving the top plate 104 to a predetermined position. In this manner, the offsetting operation of the top plate 104 is completed.

Figure 42:
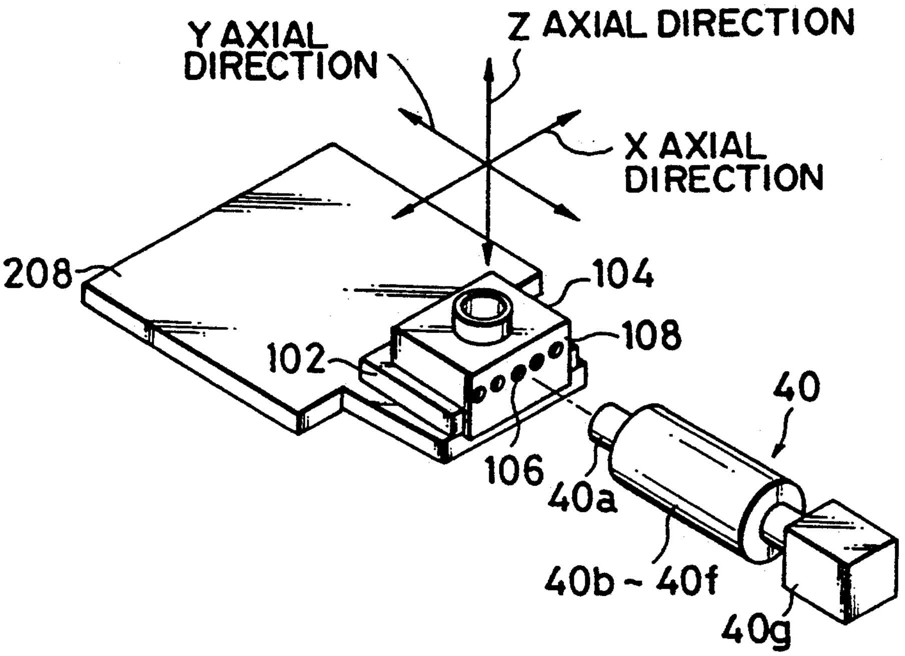
FIG. 42 is a perspective view showing a state where an orifice plate is photographed in the alignment operation of the top plate to the heater board in x-axis direction.

Upon completion of the offsetting operation of the top plate 104, in step S28B, the image of the front surface of the orifice plate 108 attached to the front portion of the top plate 104 temporarily placed on the heater board 102 is transmitted to the first focusing state detector 48 via the focusing state judgment first optical system 40*e* of the first position detection mechanism 40, as shown in FIG. 42. In step S28C, the second y-axis stage 32 is driven so as to integrally move the heater board 102 and the top plate 104 in the y-axis direction, so that an in-focus state, i.e., focusing, is attained by the first focusing state detector 48.

This focusing operation can be completed within a very short period of time since the first ITV camera 40*g* has already been focused with respect to the front surface of the orifice plate 108 in steps S22P to S22R in the aligning operation of the heater board 102 described above. In addition, the focusing operation can be reliably prevented from being disabled when the front surface of the orifice plate 108 falls outside an in-focus range.

Figure 43:
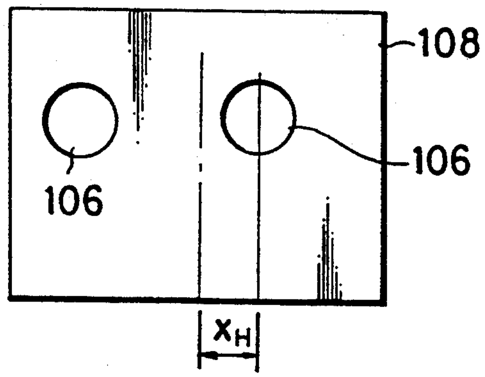
FIG. 43 is a diagram showing an image of a discharge orifice of the orifice plate photographed by the first ITV camera.

When the focusing operation is completed in step S28C, the front surface of the orifice plate 108 fixed to the front surface side of the top plate 104 temporarily placed on the heater board 102 is photographed by the first ITV camera 40*g* of the first position detection mechanism 40 in step S28D. The image of the orifice plate 108 photographed by the first ITV camera 40*g* is a precisely focused, sharp image, as shown in FIG. 43, since the focusing operation is completed.

Thereafter, in step S28E, the image photographed in step S28C is transmitted to the image processor 44 via the first signal converter 46. In step S28F, the distance $x_H$ from the center of the screen to the central position of the discharge orifice 106, which is determined to be most adjacent to the central discharge heater 112*c* described above, is electrically measured on the basis of the image photographed through the first ITV camera 40g. In the same manner as in the aligning operation of the heater board 102 in step S22 described above, the central line of the screen corresponds to the assembling operation position α, and this distance $x_H$ represents an x-axis shift amount from the assembling operation position α to the discharge orifice 106 to be combined with the central discharge heater 112c.

Upon completion of the measurement of the shift amount $x_H$ from the central line of the discharge orifice 106 corresponding to the above-mentioned central discharge heater 112c, in step S28G, a moving amount $x_T$ necessary for moving the top plate 104 comprising the orifice plate 108 formed with this discharge orifice 106 in the x-axis direction is calculated using the following equation, so that the central discharge heater 112c precisely vertically coincides with the corresponding discharge orifice 106:

$$x_T = x_h - x_H + \Delta x$$

In step S28H, it is checked if the calculated moving amount $x_T$ is smaller than an x-axis alignment rated adjustment range C prestored in a data disk. If YES in step S28H, i.e., if it is determined that the moving amount $x_T$ is smaller than the rated adjustment range C, the control unit 38 determines that the x-axis positions of the discharge heaters 112 of the heater board 102, and the discharge orifices 106 formed in the orifice plate 108 of the top plate 104 coincide with each other, and ends the control procedure of the x-axis aligning operation. The control then returns to the main routine.

On the other hand, if NO in step S28H, i.e., if it is determined that the moving amount $x_T$ is larger than the rated adjustment range C, the first x-axis stage 18 is driven to move the top plate 104 by a distance corresponding to the moving amount $x_T$ in step S28I, and the flow then returns to step S28D.

When the top plate 104 is aligned with the heater board 102 in this manner, the central line of the discharge heater 112c located at the center of the heater board 102, and that of the discharge orifice 106, most adjacent to the discharge heater 112c, of the orifice plate 108 of the top plate 104 can coincide with each other in the x-axis direction.

In this manner, a series of x-axis aligning operations between the top plate 104 and the heater board 102 are ended, and the control returns to the main routine.

In particular, in this embodiment, upon alignment of the top plate 104 to the heater board 102 with respect to the x-axis direction, the ink reception port 118 of the top plate 104 is pushed by the end face of the first suction member 26b, as a result, the top plate is moved in the x-axis direction. The orifice plate 108 integrally attached to the top plate 104 is pressed against the front end face of the heater board 102 in the above-mentioned step S26D. Accordingly, the contacting state of this orifice plate 108 and the heater board 102 acts as frictional resistance upon motion of the top plate 104 in the x-axis direction.

Assuming that this frictional resistance acts one-sidedly upon moving of the top plate 104 in the x-axis direction, when the first suction member 26b pushes the ink reception port 118, the top plate 104 does not move straight along the x axis direction, but irregularly moves pivotally with the orifice plate 108 as a supporting point, disturbing a precise alignment. However, in this embodiment, to the opposite side of the top plate 104 to which the orifice plate 108 is attached, the adhesives 80a and 80b having appropriate adhesion are applied, which similarly acts as frictional resistance. Accordingly, in moving the top plate 104 along the x-axis direction,. the both frictional forces are balanced. Thus the alignment of the top plate 104 in the x-axis direction can be attained.

Adhering Operation of Top Plate 104 to Heater Board 102 in Step S30

Figure 44:
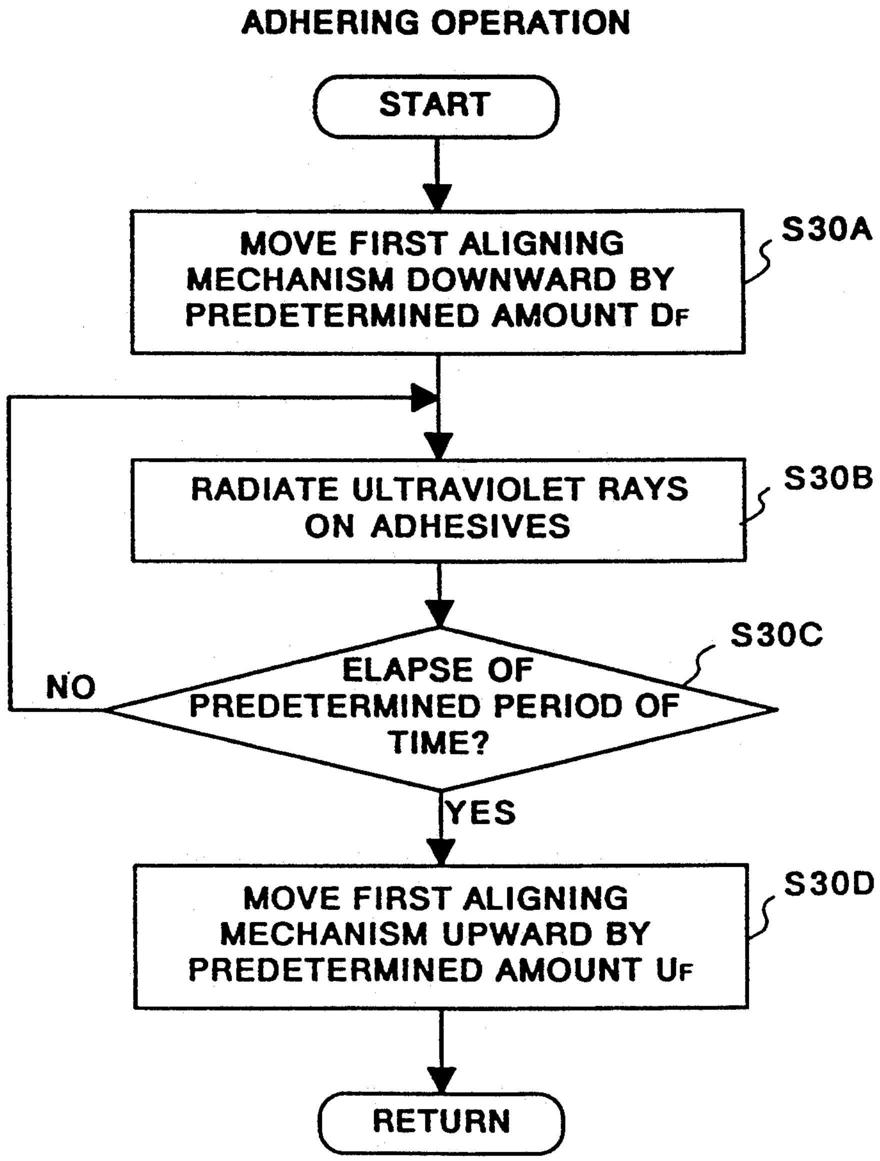
FIG. 44 is a flowchart showing a joint operation of the top plate and the heater board.
Figure 45:
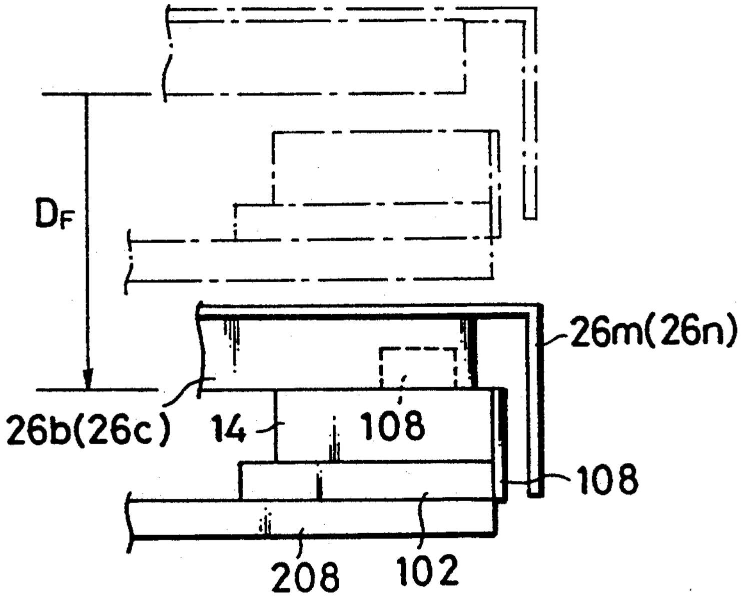
FIG. 45 is a diagram for explaining a state where a joint force is generated.

The adhering operation of the top plate 104 onto the heater board 102 in step S30 will be described below with reference to the flowchart shown in FIG. 44, and FIG. 45.

Upon completion of the x-axis aligning operation of the top plate 104 to the heater board 102 in step S28, in step S30A, the first z-axis stage 20 in the first position adjustment mechanism 14 is started, thereby moving the entire first aligning mechanism 27, i.e., the first and second suction member 26b and 26c downward by a predetermined amount $D_F$ in the z-axis direction. The first and second suction members 26b and 26c abut against the top plate 104 during the downward movement, as shown in FIG. 45. In this case, the top plate 104 contacting the suction members is pushed downward against the biasing force of the coil spring 34c in the joint force generation mechanism 34 while integrally accompanying the heater board 102 therebelow.

The predetermined downward movement amount $D_F$ of the first z-axis stage 20 is set to be a value enough to apply a biasing force generated in the coil spring 34c when the top plate 104 and the heater board 102 are pushed downward upon this downward movement to a portion between the top plate 104 and the heater board 102 as a predetermined joint force.

When the predetermined joint force is generated between the heater board 102 and the top plate 104 in this manner, the ultraviolet light source 58 emits ultraviolet rays in step S30B. The ultraviolet rays are guided to the pair of ultraviolet transmission suction members 26b and 26c via the pair of light guides 56, and are radiated on the adhesives 80a and 80b via these suction members. As a result, since these adhesives 80a and 80b have ultraviolet-setting characteristics, they begin to be set, i.e., exhibit adhering forces. More specifically, the heater board 102 and the top plate 104 are adhered to each other via the adhesives 80a and 80b while they are in tight contact with each other by the predetermined joint force.

As described above, when the joint force in the joint force generation mechanism 34 is to be changed, the washer 34b is rotated, and is moved along the axial direction of the guide shaft 34a, thereby changing a deformation amount of the coil spring 34c.

Thereafter, in step S30C, the control waits for an elapse of a predetermined period of time, i.e., waits until the adhesives 80a and 80b are completely set. In step S30D, the first z-axis stage 20 in the first position adjustment mechanism 14 is started again, thereby moving the entire first aligning mechanism 27, i.e., the first and second suction members 26b and 26c upward by the same upward movement amount $U_F$ as the above-mentioned downward movement amount $D_F$ in the z-axis direction. As a result, the first and second suction members 26b and 26c are moved upward until they are separated upward from the top plate 104, and stand by at that position.

In this manner, the control procedure of a series of adhering operations is completed, and the control returns to the main routine.

Fixing Operation of the Top Plate 104 in Step S31

Figure 47:
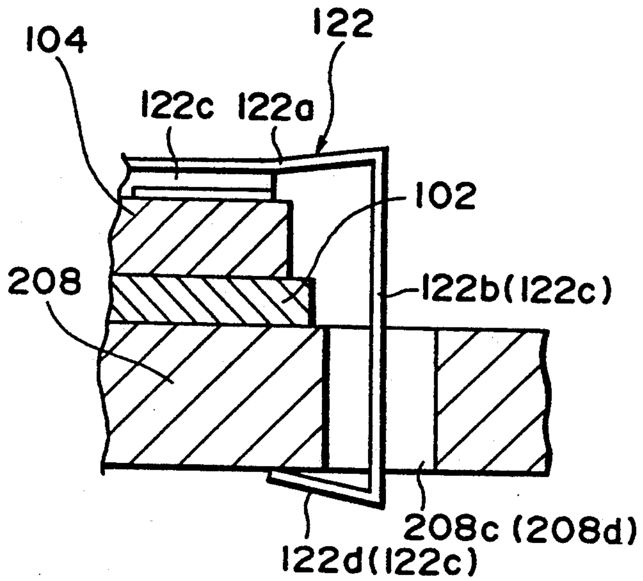
FIGS. 47 and 48 are respectively a sectional side view and a sectional front view showing a state where the top plate is fixed on the heater board via a spring member.
Figure 48:
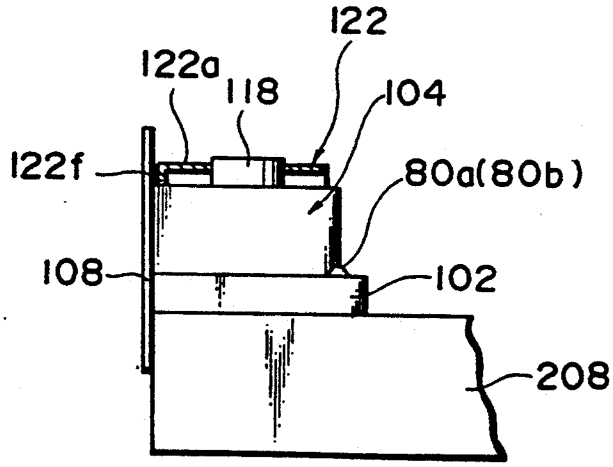

Next, a fixing operation of the top plate 104 in step S31 will be described with reference to FIGS. 46 to 48.

Figure 46:
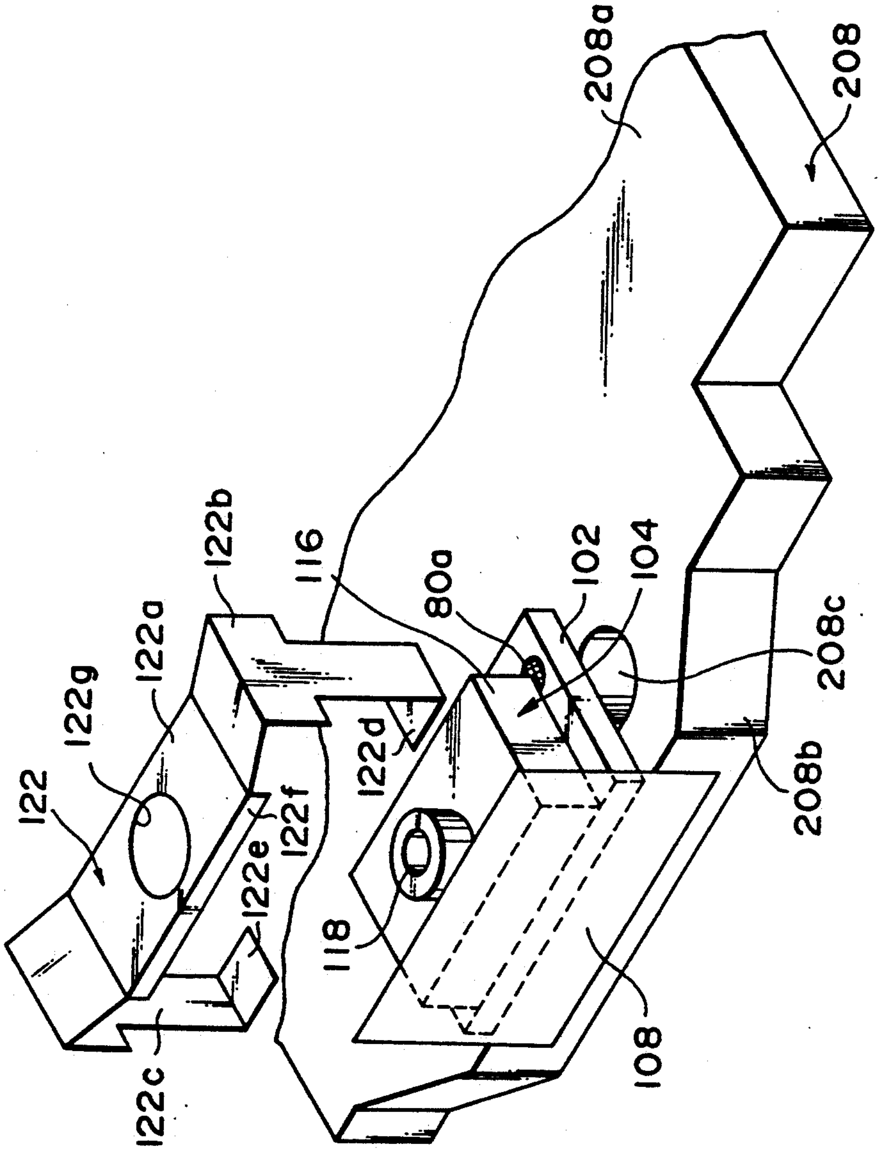
FIG. 46 is a perspective view showing a state where the top plate is fixed on the heater board.

As shown in FIG. 46, the spring member 122 which is employed to fix firmly the top plate 104 to the heater board 102 is integrally formed by a spring main body 122*a* which press-abuts against the upper surface of the top plate main body 116 and push the top plate main body 116 downward, springarms 122*b* and 122*c* respectively projected downward from the both sides of the spring main body 122*a*, clamps 122*d* and 112*e* folded inward from the lower end portions of the springarms 122*b* and 122*c*, and a press-joint piece 122*f* folded inward from the front side portion of the spring main body 122*a* (the side end to abut against the orifice plate 108). At the central portion of the spring main body 122*a*, an opening 122*g* through which the ink reception port 118 on the upper surface of the top plate main body 116 is inserted is formed.

On the other hand, in the base member 208, attaching holes 208*c* and 208*d* through which the springarms 122*b* and 122*c* are inserted are formed adjacent to the both side ends of the heater board 102. These attaching holes 208*c* and 208*d* are formed through the base member 208 in the thickness direction, and they are made large enough to be inserted with the springarms 122*b* and 122*c*. The distance between the attaching holes 208*c* and 208*d* (the distance between the side ends of the heater board 102) is set to be slightly shorter than the interval between the springarms 122*b* and 122*c*. As a result, the springarms 122*d* and 122*e* are widened and inserted into the corresponding attaching holes 208*c* and 208*d*, and then the widened state of the springarms 122*d* and 122*e* are released. The springarms 122*d* and 122*e* are re-deformed inward and the clamps 122*d* and 122*e* are hooked under the base member 208.

The length of the both springarms 122*b* and 122*c* is set to be long enough so that the spring main body 122*a* press-abuts on the upper surface of the top plate main body 116 to push the top plate main body 116 downward with the clamps 122*d* and 122*e* being hooked under the base member 208. In the state where the spring main body 122*a* press-abuts on the upper surface of the top plate main body 116, the press-joint piece 122*f* formed at the front side end of the spring main body 122*a* firmly presses the front end portion of the spring main body 116. As a result, as described with reference to FIG. 4, the arranging area of the heater 112 arranged at the front end portion of the heater board 102 and the ink channel portion defined at the front end portion of the top plate 104 are tightly adhered, which prevents ink leakage.

In particular, in this embodiment, the fourth area D as an arranging area of the adhesives 80*a* and 80*b* is set far away from the first area A as a heater arranging area, which prevents applied adhesives 80*a* and 80*b* from seeping into the heater arranging area and degrading the above tight adherence.

When the fixing operation is started, in the above-mentioned state where the top plate 104 is temporarily attached on the heater board 102 via the adhesives 80*a* and 80*b*, the spring member 122 is held by a robot hand (not shown) and the springarms 122*b* and 122*c* are widened to be inserted into the attaching holes 208*c* and 208*d* from an upper direction. Thereafter, the springarms 122*b* and 122*c* are inserted into the attaching holes 208*c* and 208*d* and, as shown in FIG. 35, the ink reception port 118 is moved downward through the opening 112*g*. At a point in time when the clamps 122*d* and 122*e* are projected far below the lower surface of the base member 208, the spring member 122 is stopped and the widened state of the springarms 122*b* and 122*c* is released. Thus the spring member 122 is fixed on the base member 208 with firmly pressing the top plate 104 on the heater board 102.

The fixing operation of the top plate 104 is ended in this manner, and the robot hand releases the spring member 122 and returns to an initial position.

Product Delivery Operation in Step S32

Figure 49:
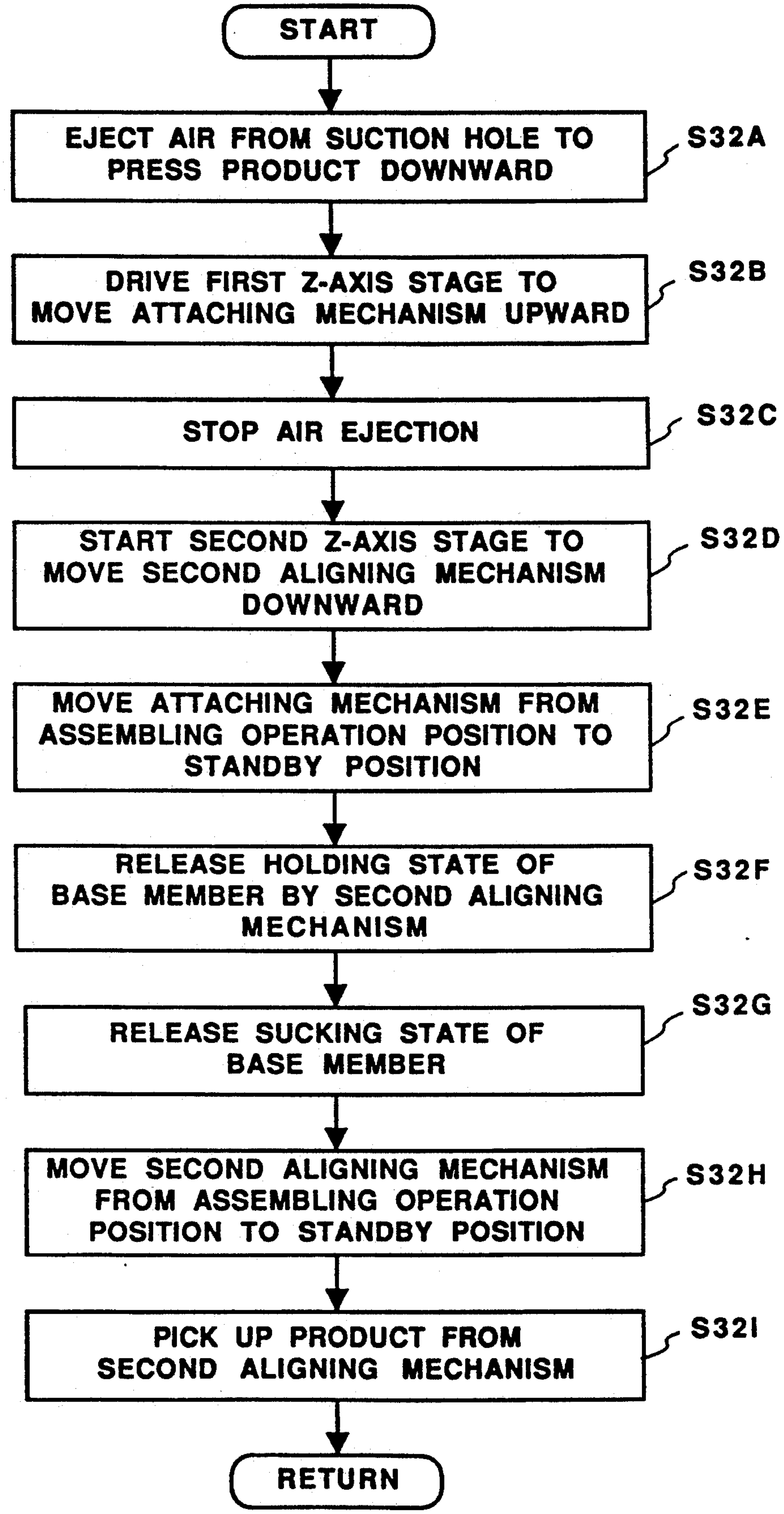
FIG. 49 is a flowchart showing an ejection operation of an assembly as a finished product.

The product delivery operation in step S32 will be described below with reference to the flowchart shown in FIG. 49.

In step S30 described above, the heater board 102 and the top plate 104 which are aligned with each other are adhered to each other via the adhesives 80*a* and 80*b*, thus forming an assembly as a product in step S31. When the product is finally formed, the delivery operation of the product is started.

When the delivery operation is started, the selector valves (not shown) in the first aligning mechanism 27 are switched to be connected to the positive pressure generation mechanism in step S32A. As a result, compressed air is ejected (reversely ejected) from the pair of suction holes 26*d* and 26*e*, and the assembly of the top plate 104 and the heater board 102 as the product is pressed downward. Thereafter, in step S32B, the first z-axis stage 20 is started again to move the attaching mechanism 26, i.e., the entire first aligning mechanism 27 upward, so that the ink reception port 118 attached to the upper surface of the top plate 104 is disengaged from a gap between the two suction members 26*b* and 26*c*. In this manner, the first aligning mechanism 27 is set in a desirably movable state in the horizontal plane.

Thereafter, in step S32C, the selector valves are switched to an air open position to stop the reverse ejection operation. In step S32D, the second z-axis stage 30 of the second position adjustment mechanism 16 is started to move the entire second aligning mechanism 33 downward. In step S32E, the first position adjustment mechanism 14 is started to return the entire attaching mechanism 26 from the assembling operation position $\alpha$ to the standby position.

In step S32F, the release mechanism 33D of the second aligning mechanism 33 is started to release the clamping state in the x- and y-axis directions of the base member 208. In step S32G, the driving force of the suction mechanism 33E is stopped to release the holding state of the base member 208 in the z-axis direction. In this manner, the base member 208, i.e., the heater board 104 and the top plate 102 attached on the base member 208 can be detached from the second aligning mechanism 33. Thereafter, in step S32H, the second position adjustment mechanism 16 is started to return the entire second aligning mechanism 33 from the assembling operation position to the standby position. Finally, in step S32I, the product is picked up from the second aligning mechanism 33 while holding the base member 208 of the product via a supply robot (not shown), and is conveyed to a product storage station. In this manner, a series of product delivery operations are ended, and the control returns to the main routine.

As described in detail above, when the assembling apparatus 10 of this embodiment, and the assembling method in this assembling apparatus 10 are practiced, the heater board 102 and the top plate 104 as precision components can be adhered to each other without damaging these components upon application of an excessive assembling force, while the discharge heaters 112 of the heater board 102 and the discharge orifices 106 of the top plate 104 are precisely assembled to each other with predetermined precision.

In particular, in the above embodiment, the assembling apparatus 10 can eliminate manual operations, and can achieve full-automatic operations. As a result, according to this assembling apparatus, the position adjustment precision can be kept constant depending on the processing precision of the image processor 44, thus improving reliability. A time required for aligning the top plate 104 and the heater board 102 in the x-axis direction can be shortened as much as possible basically depending on a processing time in the image processor 44, thus improving assembling efficiency. Furthermore, workers can be free from visual measurement over a long period of time, and eye strain upon radiation of ultraviolet rays, thus improving working environment.

According to the second example of the supply operation of the top plate in this embodiment, in what manner the top plate 104 which are set on the tray 302 at random are held by the finger 300, they are re-held by the finger 300 at the temporary aligning station 304 in the precisely aligned state, and the supply position to the heater board 102 can be precisely defined. As a result, in an ink-jet head assembling method which requires a delicate alignment, a precise placing of the top plate 104 on the heater board 102 can be attained.

Further, in this embodiment, when the temporary placing operation is started, the first position adjustment mechanism 14 is driven to move the top plate 104 as a member to be aligned to a position right above the heater board 102 as a base plate with maintaining an enough interval between them. Thereafter, the position adjustment mechanism 14 moves the top plate 104 downward along the z-axis direction and extracts the interval between the heater board 102. In step S26C, from the state where the lower surface of the top plate 104 is floated in the air slightly above the upper surface of the heater board 102, the top plate 104 is dropped on the heater board 102. At this time, the top plate 104 is placed on the heater board 102 without being precisely aligned. Thereafter, the movable second suction member **26*c* of the first aligning mechanism 27 is moved along the x-axis direction toward the statonary first suction member 26*b*, to bring the ink reception port 118 of the top plate 104 into contact with the end face of the first suction member 26*b*. The position of the top plate 104 in the x-axis direction is simply defined. The motion of the second suction member 26*c* is stopped, and then the engaging pieces 26*m* and 26*n* of the first aligning mechanism 27 are moved to push the rear surface (the fourth surface) of the orifice plate 108 against the front end face (the second surface) of the heater board 102. The above contact of the orifice plate 108 with the heater board 102 is detected by the sensor 26*v*. The position of the top plate 104** along the y-axis direction is thus simply defined.

In this manner, the series of the temporary placing operations of the top plate 104 on the heater board 102 is ended.

In this embodiment, upon assembling the printing head 100 by combining the top plate 104 and the heater board 102, quick precise alignments and management of a constant contact pressure between the top plate 104 and the heater board 102 are realized, diminishing the number of rejects by breakage of the members.

It goes without saying that the present invention is not limited to the above embodiment, it can be modified within a scope thereof.

For example, in the above embodiment, it is described that the top plate 104 is temporarily adhered to the heater board 102 with the adhesives and is fixed with a spring member, the top plate 104 may be fixed only with the adhesives.

The present invention is not limited to the above embodiment and various changes and modifications can be made within the spirit and scope of the present invention. Therefore, to apprise the public of the scope of the present invention, the following claims are made.

What is claimed is:

1. An ink-jet head assembling method for assembling a head nozzle of a printing head for discharging ink by mounting a top plate member upon a heater board having a plurality of heaters for heating the ink, the top plate member having a plurality of nozzles corresponding to the heaters and an ink reception portion on its upper surface, said method comprising the steps of:

providing a top plate member having a plurality of nozzles and an ink reception portion and a heater board having a plurality of heaters;

applying an adhesive to the heater board;

holding the top plate member by a set of fingers;

moving the fingers to place the top plate member on the heater board with the adhesive interposed between the top plate member and the heater board, and then releasing the holding by the fingers so that the fingers are in a position to engage the ink reception portion from a lateral direction in a top plate member and heater board supply step;

adjusting a relative position between the heaters of the heater board and the nozzles of the top plate member by moving the fingers in a lateral direction to abut against the ink reception portion;

adhering the top plate member to the heater board with the adhesive;

fixing the heater board and the plate member adhered in said adhering step to a base plate via a spring member, wherein said top plate member and heater board supply step includes the substeps of:

detecting arranging positions of the nozzles;

calculating errors between a reference position set below an arranging position of the heater board and the detected arranging position of the nozzles;

moving the fingers downward by the calculated error; and moving the fingers upward by a predetermined value, wherein by performing said moving-up substep, a fixed amount of a gap between the top plate member and the fingers can be maintained, and the fingers are moved in a lateral direction to engage the ink reception portion.

2. An ink-jet head assembling method for assembling a head nozzle of a printing head for discharging ink by mounting a top plate member upon a heater board having a plurality of heaters for heating the ink, the top plate member having a plurality of nozzles corresponding to the heaters and an ink reception portion on its upper surface, said method comprising the steps of:

providing a top plate member having a plurality of nozzles and an ink reception portion and a heater board having a plurality of heaters;

applying an adhesive to the heater board;

holding the top plate by a set of fingers;

moving the fingers to place the top plate member on the heater board with the adhesive interposed between the top plate member and the heater board, and then releasing the holding by the fingers so that the fingers are in a position to engage the ink reception portion from a lateral direction in a top plate member and heater board supply step;

adjusting a relative position between the heaters of the heater board and the nozzles of the top plate member by moving the fingers in a lateral direction to abut against the ink reception portion;

adhering the top plate member to the heater board with the adhesive;

fixing the heater board and the plate member adhered in said adhering step to a base plate via a spring member, wherein said top plate member and heater board supply step includes the substeps of:

holding one of plural top plate members on a tray and picking up a top plate member in a first pickup substep;

conveying the top plate member picked up in said first pickup step to a temporary aligning station in a first convey substep;

releasing the top plate member and placing the top plate member on the temporary aligning station;

aligning the top plate member to a predetermined position in the temporary aligning station;

holding and then picking up the top plate member in a second pickup substep;

conveying the top plate member picked up in said second pickup substep to the heater board; and releasing the top plate member and placing the top plate member on the heater board.

3. The method according to claim 2, wherein in the alignment substep, the alignment of the top plate member is performed on a level with the temporary aligning station.

4. The method according to claim 2, wherein said alignment substep comprises the substeps of:

moving the top plate member along a lateral first direction and pressing the top plate member against a first reference member;

moving the top plate member along a second direction orthogonal to the first direction and pressing the top plate member against a second reference member; and detecting whether the aligned top plate member is at a predetermined position.

5. An ink-jet head assembling method for assembling a head nozzle of a printing head for discharging ink by mounting a top plate member upon a heater board having a plurality of heaters for heating the ink, the top plate member having a plurality of nozzles corresponding to the heaters and an ink reception portion on its upper surface, said method comprising the steps of:

providing a top plate member having a plurality of nozzles and an ink reception portion and a heater board having a plurality of heaters;

applying an adhesive to the heater board;

holding the top plate by a set of fingers;

moving the fingers to place the top plate member on the heater board with the adhesive interposed between the top plate member and the heater board, and then releasing the holding by the fingers so that the fingers are in a position to engage the ink reception portion from a lateral direction;

adjusting a relative position between the heaters of the heater board and the nozzles of the top plate member by moving the fingers in a lateral direction to abut against the ink reception portion;

adhering the top plate member to the heater board with the adhesive;

fixing the heater board and the plate member adhered in said adhering step to a base plate via a spring member, wherein said adjustment step includes the substeps of:

photographing the heaters on the heater board in a first photograph substep;

determining whether an identification mark of a reference heater exists in image information photographed in the first photograph substep;

measuring in a first measurement substep, when it is verified that the identification mark exists in said determining substep, the position of a reference heater;

photographing the nozzles holes including a reference nozzle hole corresponding to the reference heater in a second photograph substep;

measuring in a second measurement substep, the position of the reference nozzle hole from image information photographed in said second photograph substep; and p1 moving the heater board or the top plate member in accordance with the measurement results from the first and second measurement substeps, so that the reference heater and the reference nozzle hole coincide with respect to a vertical direction.

6. The method according to claim 5, wherein the identification mark is given corresponding to a heater positioned at the center of the heater board.

7. The method according to claim 5, wherein the reference nozzle hole is a nozzle hole adjacent to the opposite side in the direction in which the heater board or the top plate member is moved in the moving step.

8. The method according to claim 5, wherein in the determining substep, when the identification mark is not recognized, an alarm step of sounding an abnormality alarm is performed.

9. An ink-jet head assembling method for assembling a head nozzle of a printing head for discharging ink by mounting a top plate member upon a heater board having a plurality of heaters for heating the ink, the top plate member having a plurality of nozzles corresponding to the heaters and an ink reception portion on its upper surface, said method comprising the steps of:

providing a top plate member having a plurality of nozzles and an ink reception portion and a heater board having a plurality of heaters;

applying an adhesive to the heater board;

holding the top plate by a set of fingers;

moving the fingers to place the top plate member on the heater board with the adhesive interposed between the top plate member and the heater board, and then releasing the holding by the fingers so that the fingers are in a position to engage the ink reception portion from a lateral direction;

adjusting a relative position between the heaters of the heater board and the nozzles of the top plate member by moving the fingers in a lateral direction to abut against the ink reception portion;

adhering the top plate member to the heater board with the adhesive;

fixing the heater board and the plate member adhered in said adhering step to a base plate via a spring member, wherein said adhesive application step includes the substeps of:

placing the heater board on an application jig in a standby position;

conveying the application jig from the standby position to an application position;

stopping the application jig at the application position; and applying the adhesive to a predetermined position of the heater board to be adhered on the application jig stopped at the application position.

10. The method according to claim 9, wherein said application substep comprises the substeps of:

attaching the adhesive to a distal end of at least one applicator at an adhesive transfer station locked away from the application position;

moving the applicator from a transfer position to the application position; and moving the applicator to contact a predetermined position of the heater board to be adhered from an upper direction and transferring the adhesive attached to the distal end of the at least one applicator to the predetermined position of the heater board.

* * * * *

UNITED STATES PATENT AND TRADEMARK OFFICE
CERTIFICATE OF CORRECTION

PATENT NO. : 5,305,521

DATED : April 26, 1994

INVENTOR(S) : MASAKI INABA, ET AL.

It is certified that error appears in the above-identified patent and that said Letters Patent is hereby corrected as shown below:

COLUMN 1

Line 38, "hat" should read --that--.

COLUMN 2

Line 49, "thru" should read --through--.

COLUMN 9

Line 14, "forth" should read --fourth--.

COLUMN 10

Line 17, "join" should read --joint--.

COLUMN 12

Line 50, "via" (first occurrence) should be deleted.

COLUMN 14

Line 14, "connected" should read --connected via the connection pieces 26p and 26q are reciprocally--.

COLUMN 21

Line 5, "plicated" should read --plicated.--.

COLUMN 24

Line 43, "Thus" should read --Thus,--.

UNITED STATES PATENT AND TRADEMARK OFFICE
CERTIFICATE OF CORRECTION

PATENT NO. : 5,305,521

DATED : April 26, 1994

INVENTOR(S) : MASAKI INABA, ET AL.

It is certified that error appears in the above-identified patent and that said Letters Patent is hereby corrected as shown below:

COLUMN 29

Line 19, "Also" should read --Also,--.

COLUMN 31

Line 40, "Thus" should read --Thus,--.

COLUMN 32

Line 43, "z axis" should read --z-axis--.
Line 52, "Thus" should read --Thus,--.
Line 60, "(FIG. 8)" should read --(FIG. 8).--.

COLUMN 33

Line 37, "Thus" should read --Thus,--.

COLUMN 35

Line 25, "$x_T$is" should read --$x_T$ is--.
Line 33, "$x_T$is" should read --$x_T$ is--.
Line 36, "$x_T$in" should read --$x_T$ in--.
Line 64, "x axis" should read --x-axis--.

COLUMN 36

Line 4, "Thus" should read --Thus,--.

COLUMN 37

Line 12, "push" should read --pushes--.

UNITED STATES PATENT AND TRADEMARK OFFICE

CERTIFICATE OF CORRECTION

PATENT NO. : 5,305,521

DATED : April 26, 1994

INVENTOR(S) : MASAKI INABA, ET AL.

It is certified that error appears in the above-identified patent and that said Letters Patent is hereby corrected as shown below:

COLUMN 41

Line 65, "plate" should read --plate member--.

COLUMN 42

Line 29, "and p1 moving" should read --and moving--.
Line 43, "substep," should read --step,--.
Line 58, "plate" should read --plate member--.

Signed and Sealed this

Twenty-fifth Day of October, 1994

Attest:

BRUCE LEHMAN

Attesting Officer

*Commissioner of Patents and Trademarks*